Dec. 1, 1953   M. A. GOODBAR ET AL   2,661,151
TOTALIZER ENGAGING MEANS
Original Filed July 17, 1948   23 Sheets-Sheet 1

INVENTORS
MAYO A. GOODBAR
EVERETT H. PLACKE
& CARL G. FALKNER
BY
THEIR ATTORNEYS

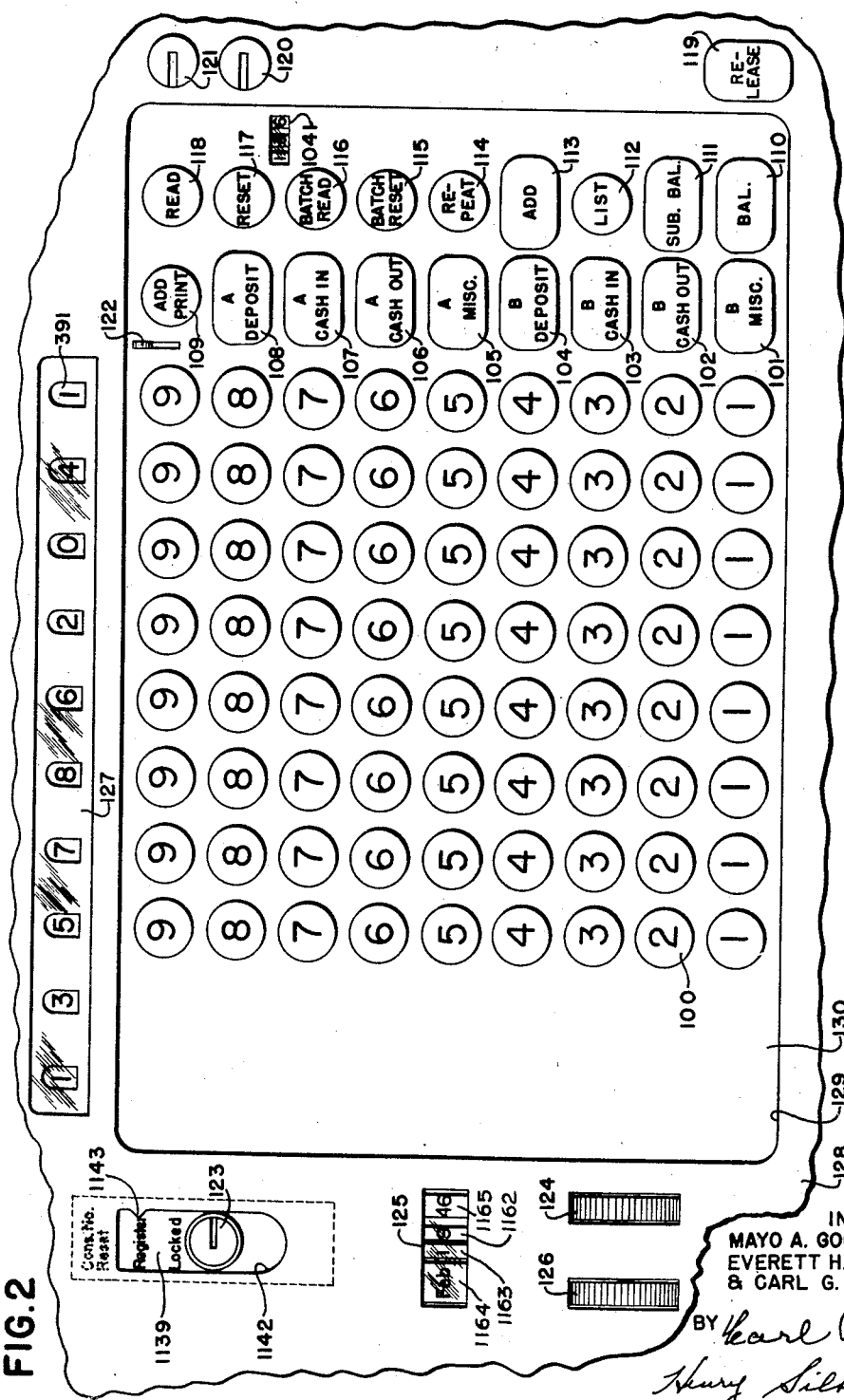

Dec. 1, 1953   M. A. GOODBAR ET AL   2,661,151
TOTALIZER ENGAGING MEANS
Original Filed July 17, 1948   23 Sheets-Sheet 3
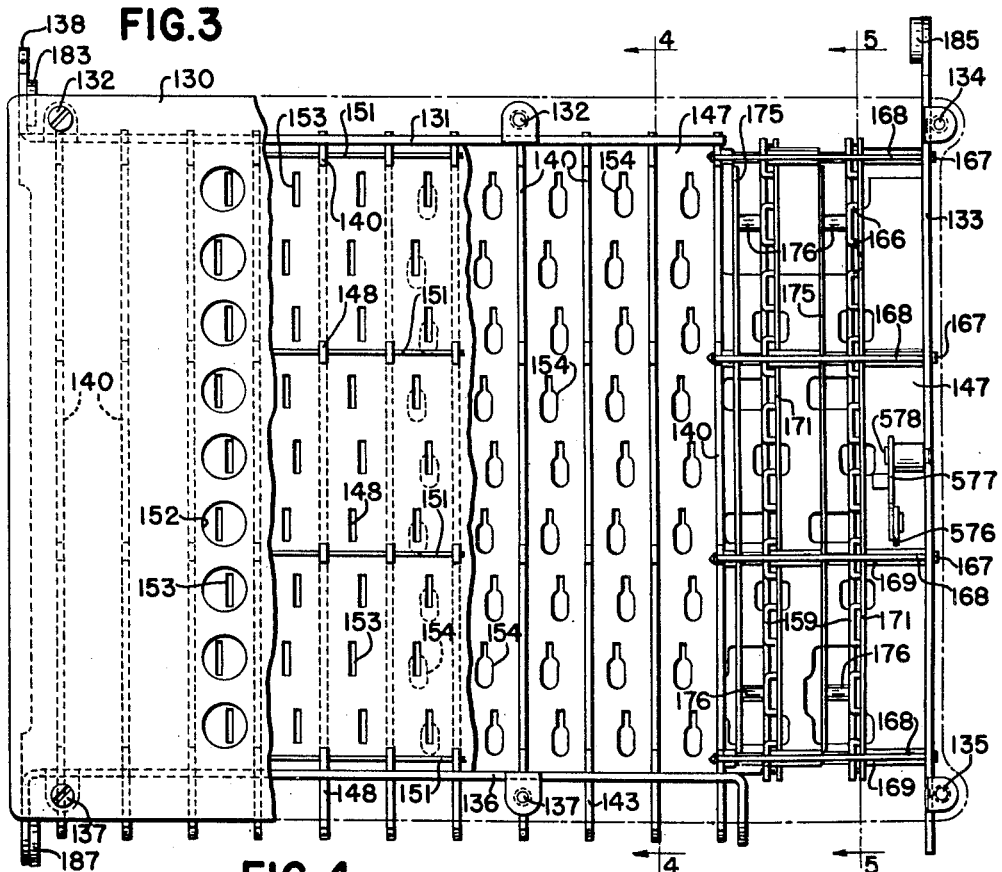
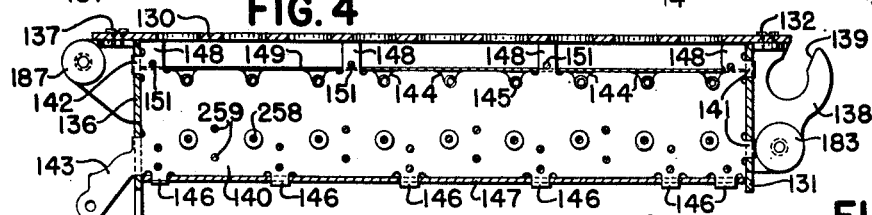
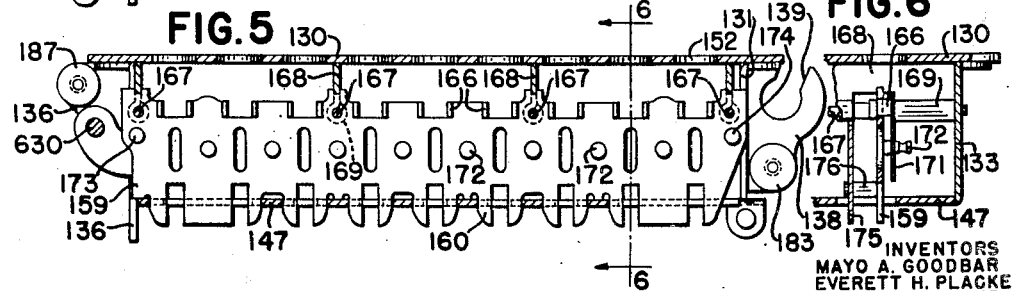
INVENTORS
MAYO A. GOODBAR
EVERETT H. PLACKE
& CARL G. FALKNER
BY
THEIR ATTORNEYS Dec. 1, 1953  M. A. GOODBAR ET AL  2,661,151
TOTALIZER ENGAGING MEANS
Original Filed July 17, 1948  23 Sheets-Sheet 4
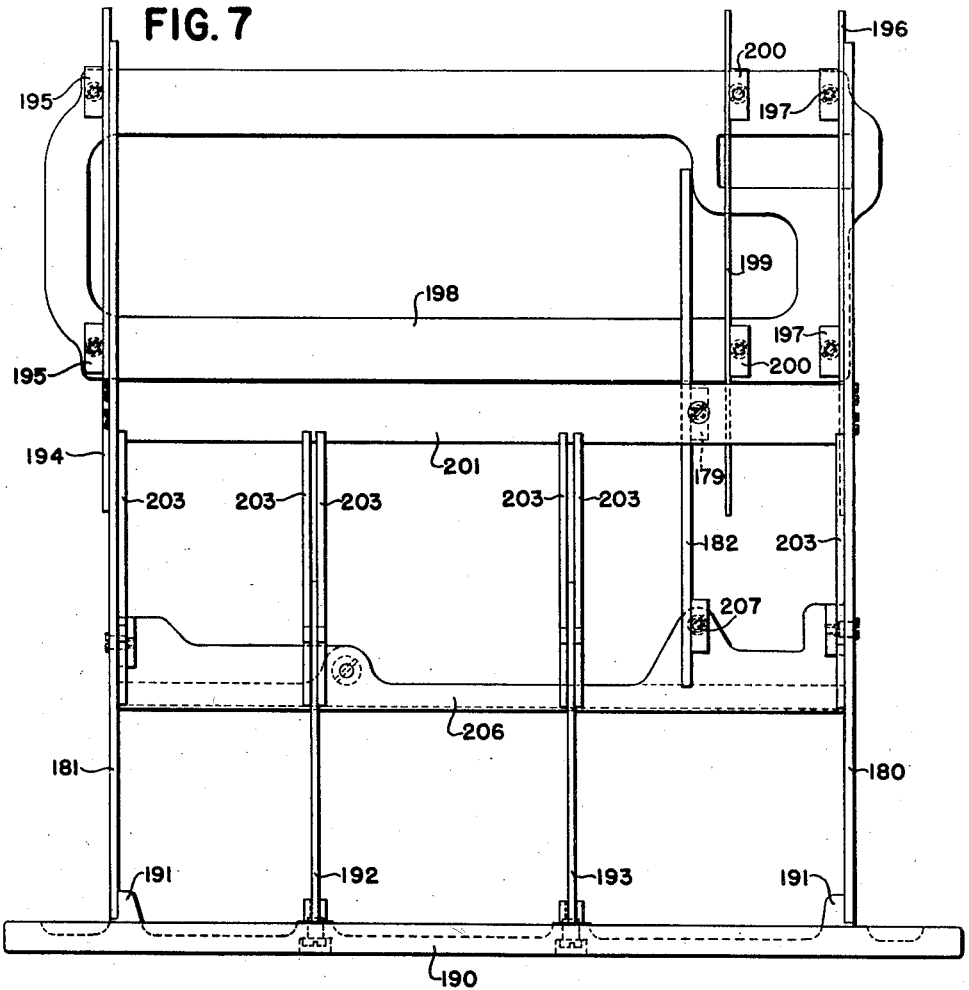
INVENTORS
MAYO A. GOODBAR
EVERETT H. PLACKE
& CARL G. FALKNER
BY *Carl Beust*
*Henry Silberis*
THEIR ATTORNEYS Dec. 1, 1953
M. A. GOODBAR ET AL
2,661,151
TOTALIZER ENGAGING MEANS
Original Filed July 17, 1948
23 Sheets-Sheet 5
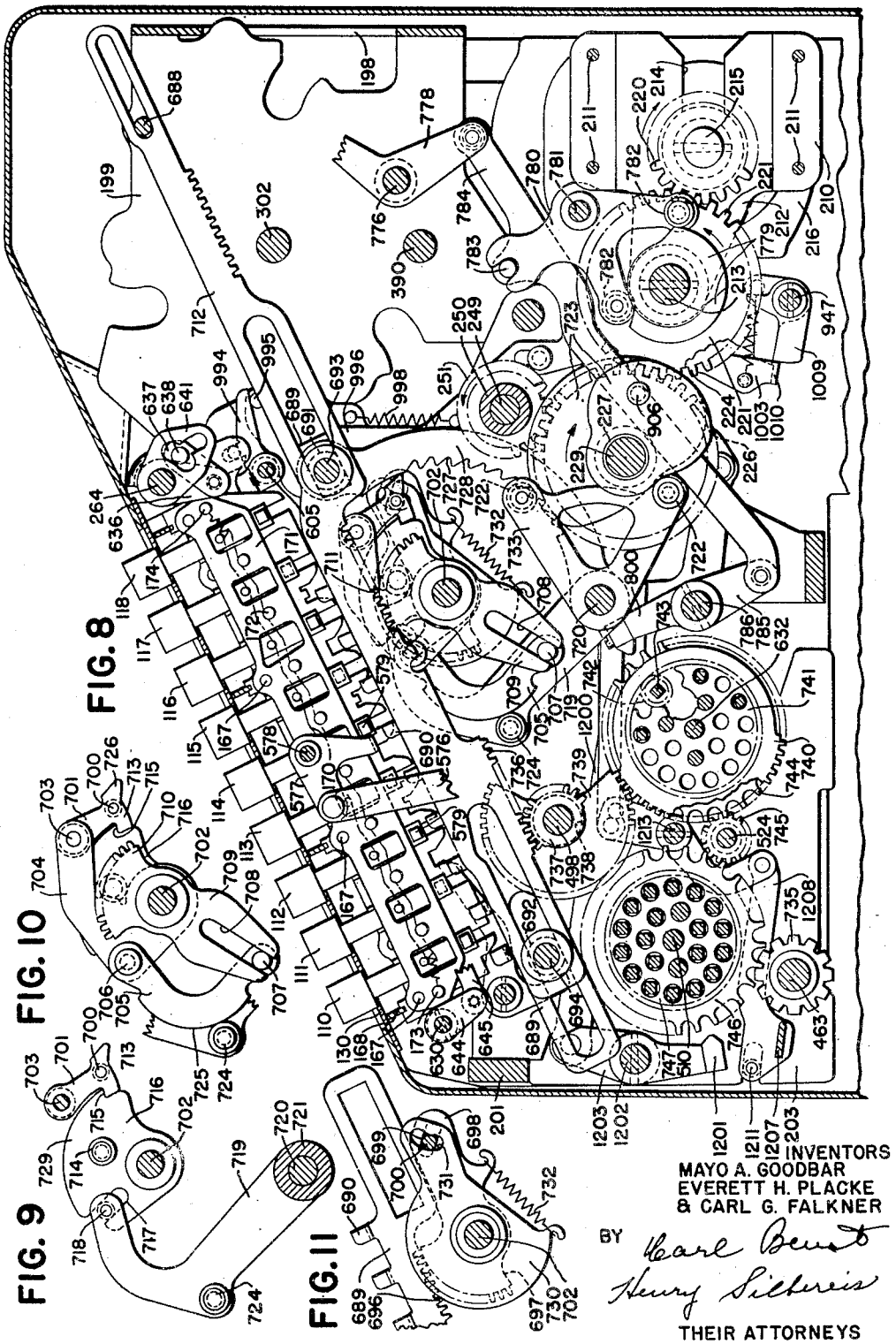
INVENTORS
MAYO A. GOODBAR
EVERETT H. PLACKE
& CARL G. FALKNER
BY
THEIR ATTORNEYS

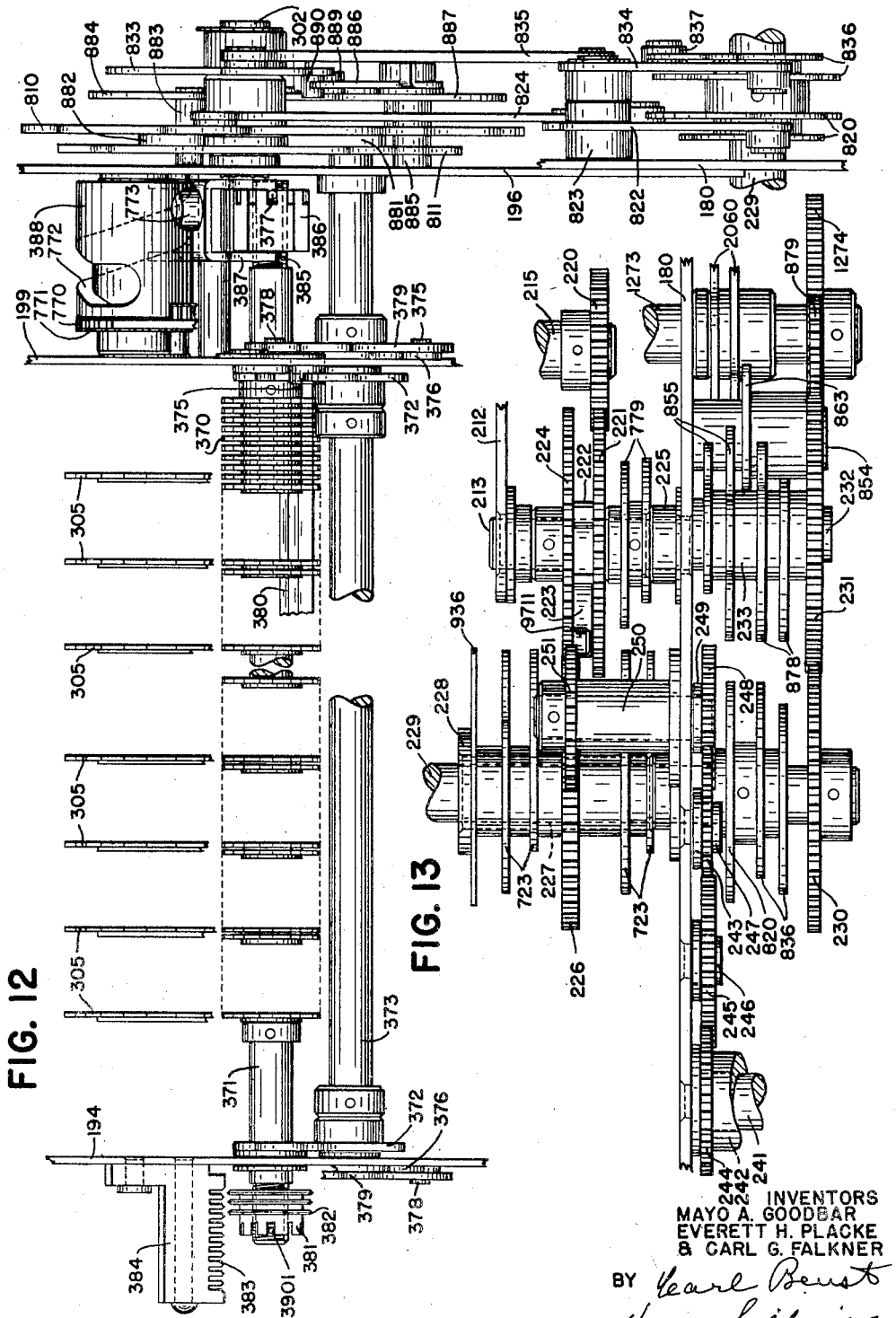

Dec. 1, 1953     M. A. GOODBAR ET AL     2,661,151
TOTALIZER ENGAGING MEANS

Original Filed July 17, 1948     23 Sheets-Sheet 7

INVENTORS
MAYO A. GOODBAR
EVERETT H. PLACKE
& CARL G. FALKNER

BY *Carl Beust*
*Henry Silberis*

THEIR ATTORNEYS

Dec. 1, 1953   M. A. GOODBAR ET AL   2,661,151
TOTALIZER ENGAGING MEANS
Original Filed July 17, 1948   23 Sheets-Sheet 8

INVENTORS
MAYO A. GOODBAR
EVERETT H. PLACKE
& CARL G. FALKNER

BY *Carl Beust*
*Henry Silberis*

THEIR ATTORNEYS

Dec. 1, 1953  M. A. GOODBAR ET AL  2,661,151
TOTALIZER ENGAGING MEANS
Original Filed July 17, 1948  23 Sheets-Sheet 9
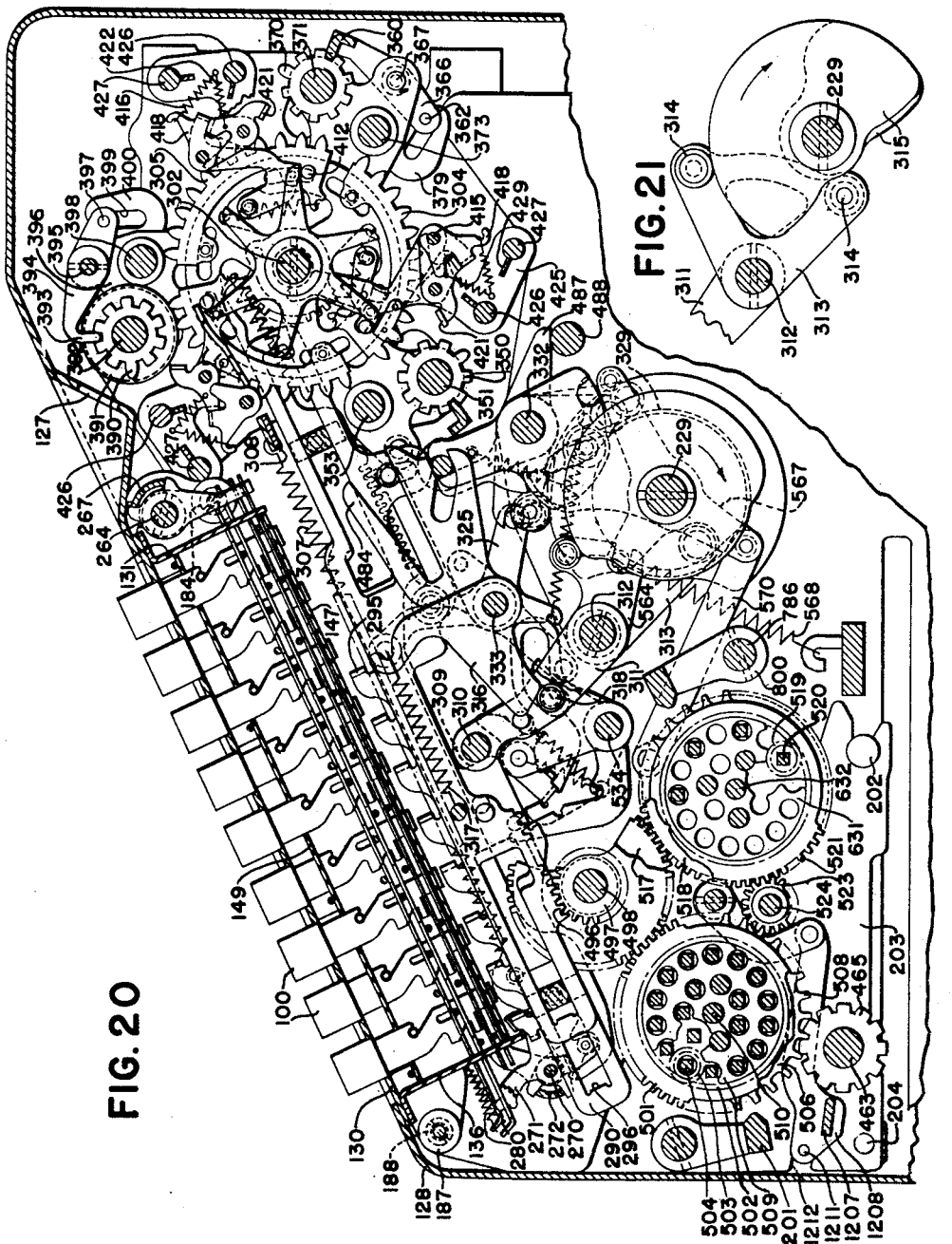
INVENTORS
MAYO A. GOODBAR
EVERETT H. PLACKE
& CARL G. FALKNER
BY
THEIR ATTORNEYS

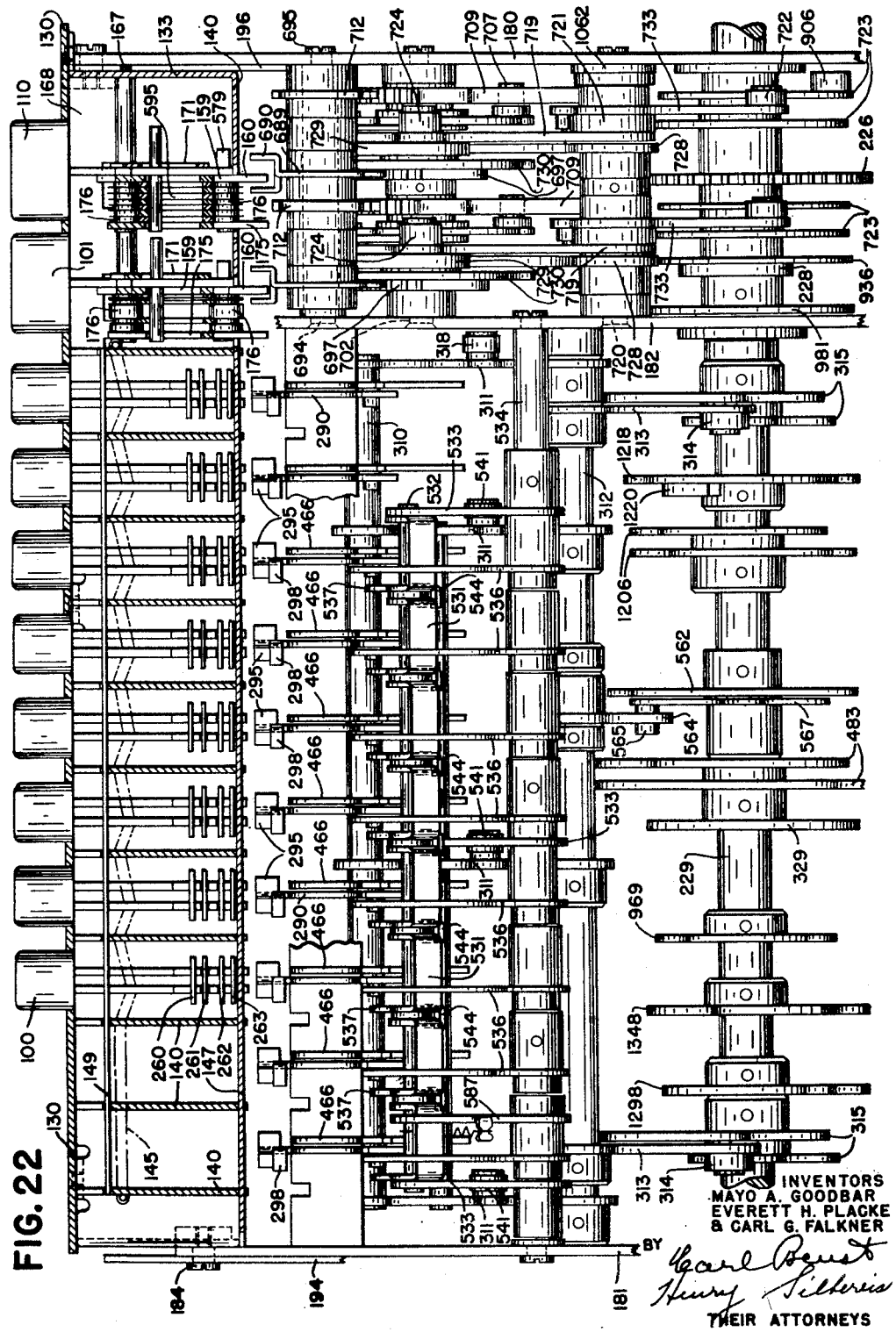

Dec. 1, 1953   M. A. GOODBAR ET AL   2,661,151
TOTALIZER ENGAGING MEANS
Original Filed July 17, 1948   23 Sheets-Sheet 11
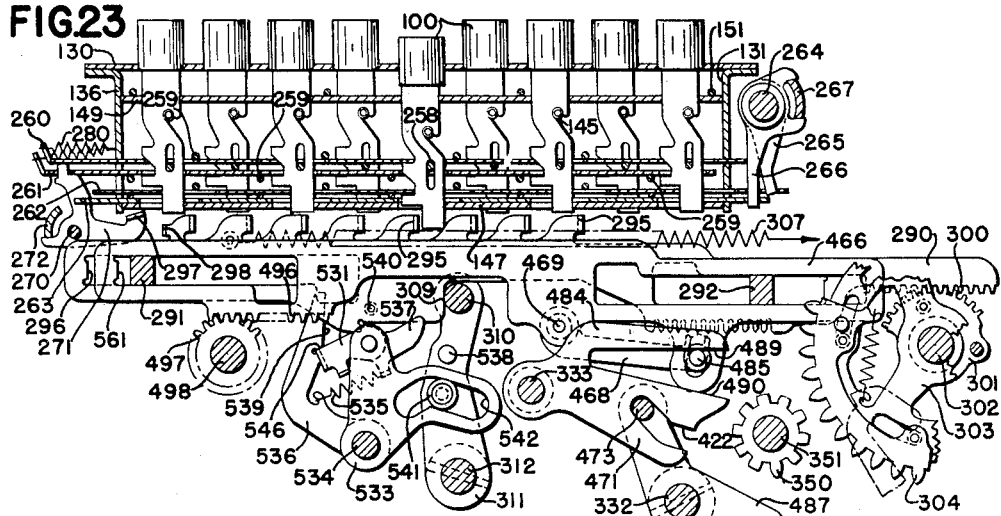
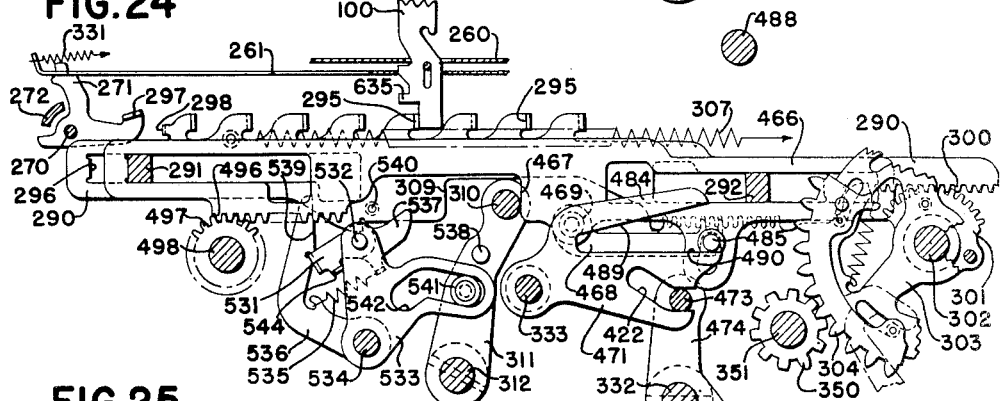
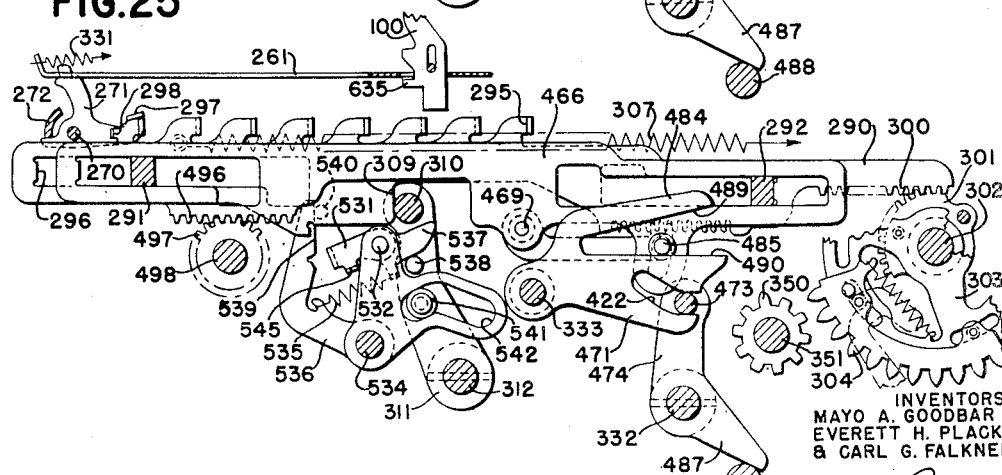
INVENTORS
MAYO A. GOODBAR
EVERETT H. PLACKE
& CARL G. FALKNER
BY
THEIR ATTORNEYS Dec. 1, 1953   M. A. GOODBAR ET AL   2,661,151
TOTALIZER ENGAGING MEANS
Original Filed July 17, 1948   23 Sheets-Sheet 12
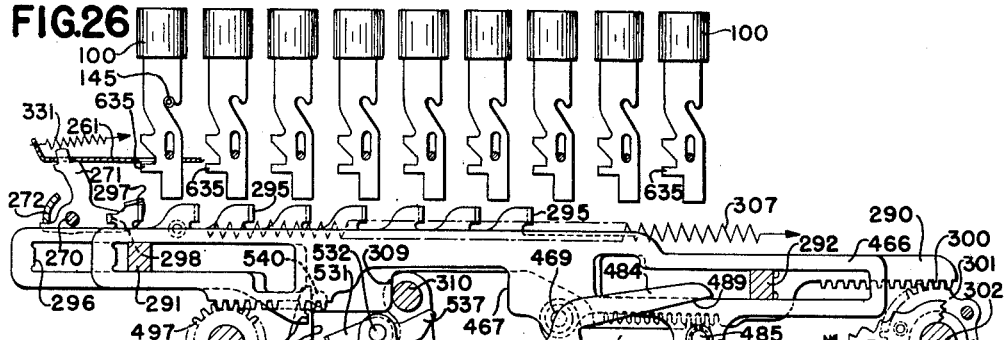
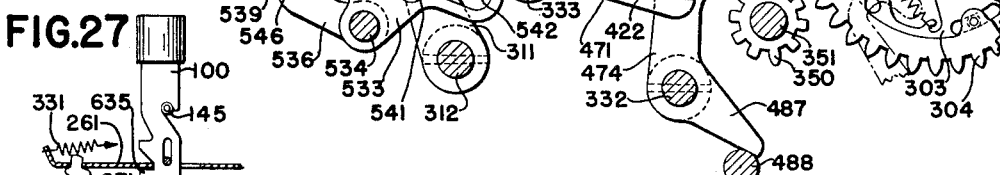
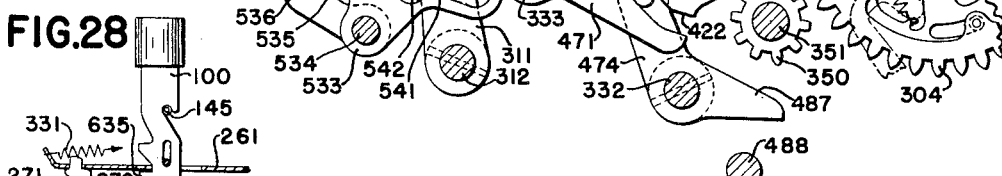
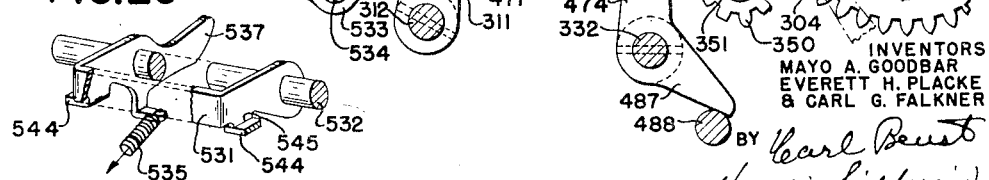
INVENTORS
MAYO A. GOODBAR
EVERETT H. PLACKE
& CARL G. FALKNER
BY
THEIR ATTORNEYS Dec. 1, 1953      M. A. GOODBAR ET AL      2,661,151
TOTALIZER ENGAGING MEANS
Original Filed July 17, 1948      23 Sheets—Sheet 13
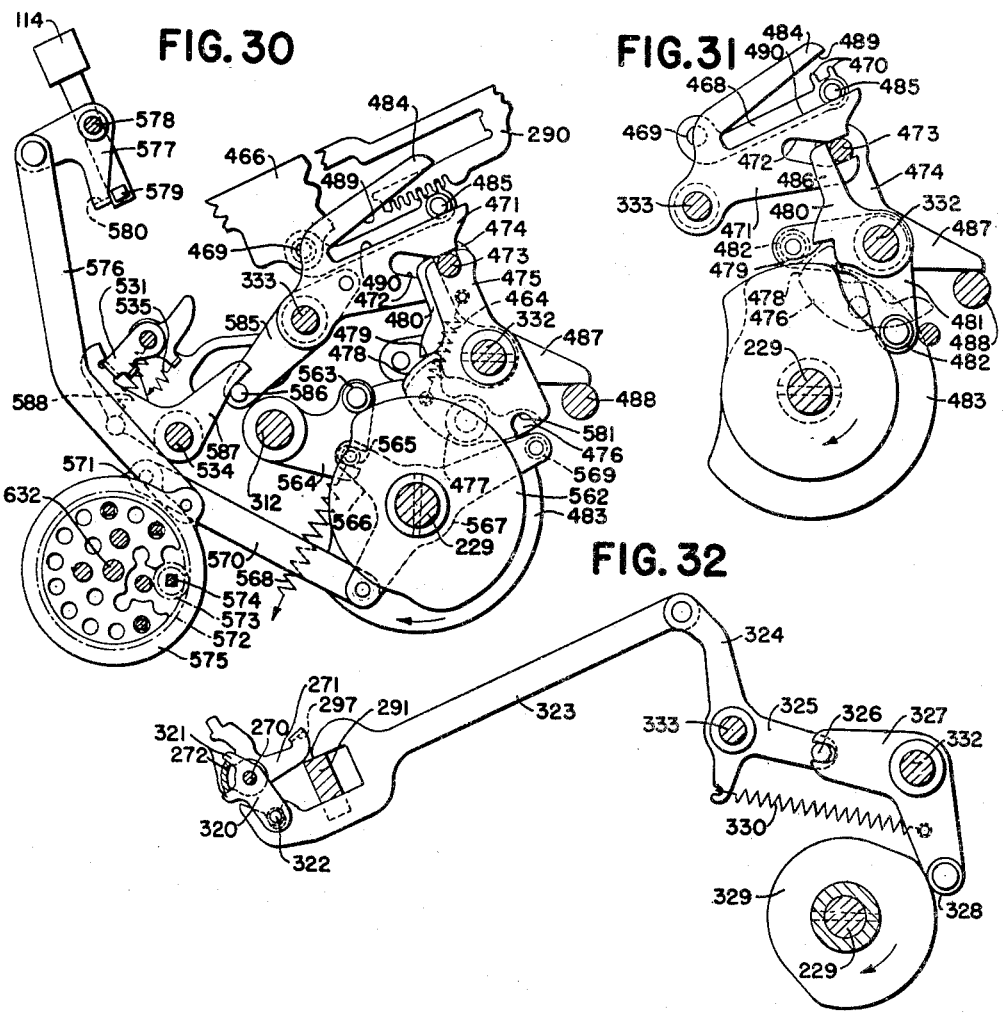
INVENTORS
MAYO A. GOODBAR
EVERETT H. PLACKE
& CARL G. FALKNER
BY
THEIR ATTORNEYS Dec. 1, 1953 M. A. GOODBAR ET AL 2,661,151
TOTALIZER ENGAGING MEANS
Original Filed July 17, 1948 23 Sheets-Sheet 14

INVENTORS
MAYO A. GOODBAR
EVERETT H. PLACKE
& CARL G. FALKNER

BY
THEIR ATTORNEYS

Dec. 1, 1953

M. A. GOODBAR ET AL 2,661,151

TOTALIZER ENGAGING MEANS

Original Filed July 17, 1948

INVENTORS
MAYO A. GOODBAR
EVERETT H. PLACKE
& CARL G. FALKNER

BY

THEIR ATTORNEYS

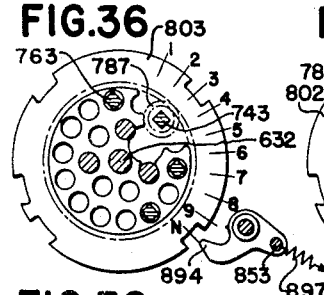
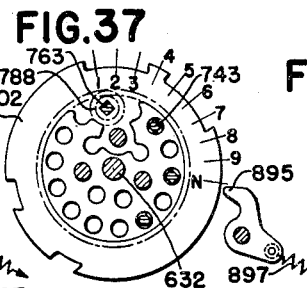
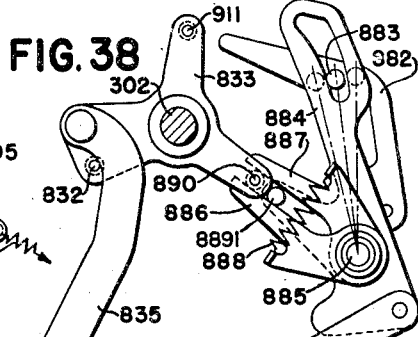
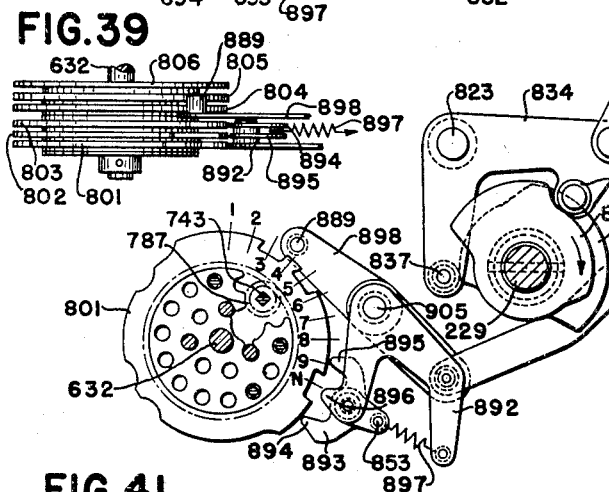
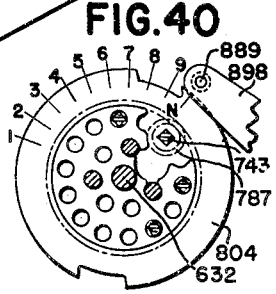
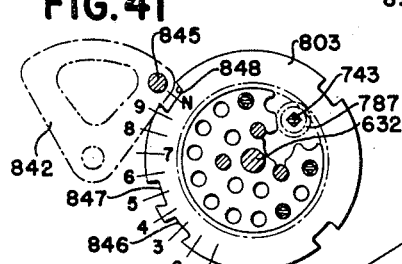
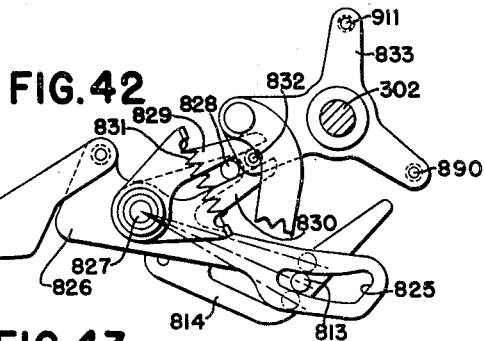
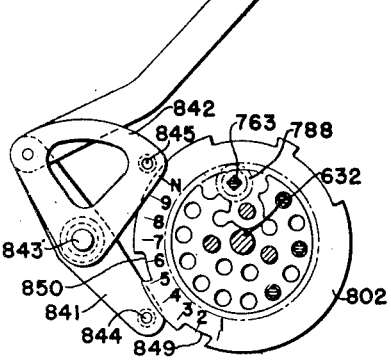
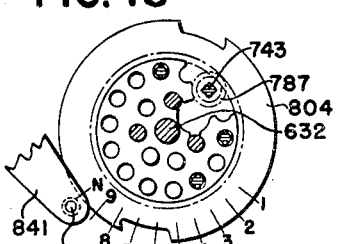

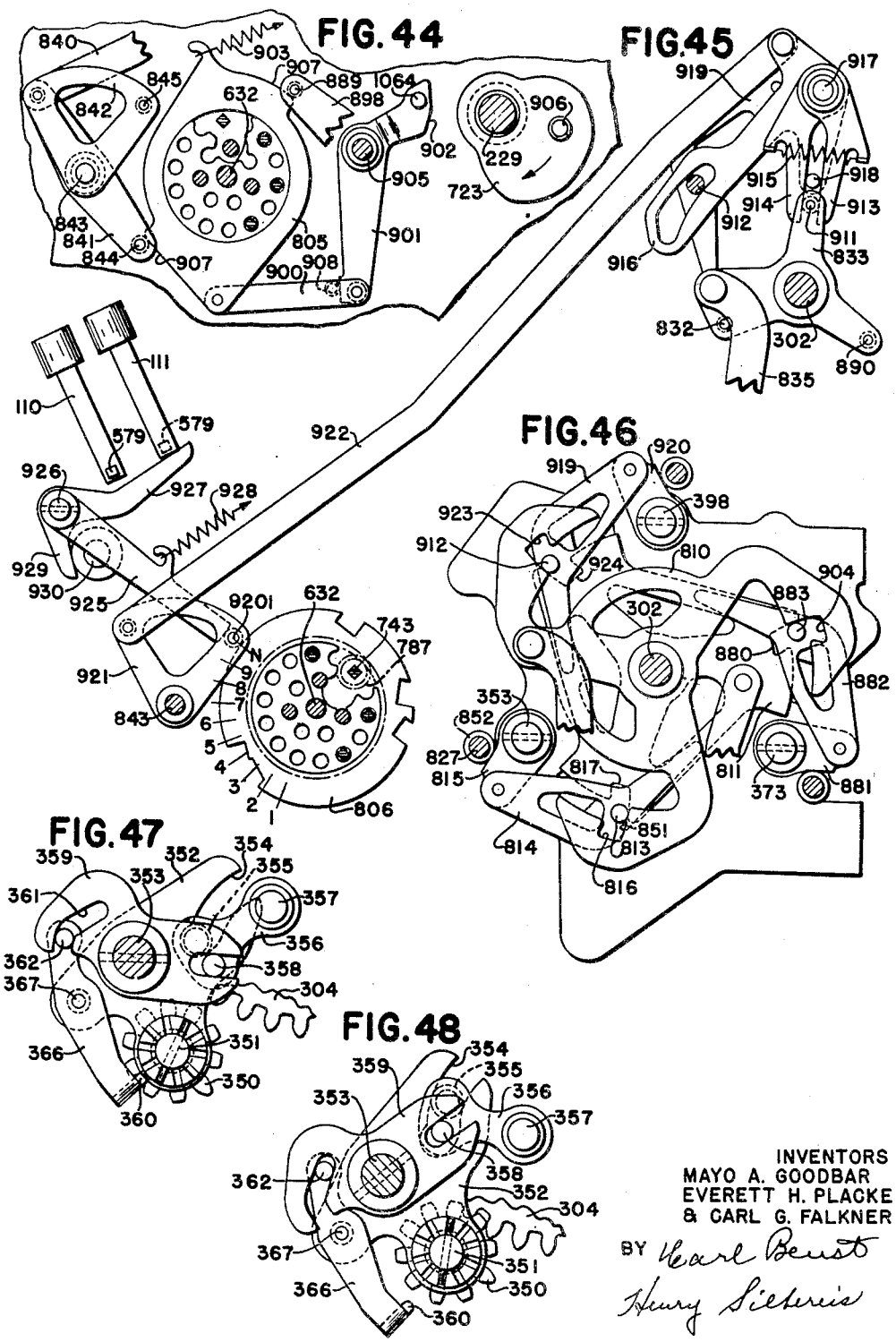

Dec. 1, 1953  M. A. GOODBAR ET AL  2,661,151
TOTALIZER ENGAGING MEANS
Original Filed July 17, 1948  23 Sheets-Sheet 18

INVENTORS
MAYO A. GOODBAR
EVERETT H. PLACKE
& CARL G. FALKNER
BY
THEIR ATTORNEYS

Dec. 1, 1953  M. A. GOODBAR ET AL  2,661,151
TOTALIZER ENGAGING MEANS
Original Filed July 17, 1948  23 Sheets-Sheet 19

INVENTORS
MAYO A. GOODBAR
EVERETT H. PLACKE
& CARL G. FALKNER
BY
THEIR ATTORNEYS

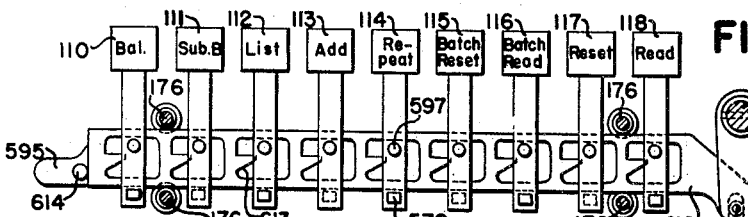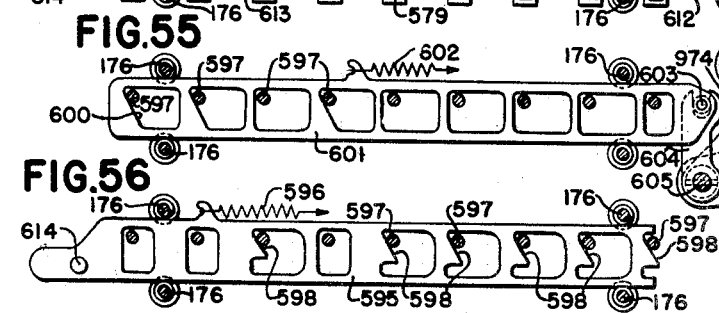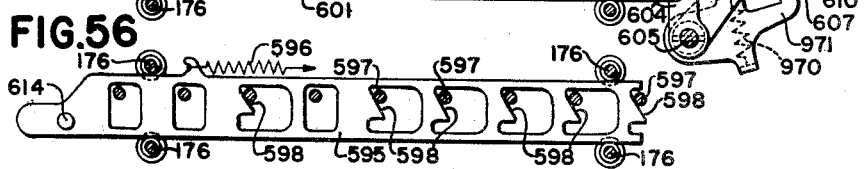

Dec. 1, 1953  M. A. GOODBAR ET AL  2,661,151
TOTALIZER ENGAGING MEANS
Original Filed July 17, 1948  23 Sheets-Sheet 21
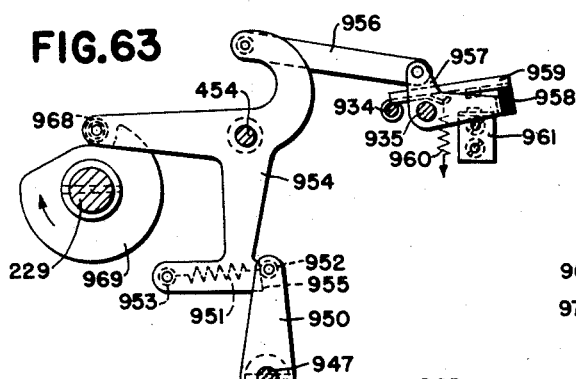
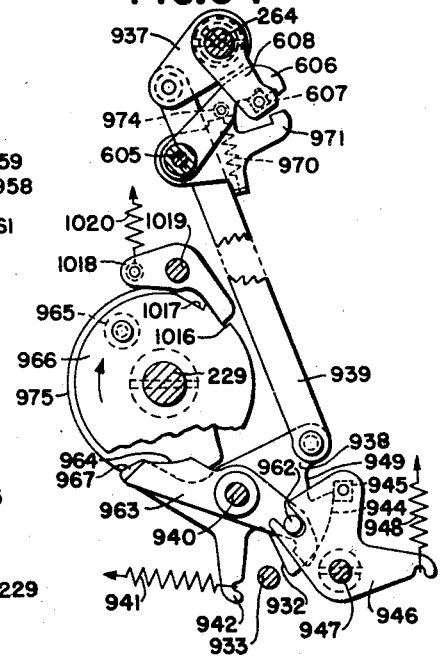
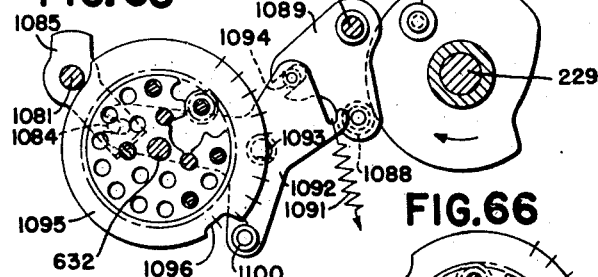
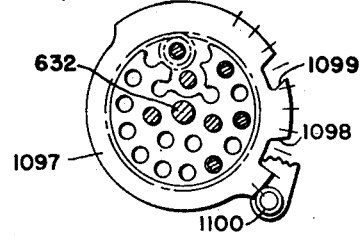
INVENTORS
MAYO A. GOODBAR
EVERETT H. PLACKE
& CARL G. FALKNER
BY Carl Reust
Henry Silberis
THEIR ATTORNEYS Dec. 1, 1953     M. A. GOODBAR ET AL     2,661,151
TOTALIZER ENGAGING MEANS
Original Filed July 17, 1948     23 Sheets-Sheet 22
FIG. 67-A
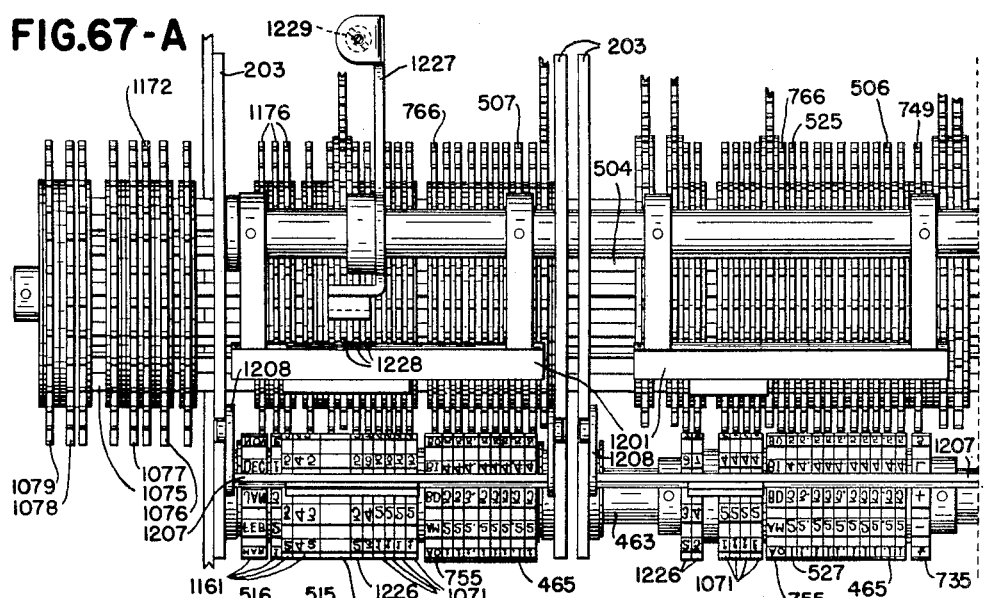
FIG. 68-A
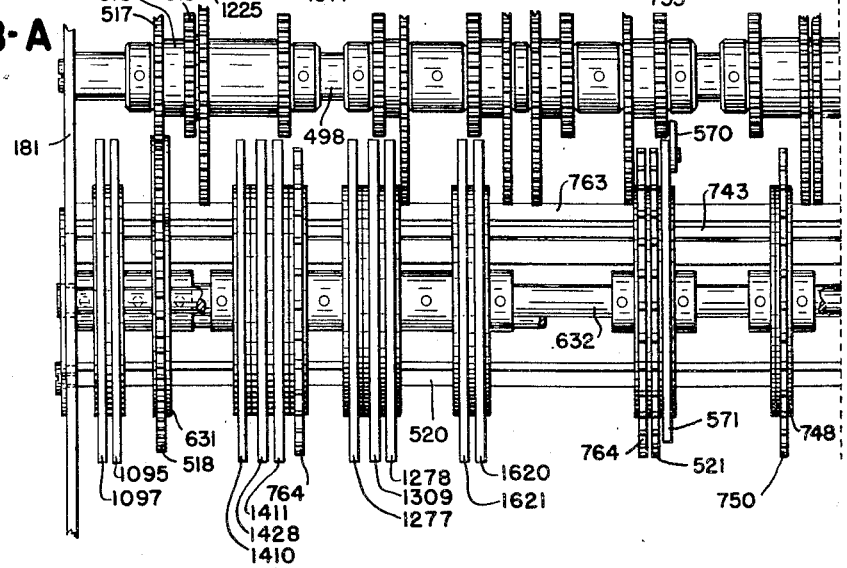
INVENTORS
MAYO A. GOODBAR
EVERETT H. PLACKE
& CARL G. FALKNER
THEIR ATTORNEYS Dec. 1, 1953    M. A. GOODBAR ET AL    2,661,151
TOTALIZER ENGAGING MEANS
Original Filed July 17, 1948    23 Sheets-Sheet 23
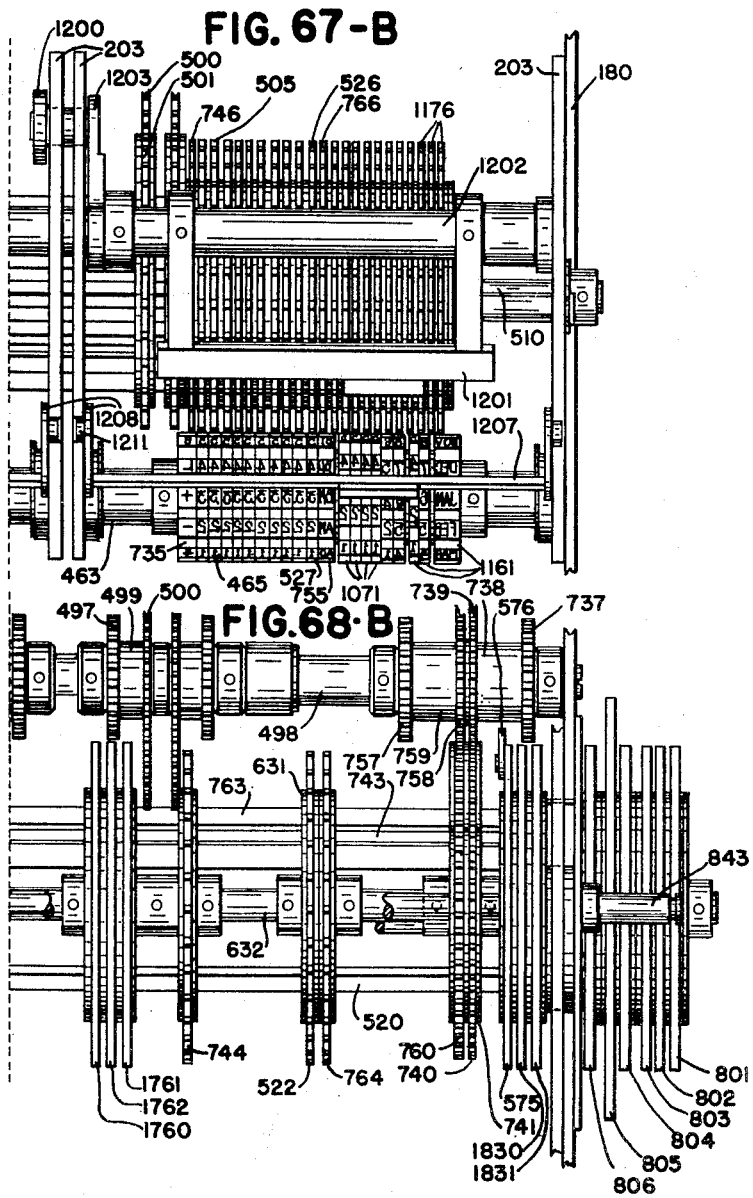
INVENTORS
MAYO A. GOODBAR
EVERETT H. PLACKE
& CARL G. FALKNER
THEIR ATTORNEYS Patented Dec. 1, 1953

2,661,151

UNITED STATES PATENT OFFICE 2,661,151

TOTALIZER ENGAGING MEANS

Mayo A. Goodbar, Everett H. Placke and Carl G. Falkner, Dayton, Ohio, assignors to The National Cash Register Company, Dayton, Ohio, a corporation of Maryland Original application July 17, 1948, Serial No. 39,278. Divided and this application November 14, 1951, Serial No. 256,297

23 Claims. (Cl. 235—60.31)

This is a division of application Serial No. 39,278, filed July 17, 1948, by Mayo A. Goodbar et al., now Patent No. 2,616,623, issued November 4, 1952.

This invention relates to improvements in totalizer-engaging means for accounting machines.

One object of the invention is to provide a machine for use in handling commercial accounts by a bank teller.

Another object of the invention is to provide means to selectively control the machine to perform one-cycle or two-cycle total-taking operations.

A specific object of the invention is to provide a cycle control mechanism in which a clutch is provided which is controlled by total-taking control keys in such a manner that the clutch is disabled during one cycle of a two-cycle operation and remains effective during one-cycle operations.

Another specific object of the invention is to provide a machine with a plurality of lines of totalizers, at least one of which lines is a non-shifting line and at least one of which is a shifting interspersed line, together with means to automatically control the machine to perform one-cycle total-taking operations when printing totals from the non-shifting totalizer line, and two-cycle total-taking operations when printing totals from an interspersed totalizer line.

Another object of the invention is to provide a novel totalizer-engaging control mechanism controlled by automatically-positioned control members.

With these and incidental objects in view, the invention includes certain novel features of construction and combinations of parts, a preferred form or embodiment of which is hereinafter described with reference to the drawings which accompany and form a part of this specification.

Of said drawings:

Fig. 2 is a diagrammatic view of the keyboard.

Fig. 3 is a top plan view of the keyboard frame with certain parts broken away for clearness.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 5.

Fig. 7 is a detail view showing the main framework of the machine as viewed from the front of the machine.

Fig. 8 is a sectional view taken at the right of the first transaction bank, showing the transaction differential mechanism and certain mechanisms adjusted thereby.

Fig. 9 is a detail view of the driving mechanism for the first transaction bank differential mechanism.

Fig. 10 is a detail view of the beam-setting mechanism for the first transaction bank.

Fig. 11 is a detail view of certain parts of the first transaction bank differential mechanism.

Fig. 12 is a top plan view of the rear totalizer line and shows the shifting mechanism and certain of the engaging and disengaging mechanisms therefor.

Fig. 13 is a detail view of a part of the two cam lines of the machine.

Fig. 20 is a cross-sectional view of the machine taken just to the right of the ten-cent amount bank.

Fig. 21 is a detail view showing the amount differential operating cams.

Fig. 22 is a sectional view of the machine, as viewed from the front thereof, and shows the relationship of the keyboard to the amount and transaction bank differentials, together with the main cam line for operating the machine.

Fig. 23 is a detail view of the amount differential mechanism shown in the position in which it is arrested by the five-cent key in the early part of the machine operation and also shows the corresponding position of the zero setting and repeat mechanisms.

Fig. 24 is a detail view of the mechanism shown in Fig. 23, with the universal rod in its fully moved position.

Fig. 25 is a detail view of the mechanism shown in Fig. 23, with the parts in the position which they assume with the machine at rest, after "five" has been added to the totalizer.

Fig. 26 is a detail view of the mechanism shown in Fig. 23, with the parts in home position, with no key depressed.

Fig. 27 is a detail view of the parts shown in Fig. 26, shown in the position in which the amount differential slide is arrested by the zero stop pawl in the early part of the machine operation.

Fig. 28 is a detail view of the amount differential mechanism shown in Fig. 26, with the amount slide in the zero eliminated position and the type setting slide moved to its zero eliminated setting position.

Fig. 29 is a perspective detail view, with the parts partly broken away, showing the zero setting control yokes.

Fig. 30 is a detail view showing the repeat mechanism.

Fig. 31 is a detail view of a part of the mechanism shown in Fig. 30.

Fig. 32 is a detail view of the zero stop setting mechanism.

Fig. 36 is a detail view of one of the control plates set by the first transaction bank for controlling the engagement of the rear totalizer.

Fig. 37 is a detail view of the control plate set by the second transaction bank for controlling the engagement of the rear totalizer line.

Fig. 38 is a detail view of the engaging mechanism for the rear totalizer and shows the control plate therefor, adjusted under control of the first transaction bank.

Fig. 39 is a top plan view of the control plates for controlling the engagement of the rear totalizer line.

Fig. 40 is a detail view of a control plate adjusted by the first transaction bank for controlling the engagement of the rear totalizer line.

Fig. 41 is a detail view showing a control plate adjusted under control of the first transaction bank, for controlling the engagement of the front totalizer line.

Fig. 42 is a detail view of the mechanism for controlling engagement of the front totalizer line and shows a control plate set by the second transaction bank for controlling said mechanism.

Fig. 43 is a detail view of a control plate set by the first transaction bank for controlling engagement of the front totalizer line.

Fig. 44 is a detail view of the mechanism for controlling the time at which the engaging control feelers for the rear and the front totalizer lines are operated.

Fig. 45 is a detail view of the mechanism for controlling the engagement of the upper totalizer and includes a control plate therefor set under control of the first transaction bank.

Fig. 46 is a detail view of the add and total-taking engaging mechanism for the three totalizer lines.

Fig. 47 is a detail view of a part of the totalizer engaging mechanism for the front totalizer line.

Fig. 48 is a detail view of the mechanism shown in Fig. 49, shown in the moved or totalizer-engaging position.

Fig. 54 is a detail view of the detent for holding the keys of the first transaction bank depressed during the machine operation.

Fig. 55 is a detail view showing the machine release control slide in the first transaction bank and the mechanism controlled thereby for releasing the machine for operation.

Fig. 56 is a detail view of the flexible detent in the first transaction bank for holding certain transaction keys in their depressed position.

Fig. 57 is a detail view of the interlocking control slide in the first transaction bank for preventing depression of certain transaction keys in said first transaction bank after the repeat key has been depressed and to prevent depression of the repeat key after any of said certain keys have been depressed.

Fig. 58 is a detail view of the control slide in the first transaction bank forming a part of an interlock between the total-taking keys and the amount keys.

Fig. 59 is a detail view of the mechanism in the first transaction bank for preventing the release of the machine with amount keys depressed and for controlling the operation of the zero stop mechanism in the amount banks, when a total-taking key has been depressed.

Fig. 60 is a detail view of a part of the mechanism shown in Fig. 59.

Fig. 61 is a detail view of the detent in the first transaction bank for maintaining the List key in depressed position until released by depression of the Balance key.

Fig. 62 is a detail view showing the mechanism in the first transaction bank for blocking movement of the zero stop pawls in the amount differential banks when a total key has been depressed.

Fig. 63 is a detail view of the motor switch operating mechanism.

Fig. 64 is a detail view of part of the machine release mechanism.

Fig. 65 is a detail view of the consecutive number operating control mechanism.

Fig. 66 is a detail view of a control plate adjusted under control of the second transaction bank for controlling the operation of the consecutive number device.

Figure 1:
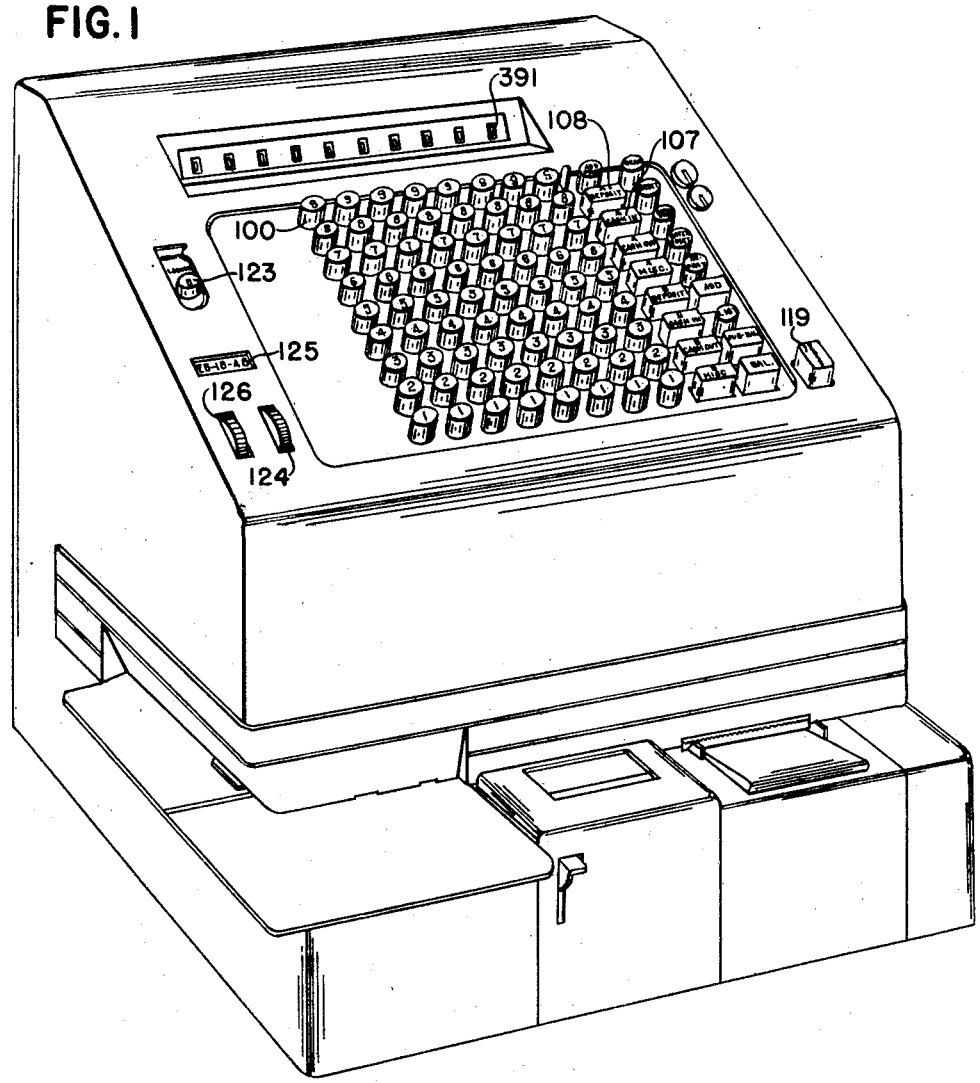
Fig. 1 is a perspective view of the machine, showing the keyboard and the cabinet in which the machine is enclosed.

Figs. 67A and 67B taken together constitute a top plan view of the transmission mechanism for setting the type wheels in the three printer sections of the machine.

Figs. 68A and 68B are a top plan view of the connections between the amount and transaction differential mechanisms and the type setting transmission gears.

General description

The invention illustrated herein is embodied in a machine for use by commercial bank tellers. In handling commercial account transactions, it is necessary to segregate deposits, in the form of checks, cash, and mixed checks and cash, from "cash paid out" transactions. In recording these commercial bank transactions, it is also necessary to enter transactions wherein a check is presented, a part of the amount of which is deposited and the balance taken in cash by the customer.

All the above transactions are recorded at the teller's window in the present machine, which simultaneously produces printed records for use by the auditing and bookkeeping departments. Recording mechanisms are located at the front of the machine and include a slip printer to print on deposit slips and cash tickets, an audit tape printer, and an issuing tape printer, as shown and described in the parent case.

A machine is illustrated herein for use by two tellers and is provided with three totalizer lines spaced around common actuators. The upper line has a single "List" or visible totalizer and is used for adding, or listing, operations. The front totalizer line has two totalizers for accumulating the amounts of batches of checks, one for each teller. The rear totalizer line is provided with eight interspersed totalizers for classifying various entries, four of which totalizers are allotted to each teller. The classifications are "Deposit," "Cash In," "Cash Out," and "Miscellaneous."

The List totalizer on the upper line is selected to receive entries under control of either the "Add" key or the "List" key in row 1. The List totalizer can be used for straight adding operations without making any printed entries. This is obtained by depression of the Add key alone; that is to say, no other key is depressed in combination therewith. When the Add Print key in row 2 is depressed in combination with the Add key of row 1, the items are printed on the issuing tape. A latch is provided for the Add Print key to hold it depressed until manually released, thus making it unnecessary to press the Add Print key for each item entered. The List totalizer is cleared by depression of the "Balance" key in row 1, or sub-totals can be printed on the issuing tape by depression of the "Sub-Balance" key in combination with the Add Print key of row 2. Only one cycle of operation is required to clear or sub-total the List totalizer. The "Batch" totalizers on the front totalizer line are selected by the "Cash Out" keys. As disclosed here, two "Batch" totalizers are provided on the front totalizer line, one being selected by the "A Cash Out" key and the other by the "B Cash Out" key.

The back totalizer line is provided with eight interspersed totalizers, one allotted to each key of the transaction bank, except the Add Print key, so that separate totals can be had for each classification.

The automatic controls effected by each key of the two transaction banks is briefly tabulated below.

DETAILED DESCRIPTION

Keyboard

As shown in Figs. 1 and 2, the keyboard of the machine, as illustrated herein, is provided with eight rows of amount keys 100 and two banks of control, or transaction, keys 101 to 118 inclusive. The keys 101 to 118 inclusive are provided with legends to aid in their selection for controlling the machine in its operations. In addition to the controls indicated by the legends thereon, keys 101 to 108 inclusive, 110, 111, and 113 are what is known in the art as motor keys; that is in addition to controlling the machine in accordance with the legends thereon, these keys also release the machine for operation. Keys 109, 112, and 114 to 118 inclusive do not release the machine for operation, and therefore they must be depressed in combination with one of the motor keys. Near the lower right-hand corner of the keyboard is a release key 119, which is used to release the keys on the keyboard if for any reason it is desired to release them after they have been depressed and before the machine has been released for operation. The reset key 117 is provided with a lock 120, whereby the teller may lock the reset key during his absence. A similar lock 121 is provided for the read key 118.

Figure 18:
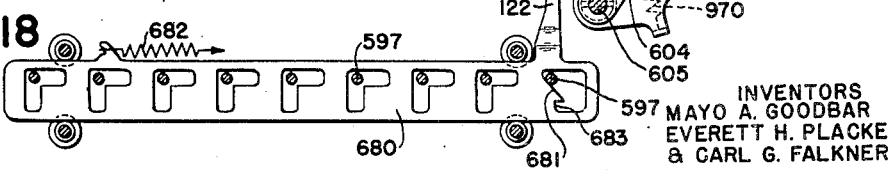
Fig. 18 is a detail view of the control plate for maintaining the add-print key depressed until released manually.

The add-print key 109 is a stay-down key and may be released by manipulation of a finger 122, located to the left of the key 109 (see also Fig. 18).

A control slide lock 123 (Figs. 2 and 53) is provided near the left side of the machine for locking the machine, controlling resetting of the consecutive number means, changing the date, and unlocking the audit tape door. The slide lock 123 has three positions. With the slide in its middle position, shown in the drawings, the consecutive number and the date can not be changed, but the machine can be operated to enter items and to reset the totalizers. When the slide lock 123 is in its uppermost position, the machine is locked against operation, the date and the consecutive number means cannot be operated, and the audit tape door cannot be opened. When the slide lock 123 is in its lowermost position, the machine is locked against operation, but the consecutive number can be reset, the date can be changed, and the audit tape door can be opened.

Eight amount banks are shown in Fig. 2. However, there are ten totalizer wheels shown in the opening 127. This provides two overflow wheels for the List totalizer. A cabinet 128 is provided to enclose the entire machine. An opening 129, through which the keys of the keyboard project, is provided.

Unitary keyboard assembly

The amount keys 100 and the control keys 101 to 118 inclusive are mounted in a frame which consists of a unit which may be removed from the machine in its entirety. This unit construction provides an economical and convenient production method, since the keyboard can be assembled separately and then assembled into the machine as a separate entity. The unitary keyboard frame is best shown in Figs. 3, 4, 5, and 6 and consists of a top plate 130 secured to a back frame 131 by a screw 132 and to an end plate 133 by screws 134 and 135. The top plate is also secured to a front plate 136 by two screws 137. The left-hand end of the back frame 131 is bent at right angles to form a flange 138 having an open slot 139 to receive a shaft on which certain control elements are assembled, as will be described hereinafter. Eleven partition plates 140 are provided to form compartments in which the amount keys are mounted (see also Fig. 22). The rear ends of the partition plates 140 are provided with ears 141, which project into slots in the back frame 131, and with ears 142, projecting into slots in the front plate 136. After being inserted into said slots, the ears 141 and 142 are riveted over to hold them firmly in place. Also projecting into slots in the plate 136 is an ear 143 on each plate 140. The plates 140 are provided with notches 144 to receive key restoring springs 145 stretched between the two end partition plates 140 (see also Fig. 22). The functions of the springs 145 will be described in connection with the consideration of the operation of the amount keys. Each partition plate 140 is provided with six ears 146 on its bottom edge, which projects through and are riveted into a bottom plate 147. Each partition plate 140 is also provided on its top edge with four upstanding ears 148, which project up to the under side of the top plate 130 and provide a rest for said top plate. An intermediate plate 149 is provided, which rests on the partition plates 140, and the plate 149 is held in position by wires 151 projecting through openings in the upstanding ears 148 of the partition plates 140. The wires are long enough to span all the partition plates 140 and are held in place by friction.

The partition plates 140 support a series of rods for supporting the detents for the amount bank in a manner described hereinafter.

The top plate 130 is provided with round openings 152 to accommodate the amount keys 100. Slots 153 are provided, through which the body of each key 100 moves, and the bottom plate 147 is provided with slots 154, through which the bottom ends of the keys 100 move when they are depressed. Thus the slots 153 and 154 form means for guiding the amount keys in their up-and-down movements.

Near the right-hand end of the keyboard frame are provided two partition plates 159 (Figs. 3 and 22), which form a support for the transaction keys and the control keys. The bottom edge of the partition plate 149 is provided with projections 160 (see Fig. 5), which fit into slots in the bottom plate 147. Along the upper edge of each plate 159, nine pairs of flanged ears 166 are bent to form a guideway for the control keys. Four rods 167, extending through the right side plate, through the partition plates 159, and into the right partition plate 140, provide supports for four spacer plates 168, each being formed to provide a bearing through which the rod 167 is passed. The spacer plates 168 extend upwardly to engage the under side of the top plate 130 in the transaction and control key section of the keyboard frame. The rods 167 are held in place by friction.

An auxiliary plate 171 (see also Fig. 8) is mounted on each partition plate 159 by means of studs 172, 173, and 174. The auxiliary plates 171 are held against the ears 166 by the ends of the bearings 169 to provide a runway for the transaction and control keys. The heads of the transaction and control keys project through openings 162 provided in the top plate 130 and shaped to fit the outlines of the respective keys. Eight studs 172, mounted on each partition plate 159 and projecting through its associated auxiliary plate 171, provide supports for a coil spring 176 (Figs. 6, 8, and 35), stretching from a stud 173 near the front end of the auxiliary plate to a stud 174 near the rear end of the auxiliary plate, to form a means for restoring and holding the keys in their upper, or undepressed, positions.

A third plate 175, carried by and spaced from the partition plate 159 by four studs 176 (see Figs. 55 to 59 inclusive), forms a runway for the control detents described hereinafter.

The keyboard assembly, consisting of the top plate 130, the bottom plate 147, the front plate 136, and the back frame 131, together with the partition plates 140 and 159, forms a unitary assembly which can be inserted into the machine after it has been assembled, together with all of the amount and control keys, their control slides and detents, and certain other control elements which are operated by the keys as they are depressed, to be described later.

Figure 19:
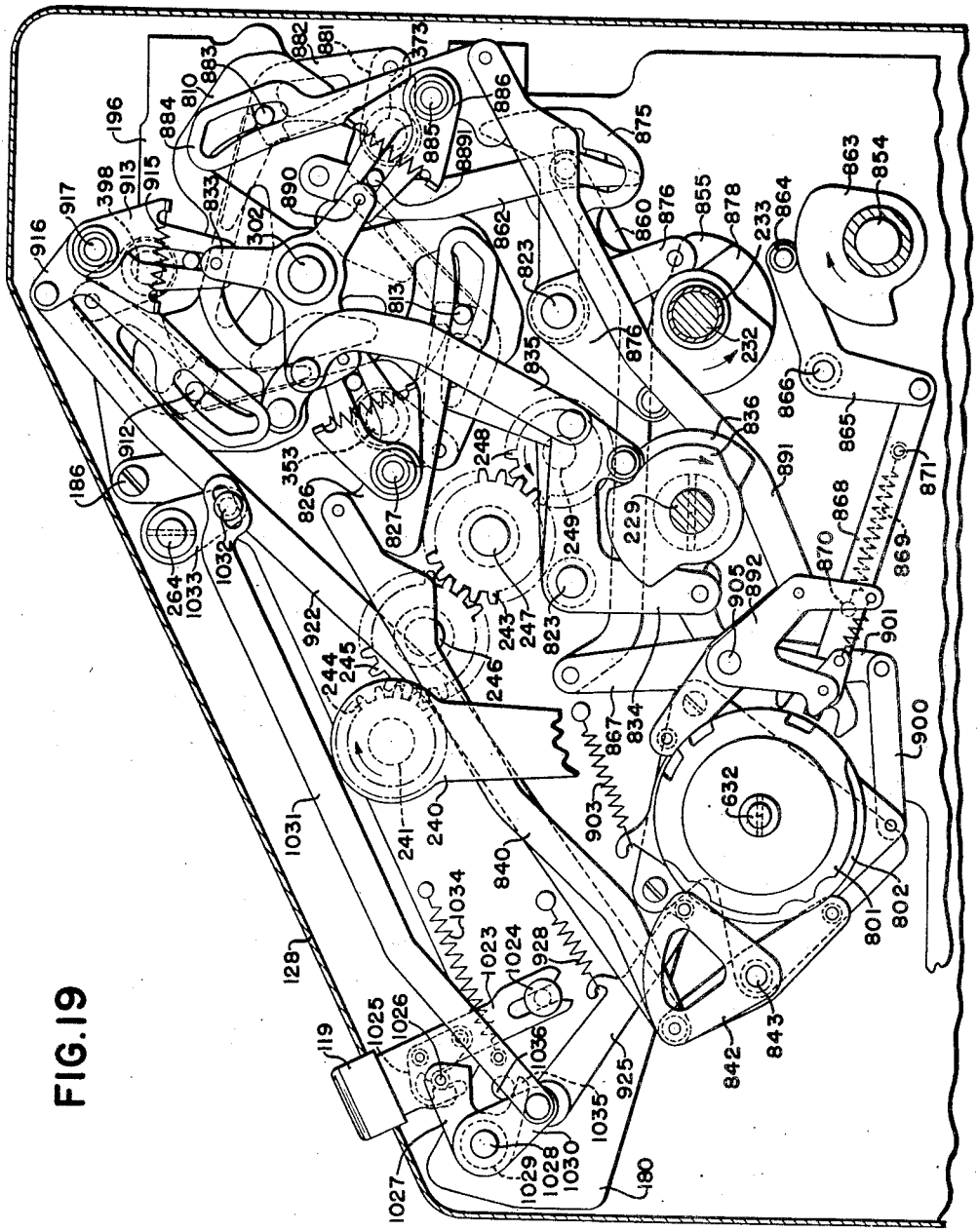
Fig. 19 is an elevational view, looking at the machine from the right side, and shows the totalizer-engaging and disengaging mechanisms, together with the hand operating mechanism for the machine.

After the keys and slides have been assembled into the keyboard, the keyboard frame is mounted on the side frames 180 and 181 (Fig. 7) at the front and rear thereof. To provide for such mounting of the keyboard frame in the machine, the flange 138 (Figs. 3, 4, and 5) is provided with a block 183, which is tapped to receive the threads of a screw 184 (Fig. 20), which passes through an opening in the side frame 181 and into the threads in the block 183. The key frame end plate 133 is provided with an extension to which a block 185 (Fig. 3) is secured and which is also tapped to receive a screw 186 (Fig. 19) to anchor the key frame to the right side frame 180 at its upper right-hand corner. The front keyboard plate 136 is bent at right angles at its left end and is provided with a block 187, through which threads are tapped to receive a screw 188 (Fig. 20) to anchor the lower left-hand corner of the key frame to the side frame 181. At its lower end, the end plate 133 is also provided with an extension through which a screw 189 (Fig. 35) is inserted, to anchor the lower right-hand corner of the keyboard frame to the right side frame 180.

Main framework

Figure 35:
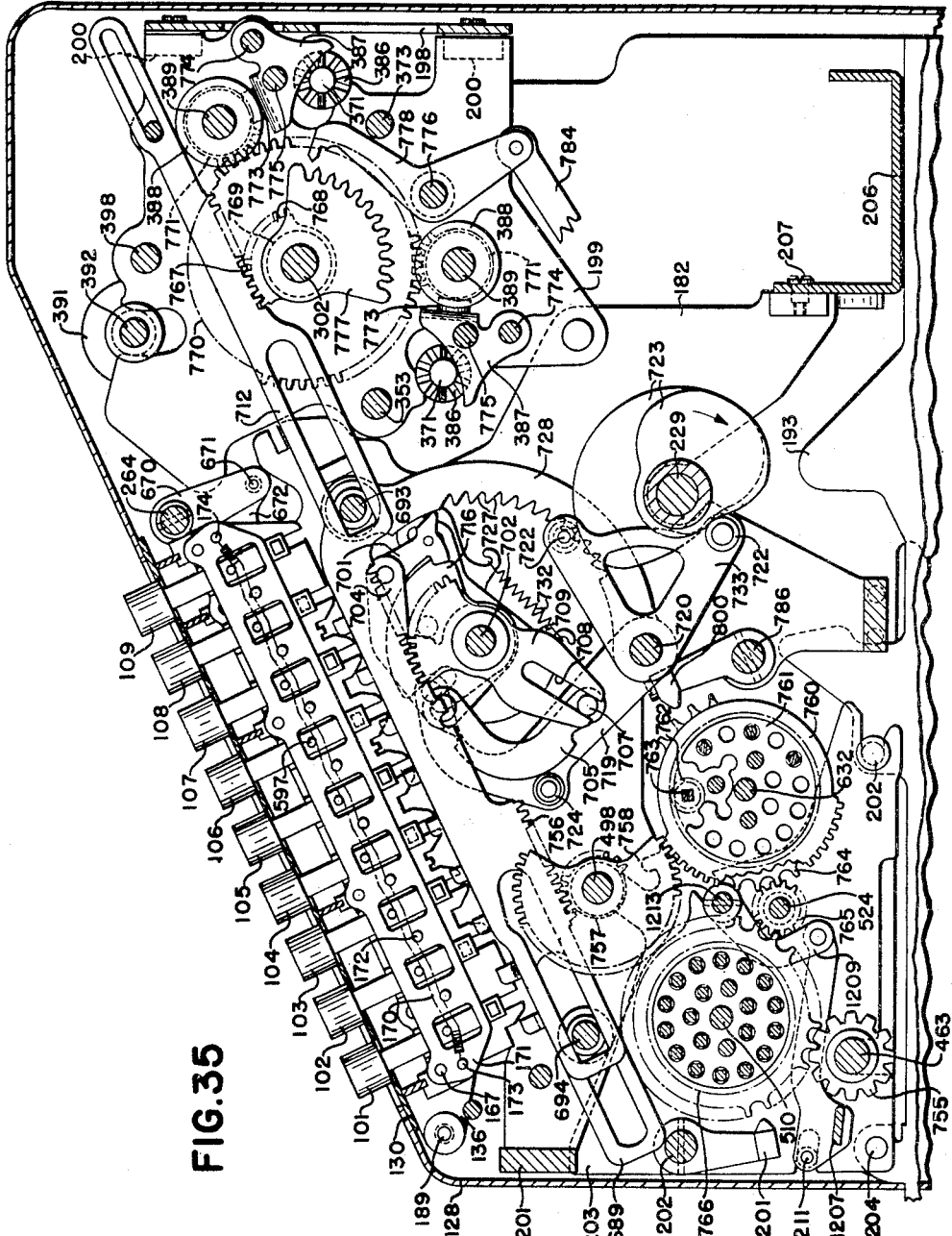
Fig. 35 is a sectional view taken just to the right of the second transaction bank and shows the second transaction bank differential mechanism and the connections for shifting the interspersed totalizers.

Fig. 7 illustrates the main frames of the machine. The left side frame 181 and the right side frame 180 are mounted on a base 190 having lugs 191 thereon. Located intermediate the frames 180 and 181 are a left printer frame 192 and a right printer frame 193 suitably secured to lugs on the base 190. Secured to the left side frame 181 is an auxiliary frame 194, which is provided with two blocks 195. Secured to the right side frame 180 is an auxiliary frame 196 provided with blocks 197. The blocks 195 and 197 are tapped to receive screws projecting through a back frame 198. Another auxiliary frame 199 is provided with blocks 200 threaded to receive screws passing through the back frame 198, by means of which the auxiliary frames 199 are supported on the back frame 198. A shouldered stud 202 (Fig. 20) is provided on each side of the printer frames 192 and 193, on one side of the left side frame 181 and on one side of the right side frame 180. Near the front of the machine, a series of six auxiliary plates 203 (Figs. 7, 20, and 35) are provided for supporting the type carrier and the setting mechanism. Each auxiliary plate 203 has, on its lower rear end, a slot which is adapted to straddle the small diameter of a shouldered stud 202 when the type carrier unit, which unit is separately assembled, is inserted into the machine. A cross bar 201 is provided with a series of six notches, into which the upper edge of each plate 203, as best shown in Fig. 37, is inserted. After the type carrier unit has been separately assembled, in the manner described hereinafter, the entire unit is placed in the machine by inserting the notches of the auxiliary plates 203 over the small diameters of the shouldered studs 202, sliding the upper edges of the auxiliary plates 203 into the notches in the cross bar 201, and inserting a shaft 204 (Fig. 20) through the right side frame 180, through all of the auxiliary plates 203, through the printer frames 192 and 193, and finally through the left side frame 181. Near the rear of the machine, a cross bar in the shape of a formed channel 206 (Figs. 7 and 35) is mounted between the side frames 180 and 181. The auxiliary frame 182 is formed at its rear end with a flatted surface, to which is welded a threaded block to receive a screw 207 to form a support for the auxiliary frame 182. Near the rear of the machine, at its right, a bracket 210 (Fig. 8) is secured to the right side frame 180 by means of four screws 211. The bracket 210 is provided with a forwardly-extending ear 212 to support a cam shaft 213, forming one of the main shafts for driving the mechanism of the machine. The bracket 210 is also provided with a slot 214 for supporting the shaft 215 of an electric motor 216, which motor is one means for operating the machine. The motor 216 is carried by the cross bar 206 (Figs. 7 and 35).

*Machine driving mechanism*

Figure 14:
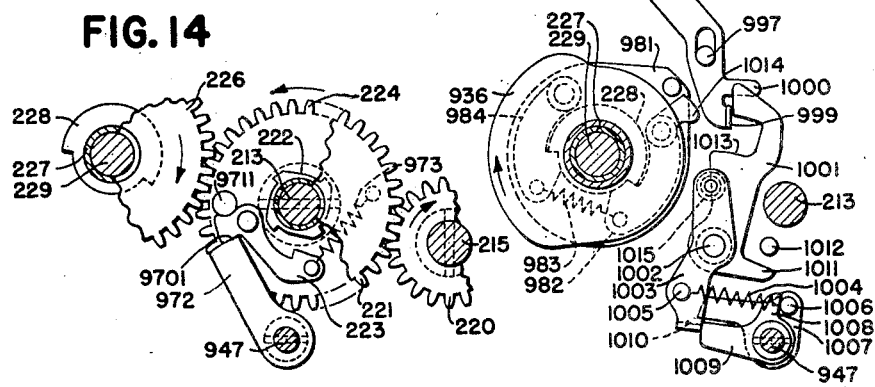
Fig. 14 is a detail view of the clutch mechanism for starting the machine in operation.

The machine may be operated by an electric motor or by a hand crank. The motor shaft 215 (Fig. 8) has secured thereon a gear 220, which meshes with a gear 221 (Figs. 8, 13, and 14), loosely mounted on the cam shaft 213. Secured to the gear 221 is a clutch member 222, with which a clutch pawl 223 engages when the machine is released for operation. The clutch pawl 223 is pivotally mounted on a gear 224 secured to the shaft 213. The shaft 213 (Fig. 13) is supported at one end by the ear 212, on the motor bracket 210, and at the other end by a bearing 225 in the right side frame 180. Also meshing with the gear 224 is a gear 226 (see also Fig. 22) secured to a sleeve 227, which is mounted to rotate on a cam shaft 229 and upon which are mounted two pairs of cams 723 for operating the first and second transaction differential mechanisms. Also secured on the sleeve 227 is a clutch member 228 (see Figs. 13 and 14), which is controlled to operate the cam shaft 229 selectively in accordance with certain types of operation of the machine to be described later. The shaft 229 also has fast thereon certain cams, to be described later, and a gear 230 (Figs. 8, 13, and 22). The gear 230 meshes with a gear 231 mounted on a sleeve 233 carrying cams for operating certain mechanisms of the machine, which sleeve is mounted to rotate on a stud 232 carried by the right side frame 180.

A centrifugally-operated speed control device to regulate the speed of the motor is provided to prevent damage to the machine parts due to excessive speed. This device is indicated generally by the reference numeral 217 in Fig. 53 and consists of a switch blade which is normally in closed position and is moved to open position to open the circuit through the motor when the motor attains a greater speed than a predetermined speed. The switch operating means is mounted on the armature shaft 215 in the usual manner.

If desired, the machine may be operated by the hand crank 240 (Figs. 13 and 19), which is slidably mounted on a stud 241 on the right side frame 180. When it is desired to operate the machine by the hand crank, the handle 240 is slid endwise on the stud 241 to engage it with a hub 242, also rotatably mounted on the stud 241. Secured to the hub 242 is a gear 244, meshing with an intermediate pinion 245, rotatably mounted on the right side frame 180. Meshing with the pinion 245 is a gear 246 rotatably mounted on a stud 247 supported in the right side frame 180. Meshing with the gear 246 is a gear 248 secured to the end of a shaft 249 rotatably mounted in a bearing 250 carried by the right side frame 180. Also on the shaft 249 is a gear 251 (Figs. 8 and 13) meshing with the before-mentioned gear 226 (see also Fig. 14).

Rotation of the hand crank 240, through the train of gears 244, 245, 246, and 248, the shaft 249, and the gear 251, rotates the gear 226 in the same manner as described in the description of these connections as driven by the motor shaft 215. In a hand operation, the clutch pawl 223 ratchets idly over the ratchet teeth of the clutch member 222.

*Amount key banks*

Each bank of amount keys includes a full complement of nine keys 100 (Figs. 1, 2, 20, 22, and 23). Coacting with each bank of amount keys are four control members including a flexible detent 260, a zero stop actuating plate 261, a locking detent 262, and an interlocking plate 263 that provides a means for preventing the release of the machine by the depression of certain control keys after an amount key has been depressed. The manner in which the four plates 260 to 263 inclusive are operated will be described hereinafter.

In assembling the key banks, the four control members 260, 261, 262, and 263 are first inserted into the keyboard frame by being inserted through suitable openings in the front plate 136 and between four rows of rods 259, which extend between the partition plates 140 so as to extend across the entire keyboard, on which rods the four control members of each bank of keys slide. Each control member 260, 261, 262, and 263 is provided with a slot in line with each key shank 100. After the four control members are inserted into the keyboard frame, the keys 100 are inserted through openings 152 (Fig. 3) in the top plate 130, through the slots 153 in the upper guide plate 149, then through the slots in the control members, and through appropriate slots in the bottom plate 147 of the keyboard frame. By reference to Figs. 22 and 23, it will be observed that the key shanks of the keys 100 are in staggered alinement, and the slots in the keyboard frame and the control members are arranged to register with the key shanks when the keys are inserted into the key frame. After the keys 100 for each digit are assembled into the keyboard frame, a rod 258 is inserted through the keyboard frames and through slots in the keys.

The rear end of each key is notched, as shown in Fig. 23, to receive the spring 145, which spring stretches across the keyboard frame from right to left, as viewed in Fig. 22, and from the front of the machine, in the manner hereinbefore described. The rods 258 limit the upward and downward movements of the keys 100.

Rotatably supported in the flange 138 of the back frame 131 of the keyboard frame, and by the end plate 133 of said keyboard frame, is a machine release shaft 264 (Fig. 23), which carries a series of arms 265 and 266, one for each bank of keys 100. The arms 265 are pinned to the shaft 264, and the free ends of each arm 265 project into a suitable slot in the locking detent 262.

Also mounted on the shaft 264 is a yoke 267, which is engaged by two ears of each arm 266. The free end of each arm 266 projects into an interlocking plate 263. After the control members 260, 261, 262, and 263 have been assembled into the keyboard frame, the shaft 264, together with the arms 265 and 266 and the yoke 267, is assembled in the keyboard frame.

Mounted near the front of the keyboard frame on the ears 143 of the plates 140 is a zero stop control shaft 270, on which the zero stops 271, one for each amount bank, are pivotally mounted. The upper end of each zero stop pawl 271 has a finger projecting into a slot of its associated zero control plate 261. Also pivotally carried by the shaft 270 is a yoke 272, which normally engages the tails on the forward extensions of the zero stop pawls 271, by which the zero stop pawls are controlled, in the manner described hereinafter.

The flexible detent 260 (Figs. 20, 22, 23, and 24) is normally held with its slots, through which the amount keys 100 project, in engagement with a cam edge formed on each key, by a spring 280. When an amount key 100 is depressed to the position shown in Figs. 23 and 24, the flexible detent is first cammed toward the left, and, after a shoulder at the end of the cam edge of the key passes out of the slot in the flexible detent, the spring 280 moves the detent 260 to the right to position the detent over the top of the shoulder on the key, to hold the key in its depressed position. Depression of another key in the same bank will cause its appropriate cam shoulder to again cam the flexible detent 260 toward the left to withdraw the detent from engagement with the shoulder of the depressed key to its undepressed position. At the same time, the flexible detent moves over the top of the shoulder of the second depressed key to lock it in its depressed position. Near the end of the machine operation, the arm 265 on the shaft 264 receives a clockwise movement to engage the end of the flexible detent 260 and shift it toward the left (Fig. 23) to release the depressed key 100. The mechanism for rocking the shaft 264 and the arm 265 is described hereinafter.

The locking detent 262 (Figs. 20, 22, and 23) is provided to prevent depression of an amount key after the machine has been released for operation, and also to prevent accidental release of said key during said machine operation. To obtain these results, each amount key 100 is provided with a forwardly-extending square shoulder, which is normally just above the locking control detent 262. The slot in the locking control detent 262 is wide enough to permit any key in the bank to be depressed. After the key is fully depressed and the machine is released for operation, the arm 265 moves the locking detent to the right (Fig. 23), thus moving the locking control detent 262 over the square shoulder near the bottom of the key, to the position shown in Fig. 23. Simultaneously, therewith, the locking control detent 262 is moved beneath the square shoulders of all of the undepressed keys 100, thus preventing any undepressed key from being depressed after the machine has been released for operation. The mechanism for rocking the arm 265 is described hereinafter.

After all the keys 100, the control members 260, 261, 262, and 263, the shafts 264 and 270, together with the arms on the shaft 264, and the zero stop pawls 271 are assembled into the keyboard frame, together with the two control banks of keys and their control slides, the entire keyboard unit is assembled into the machine in the manner described hereinafter.

Amount differential mechanism

Located beneath each bank of keys 100 (see Fig. 22) in a position midway between the staggered keys, and so as to be controlled thereby, is a differential actuator slide 290. Each actuator slide is suitably slotted to be supported by, and slide on, two cross bars 291 and 292 (Figs. 20 and 23 to 28) suitably supported in the machine framework. The slide 290 is provided with eight projections along its top edge, having flanges 295 bent at right angles thereto, and alternately to the right and left, into alinement with the shanks of the keys 100. The flanges 295 are so located on the slide 290 that they are controlled by the digit keys 1 to 8, respectively. The slide 290 is provided with a stop surface 296 near its front end, which engages the cross bar 291 to arrest the slide 290 in its "9" position. When no amount key is depressed, a flange 297 on the zero stop pawl 271 moves into the path of a flange 298 on the slide 290 to arrest the slide 290 in zero position, which zero position is one step from the home position of the slide. Thus the flanges 295 and 298 and the surface 296 provide means to selectively and differentially arrest the slide 290 in any one of ten positions out of its home position, the position to which the slide 290 is moved depending upon whether or not a key has been depressed, or which key has been depressed. Thus it is clear that the differential slide 290 is capable of assuming any one of eleven positions; that is, a home position and ten positions of adjustment.

The slide 290 is provided near its rear end with teeth 300, meshing with a differential segment 301, rotatably mounted on a shaft 302 supported by the framework of the machine. Secured to the segment 301 is an actuator-supporting member 303 (see also Figs. 33 and 34); slidably mounted on the actuator-supporting member 303 are three actuator racks 304, 305, and 306, each located to be engaged by the totalizer wheels to be described later.

Upon operation of the machine with an amount key 100 depressed, the actuator slide 290 moves a distance commensurate with the value of the depressed key and, through the teeth 300, rocks the segment 301 and the actuator-supporting member 303 a like distance. This sets the actuator racks 304, 305, and 306 an extent representing the value of the depressed key. After the actuators have thus been set, one or more of the totalizers are engaged therewith, and the slide 290 is thereafter returned to its home position. In returning to home position, the segment 301 and the actuators 304, 305, and 306 are rotated backwardly a number of steps corresponding to the value of the depressed key, thus entering said amount in whichever totalizer or totalizers have been engaged therewith. After this amount has been entered therein, the totalizers are disengaged from the actuators.

The timing of movement of the differential slide 290 is controlled by a leading frame including a universal rod 310 (Figs. 20, 22, and 23 to 28). A spring 307, secured to the slide 290 at one end, and to a cross plate 308 at its other end, supported by the machine framework, normally maintains a shoulder 309 of the differential slide 290 against the universal rod 310. The rod 310 is supported by four arms 311, as best shown in Fig. 22, secured to a shaft 312. Also secured to the shaft 312 are two cam follower arms 313 (see also Fig. 21), each having two rollers 314 coacting with a pair of plate cams 315 secured on the main cam shaft 229.

During the operation of the machine, the cam plates 315 rotate clockwise (Fig. 21) to rock the arm 313 first clockwise and then counter-clockwise to move the rod 310 first to the right (Fig. 20) and then back to the left. When the rod 310 moves toward the right, the spring 307 moves the differential slide 290 toward the right until the slide is arrested by a flange 295 thereon coming into contact with a depressed key 1 to 8, or the surface 296 engages the cross bar 291 in the "9" position, or the zero stop pawl 271 arrests the slide in zero position, whereupon the rod 310 completes its rearward movement. Near the end of the machine operation, when the rod 310 is restored to its home position by the cams 315, the rod 310 picks up the differential slide 290 and restores it to its home position, which position is one step beyond its zero position. During this return, or movement toward home position, the differential slide 290, through the connections described above, rocks the actuator racks 304, 305, and 306 backwardly a number of steps commensurate with the value of the depressed key, thus entering the amount into the totalizer wheels which were engaged therewith.

A spring-actuated member 316 (Fig. 20) is pivotally mounted on a shaft 333 to balance the load exerted by the differential springs 307. When the differential slides are released, they have a tendency to move too fast. The member 316 offsets this action by retarding the movement of the universal rod 310, by cooperation with the roller 318 on the arm 311.

One object of mounting the actuator racks 304, 305, and 306 slidably on the member 303 is to permit relative movement thereof for entering tens transfers, when needed, in a manner to be described hereinafter.

Another object of mounting the actuator racks 304, 305, and 306 slidably on the member 303 for relative movement thereof is to compensate for the movement of the differential slide 290 while it moves from its normal or home position into its zero position. The actuator rack 304 (Fig. 33) is provided with two studs 410 projecting into slots 409 in the member 303. When in home position, the studs 410 are located midway between the ends of the slots 409. A spring 411, stretched between the actuator 304 and the member 303, tends to move the actuator 304 toward the right-hand ends of the slots 409 but is arrested by a stud 412 engaging the end of an arm 413, described later. When the differential slide begins its differential movement from its home position, the member 303 rocks clockwise (Fig. 33), but the actuator 304 is restrained from taking part in this initial movement of the member 303 by the spring 411. When the member 303 moves to a position corresponding to the zero position of the differential slide 290, the right-hand ends of slots 409 are in engagement with the studs 410, and thereafter the actuator rack 304 partakes of any further movement of the member 303.

Zero stop mechanism

A zero stop pawl 271 is provided for each amount differential to arrest the differential slide 290 in the zero position, in the event no amount key is depressed. This zero stop pawl 271 is normally in an ineffective position; that is, the flange 297 thereon is normally out of the path of the flange 298 (Fig. 26) of the differential slide. The yoke 272, mounted on the shaft 270, normally maintains the pawl 271 in said ineffective position by engaging a forwardly-extending toe on the zero stop pawl 271. The yoke 272 is maintained in its normal position by an arm 320 (Fig. 32) loosely mounted on the shaft 270 and having two toes 321 straddling the yoke 272 near its center. The lower end of the arm 320 has mounted thereon a stud 322, which projects into a notch in the forward end of a slide 323 bifurcated to engage and slide on the cross bar 291. The rear end of the slide 323 is pivoted to a bell crank 324 pivoted on a shaft 333, said bell crank having a rearwardly-projecting arm 325 carrying a stud 326 projecting into a notch in the forward end of a lever 327. The lever 327 is provided with a roller 328, which is normally held in engagement with a cam 329 (see also Fig. 22) by a spring 330 stretched between one arm of the bell crank 324 and a stud on the lever 327. The cam 329 is secured to the main cam shaft 229.

Near the beginning of the operation of the machine, when the main cam shaft 229 and the cam 329 rotate clockwise (Fig. 32), the spring 330 rocks the lever 327 clockwise. This movement of the lever 327, through the bell crank 324, shifts the slide 323 to the left (Fig. 32), thus rocking the arm 320 and the yoke 272 clockwise. Clockwise movement of the yoke 272 permits the zero stop pawl 271 to be rocked by a spring 331, to position its flange 297 into the path of the flange 298 on the differential slide 290. The spring 331 is stretched between one end of the zero stop control plate 261 and the keyboard front plate 136. When no key is depressed, the plate 261 is free to move in the manner described later. When the differential slide 290 is released by movement of the universal rod 310, the flange 297, having been moved into the path of the flange 298, arrests the differential slide 290 in zero position. The cam 315 starts the slide 290 moving immediately the zero stop pawl is positioned in its effective position.

During an operation of the machine with an amount key depressed, the zero stop control plate 261, coacting with the depressed key, prevents the zero stop pawl 271 from moving into its effective position at the time the yoke 272 is actuated.

By reference to Fig. 26, it can be observed that the slot in the zero stop slide 261, through which the amount key 100 projects, is long enough to permit free movement of the key 100 therein, without affecting any movement of the zero stop control plate 261. However, when a key 100 is depressed, as shown in Fig. 23, the upper shoulder on the depressed key 100 moves into position to engage the left wall of the slot in the control plate 261 to prevent any movement of the zero stop control plate 261. The upper end of the zero stop pawl 271 has a toe projecting into a notch in the zero stop control plate 261, and therefore the zero stop pawl cannot move when released by the yoke 272 whenever a key 100 is depressed and blocks movement of the plate 261. Therefore, when an amount key is depressed and the plate 261 cannot move, the zero stop pawl 271 is maintained in its ineffective position at the time the yoke 272 is moved by its cam 329 (Fig. 32). Under these conditions, the yoke 272 rocks back and forth idly in the space between the toe on the zero stop pawl 271 and its upstanding arm (see Fig. 24).

When no key is depressed in the amount bank, the zero stop control plate 261, not being blocked by any key, is free to move to the right (Fig. 23) when the yoke 272 is rocked. Clockwise rocking movement of the yoke 272 permits the plate 261 to be so moved by the spring 331 connected to one end of the slide. Since the plate 261 can now be moved by the spring 331, the zero stop pawl 271 is rocked clockwise at the beginning of the machine operation to lower its flange 297 into the path of the flange 298 on the differential slide 299.

From the above, it is clear that the zero stop pawl 271 is normally in its upper, or ineffective, position and is lowered into an effective position to arrest the differential slide 299, only when no key is depressed. Depression of the key 100 prevents movement of the plate 261 and therefore prevents the zero stop pawl 271 from moving into its effective position, thus permitting the differential slide to be moved under control of the depressed key.

The above arrangement is novel in that it places a minimum load on the amount keys. By moving the zero stop pawl by power supplied by the motor, the extra load usually required to move the zero stop pawl by depression of the amount keys is eliminated.

Totalizers

The machine as disclosed herein has eleven totalizers. The number of totalizers provided in a machine depends upon the business system in which the machine is to be used. As disclosed herein, the upper totalizer, also referred to herein as the "List" totalizer, consists of a single set of wheels, which may be visibly read through the openings 127 in the cabinet of the machine. The rear totalizers, also referred to herein as the "Transaction" totalizers, are what are known in this art as "interspersed" totalizers and accumulate items credited to the entries indicated by the legends on the keys 101 to 108 inclusive (Fig. 2). The front totalizers, also referred to herein as the "Batch" totalizers, consist of two interspersed totalizers, one for the "A" batch totals, and the other for the "B" batch totals. The "List" totalizer is a non-shifting totalizer, and therefore no shifting mechanism is required for selection. Since no shifting is required, totals may be taken from this totalizer in a single cycle of operation, as distinguished from the two-cycle total-taking operations, usual in this art.

The interspersed totalizers on the rear and front lines require shifting for selecting the proper totalizer into which amounts are to be added, or from which totals are to be taken. For this reason, the usual two-cycle operation is required for clearing the selected totalizer on the rear and front totalizer lines. Mechanism is provided which is hereinafter described for automatically controlling the machine for either one-cycle or two-cycle total-taking operations.

Front, or "batch," totalizer line

The Batch totalizer line comprises two interspersed totalizers consisting of totalizer elements 350 (Figs. 20, 33, 47, and 48). The totalizer elements 350 are rotatably mounted on a totalizer shaft 351. The shaft 351 is shiftably mounted in bearings carried by a pair of engaging arms 352 located adjacent the frame plates 104 and 109 (see also Figs. 7 and 12). The engaging arms 352 are mounted on a shaft 353 so as to rock thereon. Each arm 352 is provided with a cam slot 354. Engaging each cam slot 354 is a roller 355 carried by an arm 356 mounted on a stud 357, one carried by each side frame 104 and 109. Each arm 356 is also provided with a stud 358 projecting into an open slot in each arm 359 secured on the rock shaft 353. The rock shaft 353 is actuated during the machine operation in either adding or total-taking timing in a manner described hereinafter.

Figure 33:
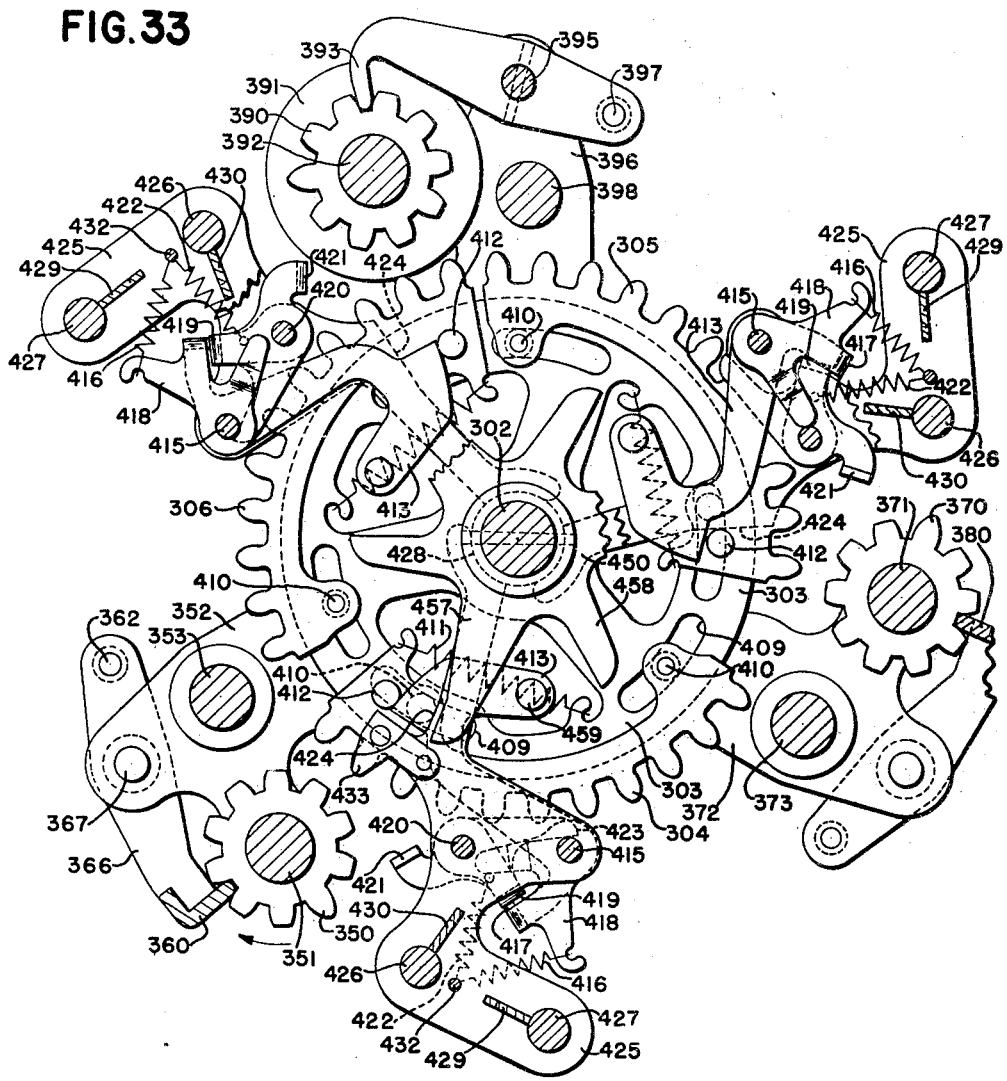
Fig. 33 is an enlarged detail view of the amount differential mechanism.

The shaft 351, together with the totalizer elements 350, is shifted endwise to properly aline one or the other of the two interspersed totalizers with the actuator racks 304 (Fig. 33). The manner in which the totalizer elements 350 are properly alined with the actuator rack 304 is described hereinafter.

Front, or "Batch," totalizer aliner

When the totalizer wheels 350 are in their disengaged positions, as shown in Fig. 47, an aliner 360, engaging between the teeth of the wheels 350, maintains the totalizer wheels against rotation. The aliner 360 is long enough to span the entire totalizer line and extends from the frame 104 to the frame 109. This aliner is in the form of a yoke, having a bail and two arms 365, each of the latter having a stud 362 projecting into a cam slot 361 of an engaging arm 359. Upon rocking of the shaft 353, the cam slots 361, engaging studs 362 on aliner arms 366, disengage the aliner 360 from the totalizer elements 350, after the totalizer elements are properly engaged with the actuator racks 304.

Rear, or "Transaction," totalizer line

The rear totalizer line includes eight sets of interspersed totalizer elements 370 (Fig. 12). A ninth totalizer is shown in Fig. 12 to illustrate the maximum number of totalizers which can be provided. However, the ninth totalizer is shown in the position corresponding to the "Add Print" key, which key, in the present disclosure, prevents the rear totalizer from becoming engaged with its actuators. Therefore, as disclosed herein, nothing will ever be entered into the ninth totalizer. Therefore, for the purpose of this description, it is assumed that only eight totalizers on the rear totalizer line are actually used, which is adequate for the application illustrated.

The engaging mechanism for the rear totalizer line is identical with that described for the front totalizer line. The totalizer elements 370 are mounted on a shaft 371 shiftably mounted in bearings in a pair of arms 372, rotatably mounted on a rock shaft 373. The arms 372 are provided with notches similar to the notch 354 (Figs. 47 and 48), with which rollers 375 (Fig. 12) of arms 376, similar to the arm 356 (Fig. 48), engage. The arms 376 are provided with rollers 378 (Fig. 12), similar to the rollers 358, which project into open slots in rocking arms 379 pinned to the shaft 373. When the shaft 373 is rocked in the manner described hereinafter, the cam arms 379, through rollers 378, rock arms 376, which, through rollers 375, rock the arm 372 to engage the totalizer wheels 370 with the actuator racks 305.

An aliner 380, similar to the aliner 360, is provided for the rear totalizer line and is operated by the arms 379 in like manner.

During the operation of the machine, the totalizer shaft 371 is shifted laterally in bearings of arms 372, under control of the transaction keys, to aline the proper set of totalizer wheels 370 with the actuators 305. Thereafter, the shaft 373 is given a rocking movement, by mechanism described hereinafter, to engage the selected set of totalizer elements 370 with the actuators 305 in the proper timing, so that either adding or total-taking operations may be performed in the selected totalizer.

Each totalizer shaft 351 and 371 has provided thereon a novel means for adjusting the totalizer elements in respect to the actuators 304 and 305, so that accurate alinement can be obtained. This novel construction is the same for both totalizer shafts, and therefore the mechanism is illustrated in connection with the rear totalizer line only. This mechanism is best disclosed in Fig. 12.

The left-hand end of the shaft 371 (Fig. 12) is provided with threads to receive an adjustable aliner member 381. The aliner member 381 consists of a castellated nut having aliner discs 382 thereon, arranged to engage alining slots 383 in an alining block 384 mounted on the left side frame 184. The right-hand end of the shaft 371 is threaded at 385 to receive an adjusting nut 386. A yoke 387 straddles the nut 386, and the yoke is differentially shifted sidewise by a drum cam 388 under control of the transaction keys, in a manner to be described hereinafter, to selectively shift the totalizer wheels 370 in relation to the actuators 305 for selecting a totalizer. When the totalizer shaft 371, together with the totalizer wheels 370, is assembled in the machine, the shaft 371 is adjusted endwise by the turning nut 386 to properly aline the selected set of totalizer wheels 370 with the actuator racks 305. Thereafter, a cotter pin 377 is inserted through notches in one face of the nut 386 and through an opening in the shaft 371. This holds the selected totalizer elements 370 in alinement in respect to the shifting drum cam 388. After the first adjustment has been made by means of the nut 386, aliner member 381 is properly adjusted to aline the aliner discs 382 with the aliner slots 383.

After the aliner member 381 properly alines the discs 382 with the slots 383 in accordance with the adjustment of the nut 386, a cotter pin 3901 is inserted through the notches in the aliner member 381 and through an opening in the shaft 371.

The novel arrangement including the two nuts 381 and 386 provides a fine adjustment for accurately alining the interspersed totalizer wheels 370 with respect to the actuator racks 305. The front totalizer shaft 351 is provided with a like adjusting feature whereby the two "Batch" totalizers may be accurately alined with the actuators 304.

Upper, or "list," totalizer

The upper, or "List," totalizer is a visible totalizer and has only one set of wheels; therefore it is not shifted laterally for selection. This totalizer is controlled for engaging the actuators 306 in add timing under control of the "List" key 112 or the "Add" key 113, and for engagement with the actuators 306 in total-taking timing by the sub-balance key 111 or the balance key 110.

The upper totalizer includes a plurality of totalizer wheels 390, each one of which has secured thereto an indicating or reading dial 391 (Figs. 2, 20, and 33). The totalizer wheels 390 are rotatably mounted on a shaft 392, and spacing collars between the wheels properly space them in relation to the actuators 306. The shaft 392 is carried by an arm 396 at each end thereof, similar to the arms 352 (Fig. 47). The shaft 392, together with the two supporting arms 396, is rocked to engage the totalizer wheels 390 with the actuator 306 by mechanism similar to that shown in Figs. 49 and 50.

An aliner mechanism including an aliner arm 393 (Fig. 33) for each totalizer wheel 390 is provided. The arms 393 are pinned to a shaft 395, supported by the rocking arms 396. The two end arms 393 (one shown in Fig. 20) are provided with rollers 397, which project into cam slots 399 in rocking arms 400 pinned on a rocking shaft 398. The rocking arms 400 are similar to the rocking arms 359 (Figs. 47 and 48).

At the proper time during the machine operation, the shaft 398 is rocked by mechanism described hereinafter to actuate arms 400 to thereby rock the totalizer arms 396 to engage the totalizer wheels with the actuators 306 and to disengage the aliners 393 therefrom. When the totalizer is again disengaged, the aliners are again moved into engagement with the totalizer wheels 390 to properly hold the totalizer wheels 390 in alinement so that upon a subsequent rocking movement into engagement with the actuators 306 the totalizer will engage the teeth thereof in proper relationship.

Tens transfer mechanism

Each of the three totalizer lines is provided with a tens transfer mechanism whereby "1" is carried to the next higher order wheel when a lower order wheel passes from "9" to "0." Inasmuch as the tens transfer mechanisms for all three of the totalizer lines are identical, only the one associated with the front totalizer will be described herein. The tens transfer mechanisms are shown in Figs. 20, 33, and 34.

The carry-over of one unit into the next higher order wheel is effected by permitting movement of the actuator rack 304 mounted on the differential plate 303 one step, in addition to the extent of movement that this actuator moves under control of the amount keys. This extra step of movement is relative to the actuator plate 303. The actuator rack is provided with two studs 410 projecting into slots 409 in the differential plate 303. A spring 411, connected to one end of the rack 304, tends to move the rack counter-clockwise as viewed in Fig. 33. When the differential plate 303 is in its normal position—that is, the position in which the plate 303 comes to rest after an operation of the machine—a stud 412 on the actuator 304 rests against the forward end of an arm 413, as shown in Fig. 33. When in this position, the actuator rack is in its home or normal position; that is to say, no transfer has been effected. When a tens transfer is to be effected, the arm 413 is rocked clockwise to withdraw its free end out of the path of the stud 412 to permit the actuator 304 to move one step farther, thus adding an extra unit in the totalizer element engaged therewith. This tripped condition is illustrated in Fig. 33 with reference to the rear totalizer rack 305.

Figure 34:
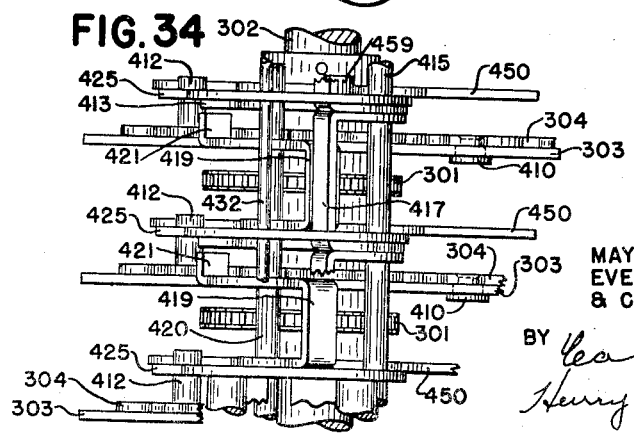
Fig. 34 is a detail view showing the tens transfer mechanism for the totalizers, looking from the under side thereof.

The front totalizer transfer mechanism is shown in side spacing in Fig. 34, as viewed from the under side thereof. In Fig. 34, the lower order is shown at the top, and the next higher orders are shown progressively toward the bottom. The arms 413 are mounted to pivot on a rod 415 carried by a plurality of frame members 425, one arm 413 and one frame 425 being provided for each order of the totalizer. A spring 416, connected at one end to the lower end of an arm 413 and at its other end to a rod 432 carried by all the frame members 425, normally maintains a flange 417, forming a yoke between the arm 413 and the arm 418, in contact with a yoke 419. The yoke 419 is carried on a rod 420, also supported by frame members 425. The forward end of the arm 413 is in the path of movement of the stud 412 on the actuator 304 when the flange 417 contacts the yoke 419. One arm of the yoke 419 is provided with a flange 421 projecting into the path of a long tooth of a totalizer wheel 350. The yoke 419 is spring-urged clockwise by a spring 422, stretched between one arm of the yoke and the rod 432, to maintain a tail 423 on one arm of a yoke 419 against the rod 415. When the totalizer wheel 350 is engaged with the actuator 304, and the actuator 304, traveling counter-clockwise, rotates the totalizer wheel 350 from its "9" position to its zero position, the long tooth on the totalizer wheel 350 strikes the flange 421 and rocks the yoke 419 counter-clockwise against the action of the spring 422. This counter-clockwise movement of the yoke 419 withdraws it from contact with the flange 417 and permits the spring 416 to rock the arm 413 clockwise out of the path of movement of the stud 412 on the actuator 304 for the next higher order. Thereupon, when the actuator plate 303 in the next higher order moves its associated actuator 304 to its home position, the actuator 304 moves one extra step to enter "1" in said next higher order wheel.

If the actuator 304 of the said next higher order wheel is in home position—that is, with the stud 412 against the free end of the arm 413—when the next lower order wheel 350 passes from "9" to "0" at the time the yoke 419 is moved out of contact with the flange 417, the arm 413 of the next higher order is moved out of contact with the stud 412. Thereupon, the spring 411 moves the actuator 304 one step, thus entering "1" in said next higher order wheel. When released to enter a unit in the said next higher order wheel, the rack 304 is limited in its movement of one step by engagement of the stud 412 with an edge 424 on its associated frame member 425.

The entire tens transfer mechanism for each totalizer is carried by the plurality of frames 425 so as to constitute a unit assembly which is separately assembled and thereafter inserted into the machine as a unit. Each frame member 425 is provided with an inwardly-extending arcuate foot 428, which rests on a sleeve on the shaft 302. At the outer ends, the frame members 425 are supported by rods 426 and 427.

Before mounting the frame members 425 on the rods 426 and 427, spacing bars 429 and 430 are inserted into position. These spacing bars 429 and 430 are notched to engage over each frame member 425. In assembling the spacing bars 429 and 430, they are inserted into the openings provided for the rods 426 and 427 and are slid into position over the frames. Thereafter, the rods 426 and 427 are inserted into the openings provided therefor and shifted into position, where they maintain the spacing bars against any movement, thus forming a completely assembled unit ready to be inserted into the machine. After the rods 426 and 427 are in position to maintain the transfer unit properly assembled, the unit is inserted into the machine with the arcuate feet 428 resting against the sleeve on a rod 302. The ends of the rods 426 and 427 are tapped to receive screws which project through holes in the frames 184 and 183, and into said tapped ends of the rods 426 and 427, to maintain the tens transfer unit assembly firmly in position.

Secured to each of the frame members 425 is an aliner bar 432 to maintain all of the totalizer wheels 350 which are not engaged with an actuator rack against rotation. A space is provided at the point of engagement with the actuator 304 to permit free rotation of the engaged totalizer wheel 350.

*Tens transfer restoring mechanism*

Immediately after the amounts, including the tens transfers, have been entered into the totalizer, the totalizer wheels are disengaged from the actuators, and thereafter all the tripped tens transfer arms 413 and actuators 304 are restored to their normal positions.

Figure 53:
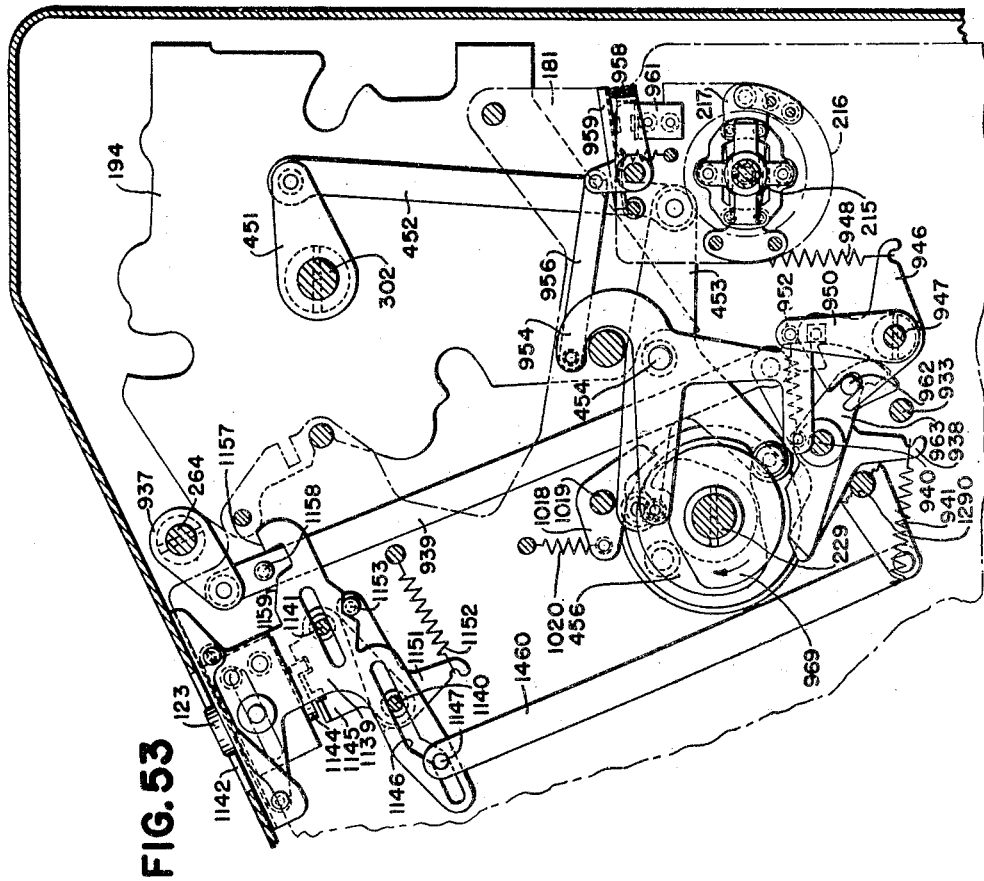
Fig. 53 is a sectional view, taken just to the right of the left side frame of the machine, and shows the locking control slide, the consecutive number mechanism, the date-setting mechanism, and certain of the machine release mechanisms.
Figure 52:
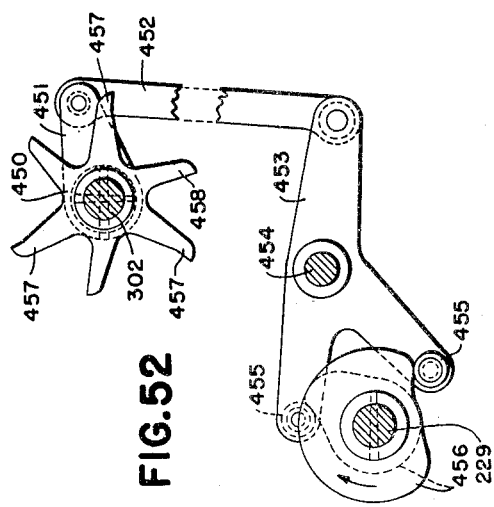
Fig. 52 is a detail view of the mechanism for restoring the tripped tens transfer mechanism.

The normal position of the restoring mechanism is shown in Figs. 20, 52, and 53, and the position which it assumes at the time the tens transfers are entered is shown in Fig. 33.

The means for restoring the tens transfer mechanism and the actuators 304 comprises a multi-armed plate 450 for each order of the totalizer. All of the plates 450 are pinned to the shaft 302, together with an arm 451, which has pivoted thereto the upper end of a link 452. The lower end of the link 452 is pivoted to an arm 453 pivotally mounted on a stud 454 carried by the left side frame 181. The arm 453 is provided with two anti-friction rollers 455 coacting with a two-plate cam 456 pinned on the main cam shaft 229 near the left end thereof and adjacent the left side frame 181.

At the beginning of machine operation, the cams 456 rock the arm 453 slightly counter-clockwise, thus raising the link 452 and rocking the multi-armed plates 450 counter-clockwise to the position shown in Fig. 33. When the plates 450 are in this position, the tens transfers may be freely entered into the totalizer wheels. After the amounts have been entered into the totalizer wheel and the appropriate tens transfers have been entered, the totalizer is disengaged from the actuators. Immediately thereafter, the cams 456 rock the arm 453 clockwise. This clockwise movement of the shaft 302 rocks the multi-armed plate 450 clockwise to cause an arm 457 thereon to engage the stud 412 of the rack 304 to restore the rack to its normal position. A second arm 458 of the multi-armed member 450 engages a stud 459 on the transfer arm 413 and restores it to its normal position, whereupon the yoke 419 is restored to its normal position by its spring 422 to maintain the transfer arm 413 in its normal position. After all the tripped transfer pawls have been restored, and near the very end of the machine operation, the cams 456 again rock the arm 453 counter-clockwise, thus rocking the shaft 302 counter-clockwise to position the multi-armed plate 450 into the position shown in Fig. 20.

Two arms like the arms 457 and 458 are provided on the multi-armed plate adjacent the upper and back totalizer lines to restore the actuator racks 305 and 306, together with their tripped transfer members, in the same manner as described hereinbefore.

The above-described tens transfer restoring mechanism is timed to operate so that the tens transfer tripping arms 413 are always in their cocked positions when the machine comes to rest; that is to say, in a position ready to be tripped during the next machine operation. The restoring movement takes place near the end of the operation in which the tens transfer arms 413 are tripped. In this respect, the tens transfer restoring mechanism differs from the usual tens transfer restoring mechanisms, which in the prior art are usually restored at the beginning of the succeeding operation. This timing of the restoration of the tens transfer arms 413 becomes important when a single-cycle total-taking operation is made, as will become apparent hereinafter.

*Amount type setting mechanism*

To provide for printing the amounts entered into the totalizers on the deposit slip, the audit tape, and the issuing tape, three groups of type elements are mounted on shafts 463, as shown in Figs. 67A and 67B. A shaft 463 is supported in bearings carried by each pair of auxiliary plates 283, so as to provide a separate group of type wheels for each printer section. Each amount type wheel (the tens order type wheel 465 being shown in Fig. 20) is adjusted in accordance with the amount entered into the totalizer by the amount differential mechanism. The amount differential mechanism controls the setting of a slide 466 (Figs. 20 and 23 to 28 inclusive). The slide 466 is slotted to be supported by the cross bars 291 and 292. The slide 466 is adjusted during each operation to represent the number entered into the totalizer and remains in the set position until readjusted during the next succeeding operation. During each operation, when the universal rod 310 is rocked clockwise around the shaft 312 to release the differential member 290, the universal rod 310 strikes a surface 467 on the slide 466 and moves it to the right (Fig. 28) into a position which will be hereinafter referred to as the "eliminated" position. The term "eliminated" position is applied to the position that the slide 466 occupies when the type wheel 465 (Fig. 20) is in the zero eliminated position; that is, in a position in which a blank position on the type wheel is at the printing line. After the differential slide 290 has been adjusted differentially under control of the amount keys 100 or the zero stop pawl 271, as hereinbefore described, and after the slide 466 has been moved to its "eliminated" position, the two slides are coupled together by a coupling arm 468 pivoted to the slide 466 by a stud 469. The coupling arm 468 is provided with two coupling teeth 470 (see also Fig. 31), which teeth engage with teeth on the lower edges of the slide 290. Normally the teeth 470 are in engagement with the teeth on the slide 290, but, before the universal rod moves, the teeth 470 are withdrawn from engagement with the slides 290, so that the slides may be adjusted independently of each other. After the slides 290 and 466 assume their new positions, the coupling arm 468 is rocked clockwise to again couple the two slides together. After the slides have been coupled together, the universal rod 310 is rocked counter-clockwise, whereupon the rod 310 picks up the differential slide 290 from the position into which it was adjusted, and returns it to its normal position in a manner described hereinbefore. During this movement, the type-adjusting slide 466, being coupled to the differential slide 290, is moved from its "eliminated" position into a position corresponding to the amount entered into the totalizers by the differential slide 290.

The disengagement and the reengagement of the coupling arm 468 are effected by a cam arm 471 (Fig. 31) mounted on the shaft 333. The cam arm 471 is provided with a cam slot 472, into which projects a universal rod 473 extending across the machine so as to project into a cam slot 472 in an arm 471 for each amount differential mechanism. The universal rod 473 is carried by three arms 474 pivotally mounted on the shaft 332. Near the center of the machine and adjacent the middle arm 474 is an arm 475 (see also Fig. 30) bifurcated at its upper end to engage the universal rod 473. A coupling pawl 476 is pivoted to the arm 475 by a stud 477 (Fig. 30) having a nose 478 lying in the path of a shoulder 479 (Fig. 31) of an arm 480, sleeved to a bell crank 481. The bell crank 481 is provided with two rollers 482, which are in contact with a pair of cams 483 mounted on the main cam shaft 229 (see also Fig. 22).

When, during the operation of the machine, the main cam shaft 229 is rotated clockwise (Fig. 31), the cams 483, coacting with the rollers 482, rock the bell crank 481 first counter-clockwise and then clockwise. During the counter-clockwise movement of the bell crank 481 and the arm 480 sleeved thereto, the shoulder 479 on the latter engages the nose 478 of the pawl 476 and rocks the arm 475, the shaft 332, and the universal rod 473 counter-clockwise, which, acting on the cam slot 472, rocks the arm 471 clockwise. Clockwise movement of the arm 471 brings a finger 484 thereon into contact with a stud 485 on the coupling arm 468 and rocks the coupling arm 468 clockwise to disengage the teeth 470 from engagement with the corresponding teeth on the differential slide 290. After the differential slide 290 has been adjusted under control of the amount keys, or the zero stop pawl, and the type setting slide 466 has been moved to its "eliminated" position, the cams 483 rock the bell crank 481 and the arm 480 clockwise and, acting through a finger 486 on the arm 480, engage the universal rod 473 and restore it clockwise to the position shown in Fig. 31. This movement of the universal rod 473, acting on the cam slot 472, raises the arm 471 and, through the stud 485, reengages the teeth 470 with the teeth on the under sides of the differential slide 290.

After the coupling arm 468 is reengaged with the slide 290, the universal rod 310 restores the differential slide 290 to its home position. Inasmuch as the two slides are coupled together by the coupling arm 468 at the time the slide 290 is restored to its home position, the amount type setting slide 466 is moved into a position represented by the amount entered into the totalizer.

Each arm 474 is provided with a tail 487, which normally engages a rod 488 to maintain the arms 474 and the universal rod 473 in home position.

By referring to Fig. 26, it will be noted that the edge 490 of the arm 471, which normally supports the stud 485, lies in a plane parallel with the movement of stud 485, thus permitting free movement of the stud 485. When the arm 471 is in its moved position, as shown in Fig. 27, the lower edge 489 of the finger 484 is in a plane to permit free movement of the stud 485. In either of the two positions of the arm 471, the respective edges 489 and 490 maintain the pawl in disengaged, or engaged, position through their entire movement. Thus the edges 489 and 490 provide a locking means for locking the coupling arm 468 in either its engaged position or its disengaged position.

In order to better point out how the amount type setting slide is adjusted during an operation of the machine, reference may be had to Figs. 20, 26, 27, and 28, where the movements of the various parts are shown during the operation in which nothing is entered into the totalizer wheel. The normal position of the differential mechanism is shown in Figs. 20 and 26. When the machine is operated without an amount key depressed, the zero stop pawl 271 controls the positioning of the differential slide 290. At the very beginning of this operation, the universal rod 473 is rocked counter-clockwise to disengage the coupling arm 468 from the slide 290, and the zero stop pawl 271 is lowered into the path of the flange 298, as shown in Fig. 27. Upon movement of the universal rod 310, the differential slide 290 is released to the action of the spring 307 and is moved until the flange 298 thereon engages the flange 295 on the zero stop pawl. This arrests the differential slide 290 while the universal rod continues to move clockwise. This condition is shown in Fig. 27. Upon further movement of the universal rod 310, the rod engages the surface 467 on the type setting slide 466 and moves the latter to the "eliminated" position, shown in Fig. 28. After the type setting slide 466 is positioned in its "eliminated" position, the coupling arm 468 is again rocked into engagement with the teeth on the differential slide 290, as shown in Fig. 28. During the return movement of the universal rod 310, the major part of its initial movement is idle, and, when it strikes the shoulder 309 on the differential slide 290, it picks up this slide and returns to its home position. During this movement, the amount type wheel setting slide 466 is adjusted the same extent that the differential slide 290 was moved out of its home position, because during this setting movement the two slides are coupled together by the coupling arm 468. Since the differential slide 290 in the operation being described is moved one step out of its normal position into its zero position, the amount type setting slide 466 is moved one step from its "eliminated" position into its zero position.

The setting of the type setting slide 466 for setting up a "5" is illustrated in Figs. 23, 24, and 25. If the machine is operated with the "5" key depressed, as shown in Fig. 23, after the coupling arm 468 has been disengaged from the teeth in the slide 290, the differential slide 290 moves to the right until arrested by the depressed "5" key, as shown in Fig. 23. Upon further movement of the universal rod 310, it engages the surface 467 of the slide 466 and moves it into the position shown in Fig. 24, where the amount type wheel setting slide 466 is shown in its "eliminated" position, and the amount differential slide 290 is in its "5" position. After this setting has been completed, the coupling arm 468 is raised by the universal rod 473 to the position shown in Fig. 24. After the coupling arm 468 has been engaged with the slides 290, the universal rod 310 is restored to its normal position and during this movement engages the shoulder 309 on the differential slide 290 and moves the differential slide back to its home position. During this movement, the two slides, being coupled together by the coupling arm 468, are moved together, and the slide 466 receives the same extent of movement as the differential slide 290, which is equal to six steps, thus moving the type setting slide 466 from its "eliminated" position into the "5" position, as shown in Fig. 25.

At the end of the machine operation, the coupling arm 468 remains in engagement with the teeth on the slide 290 until uncoupled during the first part of the next machine operation. Advantage is taken of this condition for repeat operations in a manner to be described hereinafter.

The tens order type wheel 465 (Fig. 20) in each group of type wheels shown in Figs. 67A and 67B are adjusted by the type setting slide 466 in a manner now to be described. The amount setting slide 466 is provided with teeth 496 (Figs. 20 and 23 to 28 inclusive), which engage with a pinion 497 rotatably mounted on a shaft 498 (see also Fig. 67B). Connected to the pinion 497 by a hub 499 is a segment 500. The segment 500 meshes with a ring gear 501. The ring gear 501 is provided with internal teeth 502, meshing with a pinion 503 on a square shaft 504.

The square shaft 504 extends through all of the ring gears, as shown in Figs. 67A and 67B. Located in alinement with each type wheel 564 for the three groups of type wheels are ring gears 505, 506, and 507. Mounted on the square shaft 504 in alinement with each of the ring gears 505, 506, and 507 is a pinion similar to the pinion 503 (Fig. 20), which meshes with internal teeth of the ring gears 505, 506, and 507. Each ring gear 505, 506, and 507 is provided with teeth 508, which mesh with tooth-like notches in the type wheels 465 whereby the type wheels are adjusted an extent equal to the adjustment of its corresponding ring gear.

From the above it is apparent that adjustment of the type setting slide 466 by means of its teeth 496, the pinion 497, the segment 500, the ring gear 501, the pinion 503, the shaft 504, and the ring gears 505, 506, and 507 adjusts the type wheel 465 in each group of type wheels in accordance with the amount entered into the totalizer.

The amount type wheel for each amount bank is adjusted by a similar train of mechanism, except for the ten-million-dollar amount bank. The connections for setting the ten-million-dollar type wheel is shown in Figs. 20, 67A, 67B, 68A, and 68B.

In the case of the ten-million-dollar bank in the present disclosure, there is no type wheel provided in the "Deposit Slip" printing position.

Meshing with teeth similar to the teeth on the pinion 497 (Fig. 20) in the ten-million-dollar bank is a pinion 515 (Fig. 68A) connected to a segment 517 by a hub 516. The segment 517 meshes with a ring gear 518 mounted to rotate on a disc 631, secured to a shaft 632, and said ring gear 518 having internal teeth meshing with a pinion 519 on a square shaft 520. The square shaft 520 extends between the two side frames of the machine, as shown in Figs. 68A and 68B, and has mounted thereon two pinions, one inside of each ring gear 521 and 522 on discs 631, so as to drive these ring gears an extent commensurate with the movement of the ring gear 518. Each gear 521 and 522 meshes with an idler pinion 523 (Fig. 20) on a shaft 524. Each pinion 523 meshes with a respective ring gear 525 (Fig. 67A) and 526 (Fig. 67B), which mesh with the ten-million-dollar type wheels 527.

The two groups of ring gears, one group including the ring gears 501 and the discs 509, mounted on the shaft 519, and the other including the ring gears 521 and the discs 631, mounted on the shaft 632, provide a flexible construction for arranging and assembling the machine to fit various systems. The type wheels can be assembled on the type wheel shafts in any position throughout the width of the machine. If desired, an additional type line can be provided beneath the ring gears 521 so that, if some system or application requires two printing lines, two printing lines can be provided in the present machine without the necessity of redesigning the entire type setting mechanism.

Zero setting controls

The type setting slides 466 are controlled in their movement so that zeros are not printed above the highest significant order. As pointed out above, the slide 466 is moved to its "eliminated" position during each operation of the machine prior to being readjusted by the universal rod 310 by the slide 290 and the coupling arm 468. In order to eliminate the printing of zeros where no zero printing is desired, it is only necessary to prevent adjustment of the slide 466 out of its "eliminated" position when the universal rod 310 is restored to its normal position. As explained above, the differential slide 290 is moved from a normal position to a "zero" position when no amount key is depressed, which movement consists of one step of movement. In order to prevent the type setting slide 466 from being moved out of its "eliminated" position during machine operation, it is only necessary to move the differential slide 290 to its normal position before the coupling arm 468 is moved into its coupling position, wherein the differential slide 290 and the type setting slide 466 are coupled together. If the differential slide 290 is restored to its normal position before the coupling arm 468 becomes effective, then, upon subsequent restoring movement of the universal rod 310 to its normal position, no movement of the type setting slide 466 will take place. This leaves the type wheels standing with a blank position at the printing line.

To move the differential slide 290 (Figs. 26, 27, and 28) from its zero position to its normal position prior to the engagement of the coupling arm 468 with the slides 290 and 466, a yoke-shaped pawl 531, pivoted on a rod 532 supported by cam arms 533 loosely mounted on a shaft 534, is provided. A spring 535, stretched between a flange on a downwardly-extending arm of the pawl 531 and an arm 536, also pivoted on the shaft 534, normally maintains a tail 537 of the pawl 531 in engagement with a rod 538 carried by three of the four arms 311. See also Fig. 22. One pawl 531 is pivotally mounted on the rod 532 for each amount bank above the ten-cent bank. An arm 536 is provided for each bank of amount keys above the ten-cent bank and has an upwardly-extending finger with a flat surface 539 normally bearing on a stud 540 carried on the differential slide 290. The spring 535 normally maintains the surface 539 in engagement with the stud 540.

Carried by each of the three arms 311 (Fig. 22) are rollers 541 (see also Figs. 26, 27, and 28), which project into cam slots 542 of the cam arms 533. When the machine is in its normal, or home, position, the rollers 541 are in the left-hand ends of the cam slots 542 (Fig. 26), and, when the arms 311 are moved clockwise to move the universal rod 310 clockwise to release the differential slides 290, the rollers 541 travel in the cam slots 542 and rock the cam arms 533 counter-clockwise. During this movement of the arms 311, the rod 538 is withdrawn from beneath the tails 537 on the pawls 531, which permits the springs 535 to rock the pawls 531 clockwise. If, as illustrated in Fig. 27, the differential slide 290 is arrested in its zero position by the zero stop pawl 271, the pawl 531, upon being released by movement of the rod 538 from beneath the tail 537 thereon, moves behind a shoulder 543 formed on the lower edge of the differential slide 290. The position of the parts at this stage of the machine operation is shown in Fig. 27. Continued movement of the universal rod 310 moves the type setting slide 466 to its "eliminated" position, and the roller 541 on the arms 311, moving in the cam slot 542, rocks the cam arms 533 counter-clockwise, whereby the differential slide 290 is moved to the left by the pawl 531 to its home position, as shown in Fig. 28. After the differential slide has been moved to its home position, the coupling arm 468 is moved to engage the teeth on the lower edge of the slide 290, as shown in Fig. 28. When the universal rod 310 is now restored to its home position, it does not change the setting of the differential slide 290, inasmuch as this slide has already been restored to its home position by the pawl 531. Inasmuch as the differential slide 290 is not moved at this time, the type setting slide 466 is not moved also and therefore remains in its "eliminated" position. When moved into this "eliminated" position, the slide 466, through the connections described hereinbefore, positions blank on the type carrier at the printing line.

The above description points out how one differential unit is controlled to prevent zero printing. If, however, an amount is set up in an amount bank higher than a lower order bank in which no amount has been set up, it is desired to set a zero in said lower bank. In order to control the lower order banks to print zeros, it is only necessary to prevent the pawl 531 in said lower order from moving into position to engage the shoulder 543 on the differential slide 290 in said lower bank. To accomplish this, a flange 544 (Fig. 29) is provided on each pawl 531, which underlies a shoulder 545 of the next highest order pawl 531. If a higher order pawl 531 is prevented from moving into the path of the shoulder 543, the flanges 544 of all the orders lower than the one prevented from rising will also be held depressed. Therefore, even though no amounts are set up on the lower order differential slides 290, the pawls 531 for said lower orders are nevertheless held in depressed position.

When the pawls 531 are held in the their depressed positions and the universal rod 310 and the arms 311 pass through their middle positions (shown in Fig. 27) to rock the cam arms 533 counter-clockwise, the pawls 531 are ineffective to adjust the differential slides 290 from their zero positions into their home positions. After the coupling arm 468 is moved into engagement with the slide 290, the universal rod 310 is moved to its home position. As the universal rod 310 moves to its home position, it restores the differential slide 290 to its home position, thereby moving the type setting slide 466 one step from its "eliminated" position into its "zero" position, thus filling in zeros in the lower orders.

The means for preventing the pawls 531 from rising into the path of the shoulders 543 in those orders in which an amount is set up is illustrated in Figs. 23, 24, and 25. As illustrated in Figs. 23 and 24, the "5" key is shown depressed and the differential slide 290 moved to the "5" position. When the differential slide 290 moves to its "5" position, the stud 540 is withdrawn from contact with the shoulder 539 of the arm 536, thus permitting the spring 535 to rock the arm 536 clockwise until a notch 546 therein engages over the flange of the pawl 531, to latch the pawl 531 against riding under the action of the spring 535.

From the above it becomes apparent that all of the pawls 531 in those orders in which the differential slide 290 passes beyond zero position are latched down by arms 536, and therefore all of the pawls 531 in the orders lower than the order in which a differential slide 290 passes beyond zero are held down by the interaction between the shoulder 545 and the flange 544 on the pawls 531.

Repeat mechanism

The amount differential slide 290 can be controlled to repeat a previous entry operation. At the end of an operation of the machine, the type setting slide 466 remains in its set position, and the coupling arm 468 remains in its coupling position and thereby maintains the differential slide 290 and the type setting slide 466 coupled together. For repeat operations, the coupling arm 468 is maintained in its coupling position throughout the operation, and, since no amount keys 100 can be depressed for repeat operations, the type setting slide 466 controls the movement of the differential slide 290. When the machine is released for a repeat operation and the universal rod 310 is rocked clockwise, the universal rod engages the surface 467 of the type setting slide 466 and moves the slide and the differential slide 290 to the right in unison until the slide 466 is arrested by the engagement of a surface 561 (Fig. 23) with the cross bar 291. This movement is of an extent to move the differential slide in accordance with the amount that was previously set on the type slide 466. When the universal rod 310 is moved counter-clockwise to restore the actuator slide 290 and the type setting slide 466 to their original positions, the amount which was standing on the slide 466 is entered into the totalizer.

This mechanism can also be used for transferring totals from one totalizer to another. This is accomplished by first resetting a totalizer in a manner to be described hereinafter, at the end of which operation the type setting slide 466 is set to represent the total taken from the totalizer. If a selecting key for selecting another totalizer is depressed in combination with the Repeat key and the machine is released for operation, the total standing on the slides 466 will be entered into the newly-selected totalizer.

An interlock, described later, prevents depression of the Repeat key if an amount key is depressed, and vice versa. A means, also described later, prevents the zero stop pawl 271 from becoming effective during a repeat operation.

The mechanism for maintaining the coupling arm 468 in engagement with the differential slide 290 and the type setting slide 466 throughout the repeat operation is shown in Figs. 30 and 21. This mechanism consists of a means under control of the Repeat key 114 to rock the coupling pawl 476 from the path of the shoulder 479 on the arm 480. The mechanism for controlling the uncoupling of the pawl 476 includes a cam 562 (Figs. 22 and 30) mounted on the main cam shaft 228. Coacting with the cam 562 is a roller 563 carried on an arm 564 pivotally mounted on the shaft 312. The arm 564 is notched to engage a stud 565 carried by an arm 566 of a three-armed lever 567. A spring 568, connected to the stud 565 and the framework of the machine, normally maintains the roller 563 in engagement with the cam surface of the cam 562. The three-armed lever 567 is provided with a stud 569 projecting into the plane of the coupling pawl 476. A third arm on the three-armed lever has pivoted thereto a link 570, the other end of which is pivoted to a disc 571 carried in the ring gear assembly previously described. The location of the disc 571 is shown in Fig. 68A. The disc 571 is provided with internal teeth 572 meshing with a pinion 573. The pinion 573 is carried by a square shaft 574 and extends across the machine and supports a second pinion 573 in mesh with internal gears of a disc 575. See also Fig. 68B. The disc 575 has pivoted thereto a link 576 (Fig. 30), the upper end of which is pivoted to a bell crank 577 mounted on a stud 578 on the keyboard end plate 133 (Fig. 3), adjacent the first transaction bank. Mounted in the first transaction bank is the Repeat key 114, having a square stud 579 located near its bottom end. A flange 580, formed on the bell crank 577, is so located that, upon movement of the bell crank 577 in a counter-clockwise direction, the flange 580 strikes the stud 579 when the Repeat key is in its undepressed position. Depression of the Repeat key 114 moves the stud 579 out of the path of movement of the flange 580.

During the operation of the machine, following depression of the Repeat key 114, when the cam 562 receives its initial movement, the spring 568 rocks the arm 564 clockwise. Clockwise movement of the arm 564, through the stud 565, rocks the three-armed lever 567 counter-clockwise. This counter-clockwise movement of the three-armed lever 567 is permitted during this type of operation because the flange 580 on the bell crank 577 passes over the stud 579 of the depressed Repeat key 114, under action of the spring 568. Counter-clockwise movement of the three-armed lever 567 causes the stud 569 thereon to engage and rock the coupling pawl 476 counter-clockwise about the stud 477 on the arm 475 to withdraw the nose 478 of the coupling pawl 476 from the path of the shoulder 479. Simultaneously with the counter-clockwise movement of the pawl 476, the stud 569 enters a notch 581 on the lower edge of the arm 475 and locks the arm 475 against movement. With the arm 475 locked by the stud 569 and the nose of the pawl 476 withdrawn from the shoulder 479, when the cams 483 rock the arm 480, the movement of the latter is idle, and therefore the arms 474, carrying the rod 473, remain stationary. With the rod 473 remaining stationary in the cam slot 472 of the arm 471, the coupling pawl 468 is held in engagement with the differential slide 290 and the type setting slide 466 throughout its forward and backward movements.

Previous to the return of the universal rod 310, the cams 483 again rock the arm 480 to its normal position, shown in Fig. 31, and thereafter the cam 562, engaging the roller 563, rocks the arm 564 back to its normal position, shown in Fig. 30, thereby withdrawing the stud 569 from the notch 581, and at the same time, the flange 580 is restored to its normal position, shown in Fig. 30.

During a machine operation in which the Repeat key 114 is not depressed, the coupling pawl 476 is controlled to remain in its effective position in the path of the shoulder 479 by the flange 580 on the bell crank 577 engaging the stud 579 of the undepressed Repeat key 114 when the cam 562 is rotated to release the arm 564 to the action of the spring 568. During this operation, when the flange 580 strikes the stud 579 of the undepressed Repeat key, only slight movement under action of the spring 568 is permitted, which slight movement is not sufficient to move the stud 569 into the notch 581 of the arm 475. Therefore the coupling pawl 476 remains in its effective position, and the cams 483 operate the arm 475 in a manner described hereinbefore to withdraw the coupling pawl 468 before the initial movement of the differential slide 290.

At the beginning of a repeat operation, the type setting slides 466 are all in the previously set position. This includes the setting of those which were controlled by the zero printing control mechanism. It is necessary that the slides 466 control the movement of the differential slide 299 to repeat the previous setting. This makes it desirable to prevent any control over the setting of the slides 299 and 466 by the zero setting mechanism. To prevent any such controls, a special means is provided to disable the zero setting control mechanism.

To disable the zero setting control mechanism during repeat operations, the highest order cam arm 471 (Fig. 30) has riveted thereto an arm 585 provided with a stud 586 at its free end. A bell crank 587 (see also Fig. 22), pivoted on the shaft 534 and spring-urged into engagement with the stud 586 by a spring 588, normally engages over the pawl 531 of the highest order to prevent its being rocked clockwise in a manner described hereinbefore. The construction of the parts 585 and 587 is such that the bell crank 587 remains latched over the pawl 531 as long as the cam arm 471 remains in its normal position.

Inasmuch as, during a repeat operation, the cam arm 471 is not moved out of its normal position, as pointed out above, the highest order pawl 531 remains latched down during repeat operations and by the flanges 544 (Fig. 29) maintains all of the pawls 531 for the lower order wheels in depressed position, and therefore the zero setting control mechanism is disabled during repeat operations.

During a normal entry operation, in which the Repeat key is not depressed when the universal rod 473 is rocked counter-clockwise to disengage the coupling pawl 468 to permit the differential slide 299 to move under the control of the depressed key, the arm 585 on the highest order bank, acting through the stud 586, rocks the bell crank 587 counter-clockwise, thus releasing the pawl 531 in the highest order to the action of its spring 525. This frees all the pawls 531 to perform their functions in a manner described hereinbefore.

When the bell crank 587 is restored to its normal position at the end of a non-repeat operation by action of the universal rod 473, the pawls 531 are again latched by the bell crank 587.

Transaction keys

The transaction keys for controlling the various functions of the machine are arranged in two banks, as shown in Fig. 2. The keys 101 to 109 inclusive control the selection of totalizers into which amounts are to be added, in addition to controlling other operations in the printer section of the machine in the manner described hereinafter. This bank of keys will be referred to herein as the second transaction bank. The keys 110 to 118 inclusive control the time and manner of operation of the totalizer engaging and disengaging mechanism, together with controlling certain functions of the printing mechanism described hereinafter. The bank of keys 110 to 118 will be hereinafter referred to as the first transaction bank.

Keys 110, 111, and 113 of the first transaction bank, and keys 101 to 109 inclusive of the second transaction bank, in addition to controlling the functions just mentioned, also act to release the machine for operation. Keys 109, 112, 114, 115, 116, 117, and 118 do not release the machine for an operation.

First transaction bank—Control slides

The release of the machine for operation, and the operation of certain interlocks, are controlled by a plurality of slides in the first transaction bank, shown in detail in Figs. 54, 55, 56, 57, 58, and 61. The specific controls effected by each of these slides will be described hereinafter in connection with the description of the mechanism for obtaining the functions which they control.

First transaction bank detent

One of the control slides in the first transaction bank consists of a detent 595 (Fig. 56) supported by the beforementioned four rollers 176, for maintaining certain keys of the first transaction bank depressed. A spring 596, attached to an each of the upper edge of the detent 595, normally maintains cam edges 598 of the slide against studs 597, one stud 597 being supported by each key 112, 114, 115, 116, 117, and 118. Depression of one of these keys wipes its respective stud 597 on its associated cam edge 598 to cam the detent to the left (Fig. 56) until the stud 597 passes beyond the cam edge 598, whereupon the spring 596 snaps the detent 595 to the right and over the stud 597 to maintain the respective key depressed. Near the end of the machine operation, the detent 595 is moved to the left by means described hereinafter to release the depressed key.

The keys 112, 114, 115, 116, 117, and 118, which are held in depressed position by the detent 595, are non-motorized keys; that is, keys which do not release the machine for operation. The detent 595 is provided to hold these keys in depressed position until a motorized key can be depressed.

First transaction bank—Machine release control slide

After one of said keys 112, 114, 115, 116, 117, and 118 is depressed, and held in its depressed position by the detent 595, one of the motorized keys in the bank may be depressed. These motorized keys are keys 110, 111, and 113 (Fig. 54).

Depression of the key 110, 111, or 113 wipes its stud 597 against a cam edge 600 on a control slide 601 (Fig. 55) supported on the four studs 176 and moves this slide toward the left against the action of a spring 602. The right end of the control slide 601 (Fig. 55) is provided with a stud 603, which projects into the bifurcated end of an arm 604, pinned to a shaft 605 carried by the keyboard frame. Also secured to the shaft 605 is a latching arm 606, which normally latches over a square stud 607 on an arm 608 pinned to the machine release shaft 264. Upon depression of a key 110, 111, or 113, the control slide 601 is shifted to the left (Fig. 55), thus rocking the arms 604 and 606 counter-clockwise to withdraw a shoulder 609 of the arm 606 from contact with the square stud 607. This releases the arm 608 and the shaft 264 to the action of a spring described hereinafter to move the arm and the shaft counter-clockwise. Counter-clockwise movement of the shaft 264 releases the machine for operation in the manner described herinafter.

First transaction bank—Locking control slide

Also pinned to the release shaft 264 (Fig. 54) is an arm 615 having a stud 611 projecting into the bifurcated end of a locking control slide 612 slidably mounted between the four studs 176.

Counter-clockwise movement of the arm 615 and the movement of the control slide 612 toward the right (Fig. 54) moves an associated notch 613 of the slide 612 over the stud or studs 597 of the key or keys which have been depressed in the first transaction bank to lock the depressed key or keys in their depressed positions.

Near the end of the machine operation, the shaft 264 receives a clockwise rocking movement, by means described hereinafter, to shift the slide 612 to the left (Fig. 54) to withdraw the notches 613 from engagement with the studs 597 of the depressed keys, thus permitting the keys to be restored to their normal undepressed position by the spring 170.

During the leftward movement of the locking slide 612, it engages a stud 614 on the before-mentioned detent 595 (Fig. 56) to disengage the detent 595 from its engagement with the stud 597 of the depressed key to permit the depressed key to be restored to its home position.

*First transaction bank—Interlocking slide between Repeat key and Total-Taking keys*

When the Repeat key 114 is depressed for a repeat operation, it is desired to prevent subsequent depression of the Balance key 110, the Sub-Balance key 111, the Batch Reset key 115, the Batch Read key 116, the Reset key 117, and the Read key 118, so that no Reset or Total-Taking key can be depressed in the first bank in combination with the Repeat key. In order to prevent such combination of keys from being depressed in the first transaction bank, an interlocking control plate 620 (Fig. 57) is provided, which plate lies adjacent to the detent 595. A spring 621, connected to an ear on the upper edge of the interlocking control plate 620, normally maintains a cam edge 622 therein in contact with the stud 597 of the Repeat key 114. When the Repeat key 114 is depressed, the stud 597, engaging the cam edge 622, shifts the control plate 620 toward the right (Fig. 57) against the action of the spring 621. The studs 597 of the keys 110, 111, 115, 116, 117, and 118 project into inverted L-shaped openings in the plate 620. When the plate 620 is moved to the right by depression of the Repeat key 114, the horizontal leg 623 of the L-shaped opening for each of these keys passes over the studs 597 and prevents their depression after the Repeat key has been depressed. In the normal position, the vertical leg of the L-shaped slot is in the path of movement of the studs 597 on the total-taking keys, and therefore the keys may be depressed prior to depression of the Repeat key 114. If one of the total-taking keys is depressed prior to depression of the Repeat key, the stud 597 of the depressed key being in the vertical leg of the L-shaped opening, the plate 620 is prevented from moving toward the right, and therefore depression of the Repeat key is prevented after a total-taking key is depressed.

The studs 597 of the List key 112 and the Add key 113 project through square openings in the plate 620, and therefore the plate 620 can be moved either before or after depression of the List key 112 or the Add key 113.

*First transaction bank—Interlocking slide between Total-Taking keys and Amount keys*

An interlock (Figs. 58, 59, and 60) is provided between the total-taking keys 110, 111, and 114 to 118 of the first transaction bank and the amount keys 100 to prevent release of the machine if an amount key 100 is depressed before a total key is depressed. This interlock is provided to prevent misoperation when totals are taken, since, during total-taking operations, the actuator racks 304 must be free to be set under control of the totalizer wheels.

When an amount key 100 is depressed, a projection 635 thereon (Fig. 58) is positioned into the path of movement of the before-mentioned plate 263. The slide 263 is connected, by the arm 266, to move with the yoke 267. One arm 636 (Fig. 60) of the yoke 267 has pivoted thereon a link 637, the free end of which supports a stud 638 (see also Fig. 59). The stud 638 projects through a bayonet slot 639 in an arm 640 secured to the machine release shaft 264. The stud 638 also projects into an open slot 641 of a bell crank 642 pivoted on a stud 643 carried by the keyboard frame. The bell crank 642 is connected to an arm 644 by a link 645. The arms 644 is secured to a short shaft 30 carried by the right keyboard end plate 133 and an ear on the keyboard front plate 136. Also secured to the shaft 630 (Fig. 58) is an arm 629 having a stud 646 held in engagement with the end of a control slide 647 by a spring 648 (Fig. 59) stretched between the arm 644 and a stud in the keyboard frame. The spring 648, acting through the arm 644, the shaft 630, the arm 629, and the stud 646, normally maintains cam edges 649 of the control slide 647 in engagement with studs 597 of the total-taking keys 110, 111, 115, 116, 117, and 118, and with the stud 597 of the Repeat key 114.

When a key 110, 111, or 114 to 118 is depressed, the respective stud 597 of the depressed key wipes along the cam edge 649 coacting therewith and thereby shifts the control slide 647 leftwardly (Fig. 58). The end of the control slide 647, acting on the stud 646, rocks the arm 629, the shaft 630, and the arm 644 clockwise (Figs. 58 and 59), thus shifting the link 645 leftwardly to rock the bell crank 642 clockwise to shift the stud 638 into the lower, vertical, section of the bayonet slot 639 of the arm 640, secured to the release shaft 264. When the release shaft 264 is thereafter rocked by the depression of a motorized key, the arm 640, acting through the slot 639, carries the stud 638, the link 637, the arm 636, and the yoke 267 counter-clockwise. However, if, at the time the release shaft 264 is released, an amount key 100 is in depressed position, the yoke 267, the arm 266, and the plate 263 are held against movement by the projection 635 on the amount key 100 being held in engagement with the plate 263. If no amount key 100 is depressed, the plate 263 is free to move, and therefore the release shaft 264 can rock to release the machine for operation.

*First transaction bank—Zero stop pawl controls for total-taking operations*

It is necessary to hold the zero stop pawls 271 out of effective positions during total-taking operations. This is accomplished by a stop arm 650 (Figs. 59 and 62) secured to the shaft 630. When the shaft 630 is rocked by the depression of a total-taking key, by the slide 647, the stud 646, and the arm 629, the stop arm 650 is moved into the path of a stud 651 on a pitman 652. The pitman 652 is bifurcated at its upper end to engage and slide on the shaft 270, and its lower end is pivoted to an arm 653 secured to the hub of the yoke 272. A rivet 654 also fastens the yoke 272 and the arm 653 together, the rivet being provided to give the yoke greater rigidity in respect to the arm 653.

If, when the yoke 272 (see also Figs. 20 and 32)

is released, in the manner described hereinafter, by the spring 330, under control of the cam 329, a total key has been depressed and the arm 650 overlies the stud 651, the yoke 272 cannot follow, since it is arrested by the stop arm 650, acting through the stud 651, the pitman 652, and the arm 653. Therefore, the zero stop pawls 271 cannot rock into their effective positions, even though no amount key 100 has been depressed.

*First transaction bank—List key detent*

When the List key 112 is depressed, it is convenient to maintain it depressed until a total is printed. The Balance key 110 is used to control the machine for taking the total of a "List." To maintain the List key depressed, a detent 655 (Fig. 61) is provided in the first transaction bank, which detent is slidably mounted on the four studs 176. A spring 656 normally maintains a cam edge 657 against the stud 597 of the List key 112, and a cam edge 658 against the stud 597 of the Balance key 110.

Depression of the List key 112, acting through its stud 597, shifts the detent 655 against the action of the spring 656 until the stud 597 passes the end of the cam edge 657, whereupon the spring 656 snaps the detent 655 back to engage over the stud 597 of the depressed List key. The detent 655 can thereafter be shifted only by depression of the Balance key 110, which key, acting through its stud 597, wipes on the cam edge 658 to shift the detent leftwardly far enough to disengage the detent from the stud 597 of the List key 114. The spring 170 (Fig. 8) thereupon restores the List key into its normal undepressed position.

*First transaction bank—Cycle control detent*

To control the machine for two-cycle totaltaking operations, a control slide 634 (Fig. 15) is provided, which also slides on the four studs 176. This slide and its control over the cycling mechanism are described later.

*Second transaction bank control slides*

Keys 101 to 108 inclusive (Figs. 2, 16, and 35) in the second transaction bank release the machine for operation. The keys of the second transaction bank are provided with studs 597, which project into openings in, and cooperate with, certain detent slides.

To release the machine for operation, a detent 665 (Fig. 17) is provided in the second transaction bank, which has eight cam edges 666 coacting with the studs 597 on the eight machine release keys 101 to 108 inclusive. A spring 667 normally holds the cam edges 666 in engagement with the studs 597, and, upon depression of a key 101 to 108 inclusive, the detent 665 is shifted to the left (Fig. 17). The detent 665 is provided with a stud 668 near its right-hand end, which engages in a bifurcated end of an arm 669 secured to the before-mentioned shaft 605, which arm is like the arm 604 (Fig. 55). Leftward movement of the detent 665 rocks the arms 604 and 669 counter-clockwise to release the arm 608 and the release shaft 264, in a manner to be described hereinafter, to rock counter-clockwise. Counter-clockwise movement of the release shaft 264 rocks an arm 670 thereon (Fig. 16) counter-clockwise. The arm 670 is provided at its lower end with a stud 671, which engages in a bifurcated projection of a locking slide 672 adjacent the keys of the second transaction bank. When the release shaft 264 is rocked in said counter-clockwise direction, the arm 670 shifts the locking slide 672 to the right (Fig. 16) to position a notch 673 over the stud 597 of the depressed key and a notch 674 over the studs 597 of the undepressed keys. The slide 672, therefore, holds the depressed key in its depressed position and the undepressed keys in their undepressed positions until the release shaft 264 is restored to its home position, whereupon the spring 170 restores the depressed key to its undepressed position.

The add-print key 109 (Figs. 2, 16, and 35) is of the type known in the art as a stay-down key, which remains in depressed position until released manually. In order to maintain the Add-Print key 109 in its depressed position until released manually, a detent 680 (Fig. 18) is provided, which is also mounted to slide on the studs 176. Coacting with the stud 597 of the Add-Print key 109 is a cam edge 681. A spring 682 normally holds the cam edge 681 against the stud 597 of the Add-Print key. Depression of the Add-Print key cams the detent 680 to the left until a notch 683 moves over the stud 597 by action of the spring 682. The detent 680 has no connection with the release shaft 264, and therefore this key is not released by the machine release shaft. The detent 680 is provided with the before-mentioned finger 122 (see also Fig. 2), which projects through the cabinet of the machine and by means of which the detent 680 can be moved to release the Add-Print key.

In order to prevent depression of the keys 101 to 108 inclusive after the Add-Print key has been depressed, the detent 680 is provided with L-shaped openings coacting with the studs 597 of the keys 101 to 108. When the detent 680 is in its normal position, as shown in Fig. 18, the keys 101 to 108 are free to be depressed. After one of these keys is depressed, the Add-Print key 109 cannot be depressed, inasmuch as the stud 597 of the depressed key 101 to 108 is in the vertical section of the L-shaped slot, and therefore depression of the Add-Print key is prevented. When the detent 680 is moved toward the left by depression of the Add-Print key, the horizontal section of the L-shaped opening passes over the studs 597, thus preventing depression of a key 101 to 108.

*Transaction bank differential mechanisms*

The depressed keys in the first and second transaction banks control the differential movement of actuators which control the various functions of the machine and control the selection of the proper totalizer for engagement with the amount actuators. Inasmuch as both differential mechanisms are alike, only one will be described herein in detail. Figs. 7 to 11 inclusive and 22 will be referred to in the description of the transaction bank differential mechanism. These figures illustrate the differential mechanism for the first transaction bank.

*First transaction bank differential mechanism*

Coacting with the studs 579 of the keys 110 to 118 inclusive is a differentially settable slide 689 (Figs. 8, 11, and 22). The studs 579 on the transaction keys alternately project to the right and left (Fig. 22) into the path of alternately-arranged ears 690 formed on the slide 689. The relationship between the studs 579 and the ears 690 is such that, on operation of the machine with a key depressed, the slide 689 is arrested in a position commensurate with the position of the depressed key. The slide 689 is slotted at its front and rear ends to be supported by, and slide on, collars 691 and 692 carried by studs 693 and 694, respectively. The studs 693 and 694 are riveted on the frame 182 (Fig. 22) and are provided with tenons projecting into the side frame 180, and a screw 695, entering a tapped hole in each stud 693 and 694, maintains the frame 180 in proper relationship with the studs 693 and 694. Suitable spacing collars are provided to properly space the slide 689 on the studs 693 and 694, as clearly shown in Fig. 22.

The slide 689 is provided with teeth 696 (Fig. 11) meshing with a segment 697 of an arm 698 having a slot 699, into which projects a stud 700 of a latch 701 (Figs. 9 and 10). The arm 698 is rotatably mounted on a stud 702 carried by the frame 182 and by the side frame 180. The latch 701 is pivotally mounted on a stud 703 carried by an arm 704 also pivotally supported on the stud 702. A beam 705 is pivotally mounted on the arm 704 by a stud 706. The free end of the beam 705 is provided with a stud 707, which projects into a slot 708 of an arm 709, also pivoted on the stud 702. The arm 709 is provided with a segment 710 meshing with teeth 711 (Fig. 8) of a type setting and control slide 712. The control slide 712 is slidably mounted on the aforesaid collars 691 and 692, and at its upper end by a stud 688 mounted between the frames 196 and 199 (Fig. 7).

The latch 701 (Figs. 9 and 10) is provided with a toe 713 normally engaging a notch 715 of a differential driver 716. The differential driver 716 is pivoted on the stud 702 and is provided with a notch 717, into which projects a stud 718 on the free end of a lever 719 pivoted on a stud 720 carried by the frames 180 and 182. The lever 719 is secured to an arm 733 (Fig. 8) by a hub 721. The arm 733 is provided with a pair of rollers 722, which coact with a pair of cam plates 723 (Figs. 8 and 22), secured to, so as to be rotatable by, the aforementioned sleeve 227 (Figs. 13, 14, 15, and 22). The lever 719 (Figs. 9 and 10) is provided with a roller 724, which is movable into engagement with a surface 725 of the beam 705 in a manner to be described presently.

When the cam plates 723 are rotated, upon rotation of the sleeve 227, the arm 733 is rocked clockwise (Fig. 8) to rock the lever 719 clockwise. Clockwise movement of the lever 719, through the stud 718 and the notch 717, rocks the differential driver 716 also clockwise. Clockwise movement of the driver 716 carries with it the latch 701 and, through the stud 700, rocks the arm 698 (Fig. 11) clockwise. Clockwise movement of the driver 716 carries with it the latch 701 and, through the stud 700, it rocks the arm 698 (Fig. 11) clockwise. Clockwise movement of the arm 698, by the segment 697, moves the slide 689 to the right (Fig. 8) until an ear 690 thereon comes into contact with the stud 579 of a depressed key. This arrests the slide 689 in a position commensurate with the depressed key and at the same time positions the arm 698 (Fig. 11) in a corresponding position. Arresting of the arm 698, through its cam slot 699 acting on stud 700, cams the latch 701 counter-clockwise around its stud 703, thus withdrawing the toe 713 from the notch 715 to arrest further movement of the arm 704. Counter-clockwise movement of the latch 701 (Fig. 10) cams an ear 726 thereon into a corresponding notch 727 (Fig. 8) of a locking plate 728 supported by the studs 693 and 720. Continued movement of the driver 716, after the latch 701 has been disengaged therefrom, moves a concentric surface 729 (Fig. 9) thereof beneath the toe 713 and positively locks the latch 701 and the arm 704 in adjusted position, with the result that the stud 706 for the beam 705 is also locked in an adjusted position corresponding to the depressed key.

During the clockwise rocking movement of the lever 719, the roller 724 thereon comes into engagement with the surface 725 of the beam 705 and rocks the beam 705 around the stud 706 as a center. Movement of the beam 705 around the stud 706 cams the stud 707 on the lower end thereof into the slot 708 and rocks the arm 709 and the segment 710 into a position corresponding to the position in which the arm 704 has been adjusted and locked by the latch 701. This adjustment of the segment 710, through the teeth 711 on the slide 712, positions the slide 712 corresponding to the adjusted position of the differential slide 689.

After the control slide 712 has been positioned by the beam 705 in the manner just described, the cams 723 return the levers 719 counter-clockwise to restore the differential driver 716 into its home position. During this counter-clockwise movement of the driver 716, when the notch 715 again comes beneath the toe 713, the toe 713 drops behind the notch 715, and, upon continued clockwise movement, the driver 716, acting through a roller 714 thereon, engages the arm 704 and restores the arm 704 and the latch 701 to their home positions. During this movement, the segment 710 and the control slide 712 are held in their adjusted positions by means described hereinafter, and therefore the beam 705 pivots around the stud 707. The segment 710 remains in the adjusted position until readjusted during the next succeeding cycle of operation.

A counter balancing plate 730 (Fig. 11) is pivotally mounted on the stud 702 adjacent the slide 698 and has a slot 731, through which the stud 700 on the latch 701 projects. A spring 732, stretched between the counter-balancing plate 730 and the arm 698, normally maintains the parts in the positions shown in Fig. 11. If, during the operation of the machine, the latch 701 has a tendency to withdraw prematurely from the notch 715 due to centrifugal force, the plate 730 prevents such movement. When the arm 698 is positively arrested, upon an ear 690 on the slide 689 coming into contact with the stud 579 of a depressed key, the stud 700, operating in the cam slot 699, rocks the latch 701 counter-clockwise in the manner described above. Counter-clockwise movement of the latch 701 moves the stud 700 thereon in the cam slot 731 to rock the counter-balancing plate 730 clockwise against the action of the spring 732. Since it is necessary to stretch the spring 732 to move the stud 700 in the cam slot 699, the spring 732 and the plate 730 act to prevent premature disengagement of the latch 701 from its driver 716.

*Second transaction bank differential mechanism*

The differential mechanism for the second transaction bank is identical with the differential mechanism just described for the first transaction bank, and, therefore, the same reference numerals are applied in Fig. 37. The description of the first transaction bank differential mechanism applies to the second transaction bank differential mechanism.

First transaction bank type wheel setting mechanism

Two type wheels 735 (Figs. 8, 67A, and 67B) are provided to print symbols on the audit tape, and on the issuing strip, indicating the kind of operation being performed. The control slide 712 controls the positioning of the type wheels 735 mounted on the shafts 463 in the audit tape printing section and in the issuing strip printing section. No type wheel 735 is provided in the slip printing section.

Formed on the underneath side of the control slide 712 are teeth 736 (Fig. 8), which mesh with a segment 737 rotatable on the shaft 498. See also Fig. 68B. Connected to the segment 737 by a hub 738 is a segment 739, which meshes with a ring gear 740 on a disc 741 carried by the shaft 632. A pinion 742 meshes with the inner teeth of the ring gear 740 and is mounted on a square shaft 743 extending between the side frames 180 and 181. Lying within a ring gear 744 and carried by the shaft 743 is a pinion similar to the pinion 742, which meshes with an intermediate pinion 745 on the shaft 524. Also meshing with the pinion 745 is a ring gear 746 carried by a disc 747 supported on the shaft 510. The ring gear 746 meshes with the type wheel 735 (Fig. 67B) in the group of type wheels for printing on the issuing strip. The type wheel 735 lies adjacent the units order type wheel for printing amounts.

Also mounted on the square shaft 743 is a pinion, similar to the pinion 742, which lies within a ring gear 750 (Fig. 68A) mounted on a disc 748 caried by the shaft 510. The ring gear 750 meshes with a pinion, similar to the pinion 745, which in turn meshes with a ring gear 749 (Fig. 68A) in mesh with the type wheel 735 adjacent the units order amount type wheel in the audit tape printing group of type wheels.

Also connected to the square shaft 743, so as to be driven by the first transaction bank differential mechanism, are a series of control discs for controlling the totalizer engaging and disengaging mechanisms, and other functions of the machine, in a manner described hereinafter.

Second transaction bank type wheel setting mechanism

The control slide 712 (Fig. 35) for the second transaction bank controls the setting of a type element 755 in each of the three groups of type elements (Figs. 68A and 68B). The symbol-printing type wheel 755, in each group of type wheels, lies adjacent the highest amount type wheel.

Formed on the under side of the control slide 712 (Fig. 35) are a series of teeth 756, meshing with a pinion 757 (see also Fig. 68B), which is connected to a segment 758 by a sleeve 759. The segment 758 meshes with a ring gear 760 carried by a disc 761 mounted on the shaft 632. The ring gear 760 has inner teeth meshing with a pinion 762 carried by a square shaft 763. Also carried by the square shaft 763 are pinions, similar to the pinion 762, adjacent each one of the three ring gears 764, one being provided for each group of type wheels. Meshing with each ring gear 764 is an intermediate pinion 765 on the shaft 524. Meshing with each intermediate pinion 765 is a ring gear 766 meshing with the respective type wheels 755. Through the connections just described, the setting of the control slide 712 adjusts the type carrier 755 into a position corresponding to the position to which the control slide 712 is adjusted by the differential mechanism under the control of the depressed keys 101 to 108 of the second transaction bank to set a symbol at the printing line to identify the key which was depressed.

Totalizer selecting mechanism

The two interspersed totalizer lines—namely, the rear totalizer line on the shaft 371 (Fig. 20) and the front totalizer line on the shaft 351—are shifted to select a totalizer under control of the keys 101 to 108 in the second transaction bank through the control slide 712.

Near the upper, or right-hand, end of the control slide 712 (Fig. 35), and formed on its under side, are a series of teeth 767 in mesh with a segment 768 rotatably supported on the shaft 302. Connected with the segment 768, by a hub 769, is a gear 770 (see also Fig. 12). The gear 770 meshes with pinions 771 secured to the drum cams 388 for the rear and front totalizer shifting lines. The totalizer shifting cams 388 are rotatably mounted on shafts 389. Each drum cam 388 is provided with a cam race 772, into which projects a roller 773 of the beforementioned yoke 387.

When the control slide 712 is adjusted under control of a depressed key 101 to 109, each drum cam 388 is rotated an extent commensurate with the depressed key. Each cam race 772, acting on an associated roller 773, slides the corresponding yoke 387 endwise on a pair of shafts 774 and 775 an extent sufficient to select the proper totalizers on the interspersed totalizer lines, as described hereinbefore, alining the proper sets of totalizer wheels 350 and 370 with the actuator racks 304 and 305, respectively.

After the control slide 712 (Fig. 35) has been properly adjusted under control of the depressed key 101 to 109, an aliner 778, mounted on a shaft 776, is rocked to engage an alining segment 777, also secured to the hub 769, to maintain the drum cam 388 in its proper adjusted position during the time the totalizers are engaged with the actuator racks 304 and 305.

To actuate the aliner 778, a pair of cams 779 (Fig. 8) are provided on the cam shaft 213. The cams 779 act on rollers 782 of a member 780, having an upwardly-extending arm, which arm is bifurcated to engage a stud 783 carried by a link 784 pivoted at one end to the aliner 778 and at the other end to an arm 785 on a shaft 786 supported in the frame of the machine.

After the control slide 712 and the drum cams 388 are properly adjusted under control of the second transaction bank of keys, the cams 779 rock the member 780 clockwise (Fig. 8), which, through the link 784, rocks the aliner 778 counterclockwise to engage the alining teeth of the aliner segments 777. At the end of the machine operation, the cams 779 rock the member 780 and the aliner 778 back to their normal positions, thus releasing the slide 712 and the drum cams 388 for readjustment during the next operation of the machine.

Simultaneously with the alining of the segments 777, an aliner 800 (Fig. 35), in the form of a yoke secured to the shaft 786, is rocked into engagement with the lining teeth on the ring gears 744 and 764, to maintain these ring gears and their connecting mechanism in adjusted positions.

Totalizer engaging mechanism

As described hereinbefore, the three totalizer lines are rocked into engagement with, and disengagement from the actuator racks 304, 305, and 306 by rocking the shafts 353, 373, and 396, respectively (Figs. 33, 47, and 48). These three shafts may be rocked in adding or total-taking timing, and the total-taking timing may be in either read or reset timing. The rocking movement of the three shafts for engaging the totalizers with the actuators is under control of a series of notched discs adjusted by the first and second transaction banks. The setting of these discs determines which totalizer line is to be engaged with the actuators and also whether the engaging movement is to be in the adding, read, or reset timing. The control is effected by a series of feelers which engage the peripheries of the notched discs to determine the proper connections to obtain the various engaging and timing movements. A control plate is also provided for timing the engaging movement of the control feelers during the machine operation. The notched disc for controlling the various engaging movements of the totalizers consists of discs 801, 802, 803, 804, 805, and 806 (Fig. 39, where the discs are shown in top plan view). The discs 801 to 806 inclusive are located just outside the right side frame 180, as shown in Fig. 68B.

The discs 801, 803, 804, and 806 (see also Figs. 36, 38, 40, 41, 42, 45, and 50) are all set under control of the first transaction bank when the control slide 712 is adjusted under control of the keys 110 to 118. As described before, when the control slide 712 is adjusted, the square shaft 743 is rotated by the segment 737 (Fig. 8), the segment 739, and the ring gear 740. Each control disc 801, 803, 804, and 806 is provided with internal teeth which mesh with a pinion 737 on the square shaft 743 so as to adjust the notched discs in accordance with the setting of the control slide 712 in the first transaction bank, in the same manner as the control slide 712 controls the setting of the type carriers described above.

The notched disc 802 (Figs. 37, 39, and 68B) is adjusted under control of the second transaction bank when the control slide 712 of that bank is set under control of the keys 101 to 109. As described before, when the control slide 712 therein is adjusted, the square shaft 763 is rotated by the pinion 757 (Fig. 35), the segment 758, and the ring gear 760 in the same manner as described for setting the type wheel under control of the second transaction bank. The notched control disc 802 (Fig. 37) is provided with internal teeth which mesh with a pinion 788 on the square shaft 763, so that the control disc 802 is adjusted simultaneously with the adjustment of the type wheels upon rotation of the square shaft 763.

The disc 805 (Fig. 44) normally maintains all of the feelers (described later) out of engagement with the control discs until the proper time during the machine operation, when the disc 805 is rocked to release the feelers.

When it is desired to engage a totalizer with the actuator racks 304, 305, or 306 for an add operation, the selected totalizer rocking shaft 353, 373, or 396 is coupled to an add engaging spider 810 (Figs. 46 and 51) rotatably mounted on the shaft 302, which spider is actuated to rock in add timing. If it is desired to engage the selected totalizer shaft 353, 373, or 396 with the actuator racks 304, 305, or 306 in total-taking timing, the shafts are coupled with a total-taking spider 811 (Figs. 46 and 50), which spider is actuated to rock in total-taking timing for either read or reset operations.

The coupling connections between the spiders 810 and 811 and the totalizer engaging rocking shaft 353 for the front totalizer line include a stud 813 (Fig. 46) carried by a link 814 pivotally mounted on an arm 815 secured to the engaging shaft 353. The stud 813 normally lies in an intermediate position, in which it is disengaged from both the spiders 810 and 811. When the link 814 is rocked clockwise (Fig. 46) about its pivot on the arm 815, the stud 813 is seated into a notch 816 of the add spider 810. Then, upon rocking of the add spider 810, the front totalizer is engaged with and disengaged from the actuator racks 304 in add timing. If the link 814 is rocked counter-clockwise (Fig. 46), the stud 813 is seated into a notch 817 of the total-taking spider. Thereupon, during the machine operation, the totalizer engaging shaft 353 will be rocked in either read or reset timing, depending upon the timed movement received by the total-taking spider 811.

*Front totalizer line engaging mechanism—Add operations*

As mentioned before, the front totalizers are illustrated herein to accumulate "Cash Out" entries. Therefore the front totalizer is engaged only when a "Cash Out" key is depressed, which may be either alone or in combination with the List key or the Repeat key of the first transaction bank.

The add engaging spider 810 (Figs. 46 and 51) is rocked in add timing by a pair of cams 820 (see also Fig. 13) secured to the beforementioned cam shaft 229. Coacting with the cam plates 820 are rollers 821 carried by a bell crank 822 pivoted on a stud 823 in the right side frame 180. A link 824 connects the bell crank 822 to the add engaging spider 810.

When the stud 813 for the front totalizer is rocked into engagement with the notch 816 during the operation of the machine, the cam plates 820, acting through the rollers 821, rock the bell crank 822 first clockwise (Fig. 51) and then counter-clockwise, thereby rocking the spider 810 first counter-clockwise and then clockwise. Counter-clockwise movement of the spider 810, through the stud 813, the link 814, the arm 815, and the shaft 353 (Fig. 46) rocks the shaft 353 counter-clockwise and then back in a clockwise direction. Counter-clockwise movement of the shaft 353 (Fig. 47), through the arm 356 and the cam slot 354 in the arm 352, rocks the totalizer wheels 350 into engagement with the actuators 304. The timing of the cam plates 820 is such that they will rock the spider 810 in its initial or counter-clockwise direction after the actuators 304 have been adjusted under control of the amount keys. After the totalizer has been engaged with the adjusted actuators 304, the actuators are returned to the normal positions, which movement enters the amounts standing thereon into the totalizer elements. Then, after the actuators 304 have entered the amounts set up thereon into the totalizer elements, the cam plates 820 rock the spider 810 clockwise, which, through the stud 813 and the connections just described, disengages the totalizer elements from the actuators 304.

The movement of the stud 813 into the notch 816 of the add spider 810 is under control of the discs 802, 803, and 804 (Figs. 41, 42, and 43). In addition to projecting into the plane of the notch 816 of the spider 810, the stud 813 projects into an opening 825 (Fig. 42) of a bell crank 826 pivoted on a stud 827 carried by the auxiliary frame 196. The bell crank 826 is provided with a stud 828, which is normally embraced by two spring-urged pawls 829 and 830. A spring 831, stretched between an ear on the pawl 829 and an ear on the pawl 830, normally holds the two pawls against opposite sides of the stud 828. The pawls 829 and 830 also embrace a stud 832 on a three-armed member 833 pivotally mounted on the shaft 302. The three-armed member 833 is connected to a bell crank 834 (Fig. 38) by a link 835. The bell crank 834 is mounted on the beforementioned stud 823 and is provided with a pair of rollers 837 coacting with a pair of cams 836 on the main shaft 229.

The cams 836, through the bell crank 834, the link 835, and the three-armed member 833, determine the position of the stud 832. When in the normal or home position, the stud 832 controls the positioning of the pawls 829 and 830 (Fig. 42) so as to maintain the bell crank 826 and, through the opening 825 therein, maintain the stud 813 in its normal or ineffective position; that is, in a position in which it does not engage either the add spider 810 or the total-taking spider 811.

The timing of the cams 836 is such that they rock the three-armed member 833 clockwise at the beginning of the machine operation, and then, after the actuators 304 have been positioned, the cams 836 rock the three-armed member 833 counter-clockwise to and beyond its home position. Near the end of the machine operation, the cams 836 again restore the three-armed member 833 clockwise back to its normal position. If, during the counter-clockwise movement of the three-armed member 833 and the studs 832, the bell crank 826 is free to operate, the stud 828 rocks the pawl 830 clockwise and through the spring 831 rocks the pawl 829 likewise, thus carrying with it the stud 828 and the bell crank 826, to move the stud 813 into the notch of the add spider 810.

Whether or not the bell crank 826 is permitted to move in the clockwise movement to engage the stud 813 with the notch 816 is under control of the notched discs 802, 803, and 804. The mechanism for controlling the movement of the bell crank 826 by said control discs includes a link 840 (Fig. 42), one end of which is pivotally connected to the bell crank 826 and the other end of which is carried between a pair of feeler members 841 and 842. The feeler members 841 and 842 are connected to move as a unit and are pivoted on a stud 843 (see also Fig. 19). The free end of the feeling member 841 is provided with a stud 844, which projects over, so as to coact with, the control disc 804 (Fig. 43). The feeler member 842 is provided with a stud 845 projecting into the path of, so as to cooperate with, the control discs 802 and 803 (Figs. 41 and 42).

If, during the counter-clockwise movement (Fig. 42) of the three-armed member 833, when the stud 832 is acting on the pawls 829 and 830, the bell crank 826 is free to move, the stud 813 will move into the notch 816 of the add spider. This condition prevails when notches in the discs 802 and 803 are opposite the stud 845 (Fig. 41).

As illustrated in Fig. 42, notches 849 and 850, provided in the disc 802, are positioned opposite the stud 845, under control of the "Cash Out" keys 102 and 106, respectively, of the second transaction bank. Also as illustrated herein, when either the List key 112, the Repeat key 114, or no key at all is depressed in the first transaction bank, it is desired to control the engaging movement of the front totalizer line so that the amounts will be added into the totalizer of the front totalizer line selected for that operation. If the machine is operated with the List key depressed, the notch 846 (Fig. 41) is moved into the path of the stud 845. If the machine is operated with the Repeat key 114 depressed, a notch 847 is moved into the path of the stud 845, and, if no key is depressed in the first transaction bank, a notch 848 is moved into position in the path of the stud 845. The latter setting is shown in Fig. 41.

When a notch 849 or 850, in combination with a notch 846, 847, or 848, is in the path of the stud 845 when the spider 833 (Fig. 42) is rocked counter-clockwise, the stud 828 in the bell crank 826 is free to move, since at this time the stud 845 is free to move into the notch in its path, and therefore the stud 813 is moved into the notch 816 of the add engaging spider (Fig. 51), and then, during the machine operation, the front totalizer line is engaged with the actuator racks 305 in add timing.

If, on the other hand, a key 101, 103 to 105, or 106 to 109 of the second transaction bank, or a key 110, 111, 113, or 115 to 118 of the first transaction bank is depressed, then a high spot is presented into the path of the stud 845. During such an operation, when the spider 833 is rocked counter-clockwise and the pawl 830 is rocked counter-clockwise, the stud 828 is held against movement because the bell crank 826, the link 840, and the feeler member 842 are arrested by the control disc 803. During such an operation, the stud 813 does not move into the notch 816, and therefore the front totalizer line is not rocked into engagement with the actuators 304.

During operations in which the control disc 803 prevents clockwise movement of the bell crank 826, the pawl 830, when moved by the stud 832, stretches the spring 831, and, when the stud 832 returns to normal, the spring 831 restores the pawl 830 to its normal position.

The stud 813 is held in its intermediate position between the notches 816 and 817 (Fig. 46) by the bell crank 826 (Fig. 42) and is held in its lateral position by the engagement of the stud 813 with a shoulder 851 on the add engaging spider 810, and by the engagement of the arm 815 with a sleeve 852 on the stud 827. This construction also holds the engaging shaft 353 in its normal, or home, position.

*Front totalizer line engaging mechanism—Reset and read operations*

Figure 49:
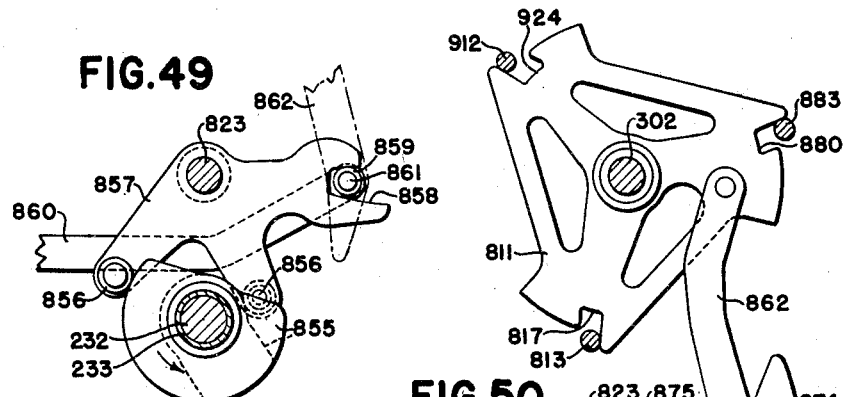
Fig. 49 is a detail view of the cam for rocking the total-taking engaging mechanism in reset timing.

The total-taking engaging spider 811 is actuated in reset timing by a pair of cams 855 (Figs. 13 and 49). The cams 855 are mounted on, so as to rotate with, the beforementioned sleeve 833. Coacting with the cams 855 are a pair of rollers 856 carried by a rocking arm 857 mounted on the stud 823. The arm 857 is provided with a notch 858, normally engaging a roller 859 carried by a link 860, described hereinafter. The roller 859 is mounted on a stud 861, to which is also connected a link 862, the upper end of which is pivoted to the total-taking engaging spider 811.

When the cams 855 are rotated, the arm 857 is rocked counter-clockwise (Fig. 49) to raise the link 862 and thereby rock the total-taking engaging spider 811 counter-clockwise. If at this time the stud 813 is in the notch 817 of the spider 811, the selected front totalizer line is rocked into engagement with the actuators 304 before the actuators 304 are operated to reset the totalizer wheels to zero. After the totalizer wheels have been reset to zero, the spider is returned clockwise to its home position by the cams 855, thus disengaging the totalizer wheels from the actuators 304. After the totalizer elements have been disengaged from the actuators 304, the actuator racks are restored to their normal positions. At the end of this operation, the totalizer elements are standing at zero.

Figure 50:
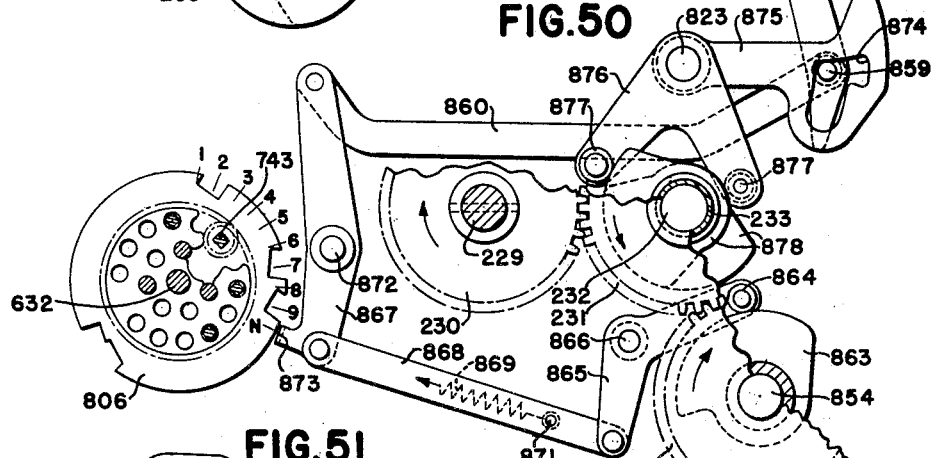
Fig. 50 is a detail view of the mechanism for controlling the movement of the total-taking engaging spider.
Figure 51:
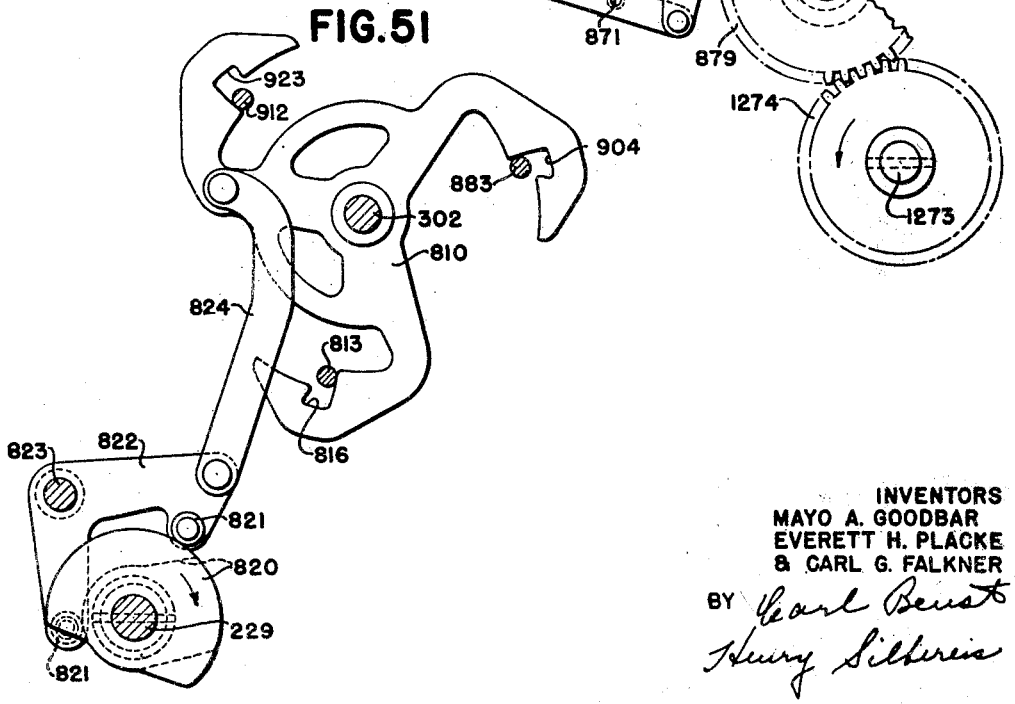
Fig. 51 is a detail view of the mechanism for operating the engaging mechanism in add timing.

The roller 859 is normally maintained in the notch 858 of the cam arm 857 by a linkage actuated by a cam 863 (Fig. 50). Coacting with the cam 863 is a roller 864 carried by a bell crank 865 pivoted on a stud 866. The bell crank 865 is connected to a lever 867 by a link 868. A spring 869, one end of which is attached to a stud 870 (see also Fig. 19) on the side frame 180 and the other end of which is attached to a stud 871 on the link 868, normally maintains the roller 864 against the periphery of the cam 863. The lever 867 is pivoted on a stud 872, and the upper end of the arm 867 has pivoted thereto the beforementioned link 860.

During the operation of the machine, when the cam 863 rotates clockwise (Fig. 50), the spring 869 moves the bell crank 865 clockwise, thus moving the link 868 to the left (Fig. 50) to cause a feeling finger 873 on the arm 867 to feel the periphery of the notched control disc 806. If the feeling finger 873 on the lever 867 engages a high point on the notched disc 806, the roller 859 remains in the notch 858 of the cam arm 857, and therefore the spider 811 is rocked in reset timing during the machine operation. The notched disc 806 is adjusted under control of the first transaction bank, and therefore, when the machine is operated with the Batch Reset key 115 depressed, a high point of the disc 806 will be opposite the feeler 873 to cause the roller 859 to remain in the notch 858 of the arm 857, and the spider 811 is rocked in reset timing. During this operation, the selected batch totalizer on the front totalizer line is reset to zero.

The total-taking engaging spider 811 is rocked in read timing by the cams 855 in combination with a pair of cams 878. During read operations, the spider 811 is rocked counter-clockwise by the cams 855 and clockwise by the cams 878. The controls for obtaining this result are as follows:

When the Batch Read key 116 is depressed and the machine operated, the first transaction bank differential mechanism adjusts the disc 806 to present a notch into the path of the feeler 873. During such a machine operation, after the totalizer has been engaged with the actuators and the totalizer has been reset to zero, the cam 863 releases the bell crank 865, the link 868, and the lever 867 to permit the feeler 873 to enter the notch in the notched disc 806. When the feeler finger 873 enters said notch in the disc 806, the spring 869 rocks the lever 867 clockwise from the position shown in Fig. 52 and moves the link 860 to the right to withdraw the roller 859 from the notch 858 and into a notch 874 in an arm 875 pivoted on the stud 823. The arm 875 is hubbed to a cam arm 876 provided with a pair of rollers 877 coacting with the pair of cams 878 (see also Fig. 13).

The cam 863 has secured thereto a gear 879, which is in mesh with the before-described gear 231. The cam 863 and the gear 879 are rotatable on a stud 854 on the right side frame 180.

The relative timing of the cams 855, 863, and 878 is such that the first movement of the cams 855 and 878 rocks the respective arms 857 and 875 counter-clockwise in unison. If, after the arms 857 and 875 have been rocked counter-clockwise, the cam 863 releasing the feeler 873, and the feeler engaging a high part on the control disc 806, the roller 859 remains in the notch 858 of the arm 857. The cam 855 then rocks the arm 857 clockwise in its normal or home position and carries the link 862 therewith, to disengage the totalizer from the actuators in reset timing. Inasmuch as the arm 857 is moved prior to the movement of the arm 875, the arm 875 is provided with a clearance slot for the roller 859 during this restoring movement of the link 862.

If, during the operation of the machine, the feeler 873 engages a notch in the disc 806, after the arms 857 and 875 have been moved to a counter-clockwise position, the roller 859 is moved into the notch 874 in the arm 875. Thereafter, the arm 857 is restored to its lower position, and, since the roller 859 has been withdrawn from the notch 858, the link 862 remains in in its upper position. Later during the machine operation, when the arm 875 is restored to its home position, the notch 874 carries the link 862 downwardly to move the reset spider 811 to disengage the totalizer from the actuators after the amount has been restored into the totalizers.

From the above it is seen that the arms 857 and 875 are moved in their counter-clockwise directions simultaneously, during which time the arm 857 engages the totalizer with the actuators. If, after the arms are set in such counter-clockwise position, the feeler 873 is moved to withdraw the roller 859 out of the notch 858 and into the notch 874, the arm 857 thereafter is restored idly, and the arm 875 restores the spider 811 to disengage the totalizer in read timing.

At the end of each operation, the cam 863 restores the bell crank 865 and therefore the feeler 873 to their home position, shown in Fig. 52. At this time, the roller 859 is again moved into engagement with the notch 858 in the arm 857. Thus the roller 859 is restored into the notch 858 of the arm 857 at the end of each machine operation.

Rear totalizer engaging mechanism

The engagement of the selected totalizer on the rear totalizer line with the actuators 305 (Fig. 33) is under control of four notched discs 801, 802, 803, and 804 (Figs. 36, 37, 38, 39, and 40). As mentioned before, the discs 801, 802, and 804 are adjusted under control of the first transaction bank, and the disc 802 is set under control of the second transaction bank. The setting of these discs is accomplished through the square shafts 743 and 763 in the manner described hereinbefore. The rear totalizer line shaft 373 (Fig. 19) has connected thereto an arm 881 (see also Fig. 46), which has pivoted thereto a link 882. The link 882 is adapted to be rocked either clockwise, to move a stud 883 thereon into engagement with the add spider 810, or counter-clockwise into engagement with the reset spider 811, in the same manner as described for the stud 813 on the link 814. The clockwise or counter-clockwise rocking movement of the link 882 is controlled by certain feelers coacting with the control discs 801, 802, 803, and 804.

The stud 883 (Fig. 38) on the link 882 projects into an opening in an arm 884 pivoted on a stud 885 carried by the side frame 196 of the machine. Also mounted on the stud 885 is a pair of spring-actuated members 886 and 887, which are urged toward each other by a spring 888. Mounted on the arm 884 is a stud 8891, which projects between the spring-actuated members 886 and 887. Projecting from an arm of the multi-armed member 833 is a stud 890, which also is contacted on opposite sides by the spring-urged members 886 and 887.

When, as hereinbefore described, the multi-armed member 833 is rocked clockwise (Fig. 38), the stud 890 rocks the spring-urged member 886 counter-clockwise against the action of the spring 888. If at this time the arm 884 and the stud 8891 are free to move counter-clockwise the stud 883 moves into engagement with a notch 80 in the reset spider 811. This counter-clockwise movement of the arm 884 is controlled by the disc 804 (Fig. 40). The arm 884 has pivoted thereto a link 891, which at its lower end is connected to a feeler arm 898, having a feeler stud 889 on its free end adapted to coact with the control disc 804.

When the multi-armed member 833 is rocked clockwise to stretch the spring 888 and thereby pull the member 887 against the stud 8891, the arm 884 tends to rock counter-clockwise, and the link 891 tends to move to the right (Fig. 38). This movement of the link 891 to the right tends to rock a two-armed lever 898 counter-clockwise to cause the stud 889 thereon to feel the periphery of the disc 804 (Fig. 40). If the stud 889 contacts the periphery of the disc 804, movement of the link 891 to the right is arrested, and therefore the arm 884 does not rock counter-clockwise to move the stud 883 into the notch 880 of the reset spider 811. If, on the other hand, the stud 889 is permitted to move into a notch in the periphery of the disc 804, the spring 888, acting through the spring-urged member 887 and the stud 8891, rocks the arm 884 counter-clockwise to move the stud 883 into the notch 880 of the reset spider 811. The disc 804 is so constructed that only the Reset key 117 and the Read key 118 control the disc 804 to present notches into the path of the stud 889. A notch in the disc 804 is also placed in the path of the stud 889 when no key is depressed in the first transaction bank.

Also connected to the lower end of the link 891 (Fig. 38) is a bell crank 892, supporting a pivoted pawl having a finger 894 coacting with the control disc 803 (Fig. 36) and a finger 895 coacting with the control disc 802 (Fig. 37). The fingers 894 and 895 are connected to form a pawl 893 by a stud 853, to which is connected one end of a spring 897, the other end of which is connected to a stud on the bell crank 892. The spring 897 maintains the pawl 893 in its central position. A third finger, 896, is formed on the bell crank 892 and coacts with the disc 801.

When the multi-armed member 833 is rocked counterclockwise from its clockwise position past its normal position, the stud 890 rocks the spring-urged member 887 clockwise, thus causing the spring 888 to pull the arm 886 clockwise. If the arm 884 is free to move clockwise under action of the spring 888 by reason of a notch or notches being opposite the fingers 894, 895, and 896, the arm 884, through the stud 883 and the link 882, moves the stud 883 into a notch 904 (Figs. 46 and 51) in the add spider 810. If the finger 896 or the two fingers 894 or 895 engage a high spot of its respective control disc 801, 802, or 803, the link 891 is arrested and the stud 883 is prevented from engaging the add spider 810.

As mentioned before, the disc 801 is adjusted under control of the first transaction bank, and the finger 896 coacts with this disc. As illustrated herein, notches are positioned opposite the finger 896 when the machine is operated with either the List key or the Repeat key depressed, or when no key at all is depressed in the first transaction bank.

The disc 803 also is adjusted under control of the first transaction bank. This disc is so notched that a low spot is moved opposite the finger 894 when the List key is depressed or when no key at all is depressed in this bank.

The disc 802 is adjusted under control of the second transaction bank. This control disc is notched to present a notched portion opposite the finger 895 when either the "B Miscellaneous" key 101, the "B Cash-Out" key 102, the "B Cash-In" key 103, the "A-Miscellaneous" key 105, the "A Cash-Out" key 106, or the "A Cash-In" key 107 is depressed.

An example of when the bell crank 884 is permitted to rock to move the stud 883 into engagement with the notch 904 of the add spider 810 is as follows:

When the "List" key is depressed and the machine operated, a low spot of the disc 801 is moved opposite the feeler 896 of the bell crank 892, and a low spot of the disc 803 is moved opposite the finger 894. For this operation, any key in the second transaction bank may be depressed; for example, the "A Cash-Out" key 106. This positions a notch of the disc 802 in the path of the finger 895. Then, during the operation of the machine, when the multiple-armed member 833 rocks counterclockwise, the member 887 stretches the spring 888 and rocks the arm 884 clockwise to lower the link 891 and the fingers 894, 895, and 896 into their respective notches, thus permitting the stud 883 to move into the notch 904 in the add spider. Therefore, during this operation, the rear totalizer line will be rocked in add timing. The totalizer engaged at this time will depend upon the key in the second bank which has been depressed. For example, if the "A Cash-Out" key has been depressed, the amount will be added into the "A Cash-Out" totalizer.

The rear totalizer line is engaged in read or reset timing in the same manner described for the front totalizer line. The mechanism for obtaining this result is shown in Figs. 49 and 50 and is controlled by the notched disc 806 coacting with the feeler finger 873 in the same manner described hereinbefore for the front totalizer line.

The time of operation of the feeler arms 842, 841, and 898 is controlled by the disc 805 (Fig. 44). A link 900 connects the disc 805 with a bell crank 901 having a cam surface 902. A spring 903 maintains the lower arm of the bell crank 901 normally against a stud 908 carried by the machine side frame. The spring 903 normally tends to rock the disc 805 clockwise, thus tending to rock the bell crank 901 likewise around a stud 905. A stud 906, mounted on one plate of the pair of cam plates 723 for the first transaction differential mechanism, is provided to actuate the bell crank 901. The stud 906 is so located on the cam plate 723 that, after the control discs 801, 802, 803, and 804 have been adjusted, the stud 906 engages the cam surface 902 and rocks the bell crank 901 counter-clockwise (Fig. 44), and this movement, through the link 900, rocks the control disc 905 counter-clockwise, thus releasing the arms 841 and 898 to the action of their respective springs.

*Totalizer engaging mechanism—Upper totalizer*

The upper totalizer engaging mechanism for adding or total-taking operations is under control of the mechanism shown in Fig. 45.

The multiple-armed member 833 is provided with a stud 911 (Fig. 45) for controlling the movement of a stud 912 for engagement with the add spider 810 or the reset spider 811. The stud 911 is engaged at opposite sides by spring-actuated members 913 and 914. A spring 915 rocks the members 913 and 914 toward each other until arrested by the stud 911. Mounted on an arm 916, pivoted on a stud 917, is a stud 918, which also projects between the spring-urged members 913 and 914. The stud 912 is mounted on a link 919 (see also Fig. 46), pivotally connected to the engaging arm 920, for rocking the upper totalizer shaft 399. The arm 920 is rocked in either add timing or reset timing, depending on whether the stud 912 is engaged with a notch 923 of the add spider 810, or with a notch 924 of the reset spider 811.

Clockwise movement of the multi-armed member 833 rocks the spring-urged member 913 counter-clockwise, thus stretching the spring 915 and tending to move the spring-urged member 914 counter-clockwise. The spring-urged member 914 may be moved counter-clockwise if the arm 916, carrying the stud 918, is permitted to move counter-clockwise. This counter-clockwise movement is controlled by a finger 925, which normally lies in the path of movement of the stud 9201 on a feeler arm 921.

*Balance totalizer—Read-reset operations*

The upper totalizer is controlled for read or reset operation by the Balance and Sub-Balance keys 110 and 111, respectively. In order to engage the upper totalizer with the reset spider 811, it is necessary for the feeler arm 921 to rock counter-clockwise. Counter-clockwise movement of the arm 921 is normally prevented by the finger 925 overlying the stud 9201. The finger 925 is pinned to a shaft 926, to which is also pinned a bell crank 927, which projects beneath the Balance key 110 and the Sub-Balance key 111. The bell crank 927 is provided with a finger which is normally held in engagement with a collar 930 by a spring 928 to properly position the finger 925 in the path of the stud 9201. Depression of either the Balance key 110 or the Sub-Balance key 111 engages, through their respective studs 573, the bell crank 927 and rocks it clockwise, against the action of the spring 928, to remove the finger 925 from the path of the stud 9201. Thereafter during the operation of the machine, when the multi-armed member 833 is rocked clockwise, a link 922, connecting the feeler arm 921 with the arm 916, is free to move downwardly to rock the arm 921 counter-clockwise. Counter-clockwise movement (Fig. 46) of the arm 921, through the link 922, rocks the arm 916 counter-clockwise (Fig. 45) to move the stud 912 into the notch 924 to the reset spider 811.

Depression of the Balance key 110 controls the positioning of the notched disc 806, through the differential mechanism of the first transaction bank, to position an unnotched section thereof into the path of the finger 873 (Fig. 50) to control the position of the roller 859 for reset operation in the manner described hereinbefore.

Depression of the Sub-Balance key 111 controls the positioning of the notched disc 806 to present a notch into the path of the finger 873 (Fig. 50) to control the positioning of the roller 859 for read operations in the manner described hereinbefore.

Depression of the Balance key 110 or the Sub-Balance key 111 positions the disc 806 to present high spots to the stud 9201 so that during Balance read or Balance reset operations the feeler arm 921 is held against clockwise movement, and therefore the stud 912 cannot be engaged with the add spider 810 during Balance read or Balance reset operations.

*Balance totalizer—Add operations*

When the multi-armed member 833 (Fig. 45) is moved counter-clockwise beyond its normal or home position, the spring 915, acting through the spring-urged member 913, tends to move the arm 916 clockwise. This clockwise movement of the arm 916 is controlled by the control disc 806, with which the stud 9201 on the feeler arm 921 coacts. If, when the multi-armed member 833 rocks counter-clockwise, a notch of the control disc 806 is opposite the stud 9201, the spring 915 can rock the arm 921 clockwise, thus raising the link 922 and rocking the arm 916 counter-clockwise to position the stud 912 into engagement with the notch 923 in the add spider 810.

The disc 806 is notched in the positions for controlling the upper totalizer for engagement in add timing when the List key 112 or the Add key 113 is depressed. Therefore, when either of these two keys is depressed, a notch in the disc 806 is positioned opposite the stud 9201, thus controlling the upper totalizer to be rocked in add timing.

*Machine release mechanism and cycling controls*

When the machine is released for operation, it performs either a one-cycle operation or a two-cycle operation, depending upon which keys in the first transaction bank are depressed. When the machine is released for an "add" operation, the machine performs a one-cycle operation. When the machine is released for taking a total from the upper, or non-shifting, totalizer, the machine performs one cycle of operation. A one-cycle total-taking operation from the upper totalizer is initiated by the depression of either the Balance key 110 or the Sub-Balance key 111 in the first transaction bank. When the machine is released for a total-taking operation, to take a total either from the rear totalizer line or from the front totalizer line, which lines include interspersed totalizers, the machine performs two cycles of operation. A total-taking operation from the rear totalizer line or the front totalizer line is initiated by the depression of either the Batch Reset key 115, the Batch Read key 116, the Reset key 117, or the Read key 118. During the first of the two cycles of operation, under control of the keys 115 to 118 inclusive, the main cam shaft 229 is arrested shortly after it starts its rotation, and the cams 723 and 779, together with a cycle control cam 936 (Fig. 13) to be described later, receive two complete rotations. The term "cycle" as used herein means a complete rotation of cams 723, 779, and 936.

During the first rotation of the cams 723, the selected interspersed totalizer is shifted to select the proper totalizer from which a total is to be taken. During the second rotation of the cams 723, the main shaft 229 is rotated therewith to complete its rotation. The novel cycle control mechanism is provided to simplify the total-taking operations when only one cycle is necessary, such as when a total is taken from a non-shifting totalizer line. A two-cycle total-taking operation is performed only in those operations where it is necessary to select the totalizer during the first cycle of operation.

*Machine release mechanism*

In the manner described hereinbefore, depression of any of the motorized keys 101 to 108 inclusive of the second transaction bank, or a key 110, 111, or 113 of the first transaction bank (Figs. 17 and 55) moves the control slides 665 and 601, respectively, to rock the shaft 605 and the arm 606 to release the arm 608 and release the shaft 264 for releasing the machine for operation. See also Fig. 64. Pinned to the release shaft 264 is an arm 937 connected to a plate 938 by a link 939 (Figs. 53 and 64). The plate 938 is pivoted on a shaft 940. A spring 941 is connected to a downwardly-extending arm 942 of the plate 938, and to a stud 943 carried by the side frames 181 of the machine. The spring 941 normally tends to rock the plate 938 clockwise, thus normally tending to rock the arm 937 and the release shaft 264 counter-clockwise. Counter-clockwise movement of the shaft 264 is normally arrested by the stud 607 engaging a shoulder of the arm 606. When a motorized key is depressed in the manner described hereinbefore, and the arm 606 is rocked counter-clockwise to withdraw its shoulder from contact with the square stud 607, the spring 941 rocks the plate 938 clockwise until a surface 932 on the plate 938 engages a stud 933 on the left side frame 181 of the machine.

Clockwise movement of the plate 938 (Fig. 64) withdraws a surface 944 thereof from contact with a square stud 945 of a bell crank 946 secured to a shaft 947. The bell crank 946 is normally urged counter-clockwise by a spring 948, which normally maintains the square stud 945 in engagement with the surface 944. When the plate 938 is rocked clockwise, a notch 949 is brought opposite the stud 945, whereupon the spring 948 rocks the bell crank 946 counter-clockwise and moves the square stud into the notch 949. Counter-clockwise movement of the bell crank 946 rocks the shaft 947 (see also Fig. 63) to rock an arm 950, secured to the shaft 947, counter-clockwise. A spring 951 is connected to a stud 952 at the upper ends of the arm 950 at one end, and the other end is connected to a stud 953 on a switch-operating arm 954, pivoted on the beforementioned stud 454. The spring 951 normally holds a surface 955 on the arm 954 in engagement with the stud 952, and, when the arm 950 is rocked counter-clockwise, it rocks the switch-operating arm 954 clockwise. A link 956 connects the upper end of the switch-operating arm 954 with a bell crank 957 pivoted on a stud 935 and having an insulating block 958 normally holding a switch blade 959 in open position. The switch blade 959 is pivoted on a stud 934. Clockwise rotation of the switch-operating arm 954, through the link 956, rocks the bell crank 957 clockwise to permit a switch spring 960, connected to the switch blade 959, to rock the blade 959 clockwise to contact a switch blade 961 to thereby close an electric circuit through the motor 216 to operate the machine in the manner described hereinbefore.

The bell crank 946 is bifurcated to receive a stud 962 of an arm 963 pivoted on the beforementioned shaft 940. When the plate 928 is rocked clockwise, upon depression of a motorized key, to move the notch 959 into the path of the square stud 945, the spring 948, rocking the bell crank 946 counter-clockwise, rocks the arm 963 clockwise to move a surface 964 of the arm 963 into the path of a roller 965 carried between a disc 966 and a cam 975 (see also Fig. 65) pinned to the main cam shaft 229. Also, clockwise movement of the plate 938 moves a surface 967 thereon into the path of the roller 965.

At about midway of the rotation of the main cam shaft, the roller 965 engages the surface 964 and rocks the arm 963 counter-clockwise to rock the bell crank 946 clockwise to withdraw the stud 945 from engagement with the notch 949. Clockwise movement of the bell crank 946 rocks the shaft 947 and the arm 950 clockwise to stretch the spring 951. At this time, the switch arm 954 cannot follow the arm 950, since a roller 968 (Fig. 63) of the switch arm 954 is in contact with the outer periphery of a cam 969 on the main cam shaft 229. Continued rotation of the disc 966 and the cam 975 brings the roller 965 (Fig. 64) into engagement with the surface 967 of the plate 938 and rocks the plate 938 counter-clockwise back to its normal position. Counter-clockwise movement of the plate 938, through the link 939 and the arm 937, moves the release shaft 264 beyond its normal position, wherein the arm 606 again moves into the path of the square stud 607. The springs 602 and 667 rock the shaft 605 and the arm 606 into engagement with the square stud 607 when the square stud is moved beyond the shoulder of the arm 606.

When the arm 950 is rocked counter-clockwise upon depression of a motorized key, and the switch arm 954 is rocked clockwise to close the switch 961, the roller 968 is lifted out of the range of the cam 969. During the first part of the rotation of the cam 969, its outer periphery comes into contact with the roller 968 and maintains a switch arm, and therefore a switch 959—961, in a closed position. Near the end of the machine operation, the outer periphery of the cam 969 passes from beneath the roller 968. At this time, the arm 954 is under tension of the spring 951. Therefore, when the periphery of the cam 969 moves from the path of the roller 968, the spring 951 snaps the switch arm 954 counter-clockwise to open the switch 961 and interrupts the electrical circuit through the motor 216.

When the electrical circuit through the motor 216 is interrupted, the machine is arrested in home position by a shoulder 9701 (Fig. 14) on the pawl 223 being wedged between a stud 9711 on the drive gear 224 and the upper end of a stop arm 972 secured to the beforementioned shaft 947. When the shaft 947 is rocked counter-clockwise upon depression of a motorized key in the manner described above, the stop arm 972 is withdrawn from the shoulder 9701 of the pawl 223, and thereafter a spring 973, connected to the free end of the clutch pawl 223 and on a stud on the gear 224, rocks the pawl 223 counter-clockwise to engage with the clutch member 222 to drive the cam shaft 229 in a manner hereinbefore described. When the arm 950 (Fig. 63) is restored to its home position by the roller 965, the arm 963, the bell crank 946, and the shaft 947, the upper end of the stop arm 972 (Fig. 14) is moved into the path of movement of the shoulder 9701, and therefore, when the shoulder 9701 comes into contact with the stop arm 972, the pawl 223 is withdrawn from engagement with the clutch member 222. Thus, when the shoulder 9701 engages the stop arm 972, the pawl 223 is withdrawn to interrupt the driving action of the motor, and, at the same time, the stop arm 972, the shoulder 9701, and the stud 9711 act as a positive stop to arrest the shaft 229 in its home position.

Non-repeat mechanism

In order to prevent a second operation of the machine, if a motorized key is held depressed during the entire machine operation, a means is provided to prevent the machine from releasing for a second operation until the motorized key is released and again depressed.

When the arm 606 (Fig. 64) is rocked to release the release shaft 264, the non-repeat pawl 971 normally moves into engagement with the lower edge of the stud 607. The non-repeat pawl 971 is normally held in engagement with a stud 974 on the release arm 606 by the spring 970. If the operator should hold the release key in its depressed position until the end of the operation of the machine, the connections hereinbefore described maintain the arm 606 in its moved position, and therefore, when the release shaft is restored past its normal position, the arm 606 does not engage the stud 607; therefore the release shaft 264 would be permitted to rock to release the machine again. However, at this time the non-repeat pawl 971 will have been moved counterclockwise by the spring 970 and therefore engages behind the square stud 607 and prevents such a repeat operation. When the operator releases the depressed motorized key at the end of the machine operation, the release arm 606 is restored clockwise by the springs 602 and 667 into the position shown in Fig. 64, and, during such clockwise movement of the arm 606, the stud 974, engaging the non-repeat pawl 971, restores the non-repeat pawl to its normal position out of engagement with the square stud 607. Therefore the square stud 607 again comes into contact with the shoulder on the arm 606, and the machine is again in condition for release by depression of a motorized key.

One-cycle-add operation

As described hereinbefore, the clutch member 228 (Figs. 14 and 22), the cam 936 (Fig. 15), the two pairs of differential driving cams 723, and the driving gear 224 (Figs. 14, 15, and 22) are all mounted on the sleeve 227 to form a cluster which can be independently rotated on the main cam shaft 229. Normally this cluster of cams and the gear 226 are connected to the main cam shaft 229 by a clutch mechanism now to be described. The clutch mechanism forms a connection whereby the main cam shaft 229 is driven through the cam cluster.

Secured on the main shaft 229 (Figs. 15 and 22) is a disc 981. Pivoted on the disc 981 is a clutch pawl 982, normally held in operating connection with the clutch member 228 by a spring 983. The spring 983 connects the clutch pawl 982 with a retaining pawl 984, also normally in engagement with the clutch member 228. When the motor drives the gear 226 clockwise (Fig. 14), and with the pawl 982 in engagement with the clutch member 228, the clutch member 228 carries the pawl 982 therewith and thereby rotates the disc 981 and the main shaft 229 clockwise. During a one-cycle add operation, the clutch pawl 982 remains in engagement with the clutch member 228 throughout the entire operation, and therefore, the cluster of cams, including the cam 936 and the two pairs of cams 723, rotate with the shaft 229. At the end of the operation, when the shoulder 9701 on the pawl 223 engages the end of the stop arm 972, the machine is arrested in the manner described above. During this one cycle of operation of the main shaft 229, the amount differentials are operated, and the engaging mechanisms for the totalizers are controlled to engage the totalizers with the actuators in add timing, as controlled by the transaction keys in the manner described hereinbefore.

One-cycle total-taking operation

When the machine is released for operation, with either the Balance key 110 or the Sub-Balance key 111 depressed, the clutch pawl 982 remains in operative engagement with the clutch member 228, and therefore, during this operation, the cluster of cams 936 and the two pairs of cams 723 rotate with the main shaft 229. During this operation, the Balance key and the Sub-Balance key control the engagement and disengagement of the front totalizer in the manner hereinbefore described, to take a total from the front totalizer.

Two-cycle total-taking operation

Figure 15:
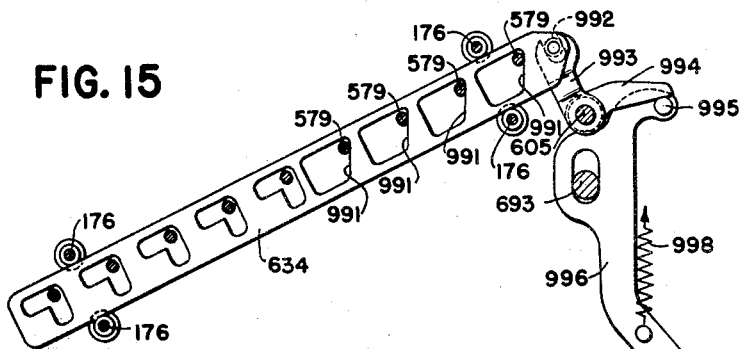
Fig. 15 is a detail view showing the cycle control mechanism.

As above mentioned, the front and rear totalizer lines consist of interspersed totalizers, and therefore it is necessary to make a preliminary operation of the machine so as to provide time to shift the selected totalizer line for selecting or alining the proper one of the interspersed totalizers with the differential actuators before totals can be taken therefrom. However, it is neither necessary nor desirable to operate the amount actuators during the first cycle of a two-cycle operation. To prevent operation of the amount actuators during the first cycle of a two-cycle total-taking operation, the main cam shaft 229 is unclutched from the cluster of cams, including the cam 936 and the two pairs of transaction differential cams 723. This cluster of cams is operated during the first cycle of a two-cycle total-taking operation independently of the main cam shaft 229. The unclutching of the main cam shaft 229 from the cluster of cams is accomplished by rocking the clutch pawl 982 (Fig. 15) out of engagement with the clutch member 228 (Fig. 14) at the beginning of the machine operation. The unclutching of the clutch pawl 982 is under control of the Batch Reset key 115, the Batch Read key 116, the Reset key 117, and the Read key 118 (Figs. 2 and 15).

Depression of one of the keys 115 to 118 shifts the beforementioned cycle control slide 634 upwardly (Fig. 15) by wiping the respective stud 579 against the respective cam edge 991 of the control slide. Mounted at the right-hand end of the control slide 634 is a stud 992, resting in the bifurcated end of an arm 993 pivoted on the shaft 605. Hubbed to the arm 993, so as to move therewith, is a finger 994, whose free end engages over a stud 995 of a slide 996. The slide 996 is slotted to slide on a stud 997 and on the beforementioned stud 693. The slide 996 is normally held in elevated position by a spring 998, which maintains the bottom of the slot engaging the stud 997 in the position shown in Fig. 15. The slide 996 is provided with a flange 999 and a guide finger 1000. A cycle control arm 1001, loosely pivoted on a stud 1002 carried by the side frame of the machine, has near its upper end a finger which engages the flange 999 when the machine is released. The finger 1000 acts as a guide for the upper end of the cycle control arm 1001 to guide it laterally. Connected to the arm 1001 is a two-armed member 1003, so as to form a unitary pivoting member, consisting of the arms 1001 and 1003. A spring 1004 is stretched between a stud 1005 on the arm 1003 and a stud 1006 on a pawl 1007 pivoted on the shaft 947. The spring 1004 normally holds a stud 1006 in contact with a finger 1008 of a stop arm 1009 pinned to the shaft 947. The arm 1003 is provided with a flange 1010, which is normally held against the free end of the stop arm 1009 by the spring 1004.

Depression of any key 115 to 118 inclusive, acting through the control slide 634, lowers the slide 996 to move the flange 999 thereon out of the path of the upper end of the cycle control arm 1001 and positions the flange 999 opposite a notch in the arm 1001 so as to permit free movement of the latter when released. After the slide 996 has been lowered by depression of a key 115 to 118, a motorized key is depressed, and the shaft 947 is rocked counter-clockwise, as described hereinbefore. The stop arm 1009 is thereby moved from the path of movement of the flange 1010, thus permitting the spring 1004 to rock the unit consisting of the arms 1001 and 1003 in a counter-clockwise direction (Fig. 15). Counter-clockwise movement of the arm 1001 is arrested when a tail 1011 comes into engagement with a stop stud 1012, carried by the side frame of the machine. When the arm 1001 is arrested by the stud 1012, a surface 1013 thereof is positioned into the path of an extension 1014 on the clutch pawl 982. When the machine starts to operate with the surface 1013 in the path of the extension 1014, the extension 1014 comes into engagement with the surface 1013 shortly after the machine starts to operate. Continued rotation of the disc 981, carrying the pawl 982, causes the pawl 982 to be rocked counter-clockwise to disengage the clutch pawl 982 from the clutch member 228 and to permit the clutch member 228 and the transaction differential driving cams 723 to continue to rotate. Since the clutch pawl 982 is disengaged from the clutch member 228, the disc 981 and the main cam shaft 229 remain stationary. The partial rotation of the main cam shaft 229 is not sufficient to start the amount differential mechanisms in operation. The transaction differential cam 723 of the cluster continues to rotate and, through the second bank transaction differential, actuates the totalizer shifting cams 388 to properly select a totalizer by alining the selected totalizer with the amount actuators, in the manner described hereinbefore. After the clutch pawl 982 has been rocked from engagement with the shoulder of the clutch member 228, the pawl rides on the outer periphery of the clutch member 228. During the first cycle of operation, the cam 936 (Fig. 15), rotating with the transaction bank pairs of cams 723, comes into engagement with a roller 1015 on the arm 1003 and rocks the arm 1003, together with the cycle control arm 1001, clockwise past their home positions.

When the stop arm 1009 is rocked counter-clockwise to release the arm 1003, the flange 1010 moves between the stop arm 1009 and the pawl 1007. When the arm 1003 is restored past its home position by the cam 936, the stop arm 1009 remains in its moved position, and therefore, when the flange 1010 is moved from between the stop arm 1009 and the pawl 1007, the spring 1004 moves the pawl 1007 into engagement with the edge of the flange 1010, to hold the arms 1001 and 1003 in a position slightly out of home position, to maintain the surface 1013 out of the path of the extension 1014 of the clutch pawl 982. During the beginning of the second cycle of operation, when the shoulder of the clutch member 228 passes beneath the clutch pawl 982, the spring 983 is free to rock the pawl 982 into engagement therewith, and, during the second cycle of the two-cycle total-taking operation, the main cam shaft 229 is rotated by and with the cluster of transaction differential cams. Near the end of the second cycle of operation, the shaft 947 is given a restoring movement in the manner described hereinbefore, thus positioning the stop arm 1009 into the path of the flange 1010, and, through the finger 1008, engaging the stud 1006, removes the pawl 1007 from engagement with the flange 1010. When the depressed key 115 to 118 is released to return to its normal undepressed position, the spring 998 raises the slide 996 to again position the flange 999 in the path of the arm 1001.

From the above, it is seen that the cycle control mechanism controls the operation of the main cam shaft 229 so as to operate only when needed during total-taking operations. In those operations in which no shifting of the totalizer is required for selection, a total-taking operation is performed in one cycle of operation. In those operations where a totalizer must first be selected from a line of interspersed totalizers, the main cam shaft 229 is arrested so as to prevent the idle operation of the amount differential mechanism. During the first cycle of the two-cycle operation, only the cams for operating the totalizer selecting mechanism, and the aliners therefor, are operated.

The roller 965 (Figs. 64 and 65) is carried between the disc 966 and the cam 975, secured to the main cam shaft 229, and, since the main shaft 229 does not rotate during the entire first cycle of operation, the shaft 947 is rocked to restore the release shaft 264, and stop the machine, only near the end of the second cycle of a two-cycle total-taking operation.

The disc 966 is provided with two ratchet teeth 1016 and 1017 (Fig. 64). When the tooth 1016 is in the home position, a pawl 1018, pivoted on a stud 1019, engages it. Upon the initial movement of the shaft 229 during the first cycle of a two-cycle operation, the pawl 1018 drops into the tooth 1017, which is spaced from the tooth 1016 an extent equal to the movement of the shaft 229 required for disengaging the clutch pawl 982 from the clutch member 228 (Fig. 15). A spring 1020 maintains the pawl 1018 in constant contact with the disc 966 to properly aline the disc 966 in whichever one of the two positions it is arrested in.

Key release means

The key 119 (Figs. 1, 2, and 19) is provided to release any depressed key, except a motorized key, on the keyboard in the event an error is made in the depression thereof. Secured to the shaft 1023 of the key 119 is a clip 1025, which is bifurcated to engage over a stud 1026 on a bell crank 1027 pivoted on a stud 1028 mounted on the side frame 180. The lower end of the key shank 1023 is bifurcated to fit over a shouldered stud 1024 on the side frame 180. The bifurcated lower end of the key shank and the bifurcated clip 1025 provide means for removing the key from the machine if desired, without disturbing the mechanism in the machine.

Secured to the bell crank 1027, by a hub 1029, is an arm 1030 having pivoted thereto a link 1031 slotted at its upper end to fit over a shouldered stud 1032. The stud 1032 is carried on the free end of an arm 1033 secured to the machine release shaft 264. A spring 1034, having one end fastened on a stud in the side frame 180 and the other end to a stud on the link 1031, normally maintains a finger 1035 on the bell crank 1027 in engagement with a stud 1036 on the side frame 180. The stud 1036 limits the movement of the bell crank 1027, the arm 1030, and the link 1031 so as to position the slot in the right-hand end of the link 1031 midway over the stud 1032, so that the arm 1033 is free to move either clockwise or counter-clockwise without moving the link 1031. Therefore the link 1031 does not interfere with the normal releasing and restoring movements of the release shaft 264.

Figure 16:
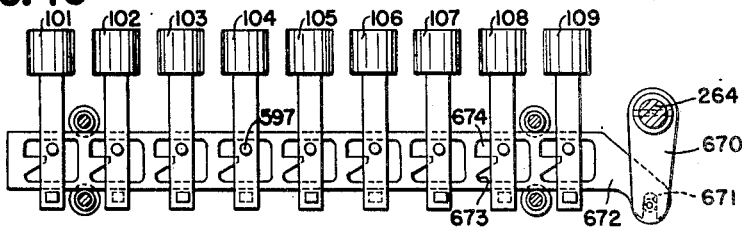
Fig. 16 is a detail view of the detent for maintaining the keys of the second transaction bank depressed during the machine operation.
Figure 17:
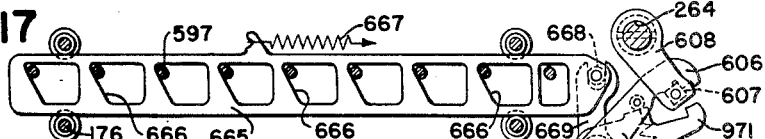
Fig. 17 is a detail view of the second transaction bank release detent.

If it is desired to release a depressed key in the key bank, the operator depresses the Release key 119, which, through the clip 1025, the stud 1026, the bell crank 1027, and the arm 1030, moves the link 1031 leftwardly (Fig. 19) to rock the arm 1033 and the release shaft 264 clockwise (Figs. 16, 23, and 54). Clockwise movement of the release shaft 264 rocks the arms 670, 265, and 615 clockwise to shift the detents for the amount banks and the first and second transaction banks to release the depressed keys. The movement of the link 1031 by the depression of the key 119 is sufficient to first take up the slack in the slot engaging the stud 1032, and to rock the arm 1033 far enough to effect the releasing movement of the keys. Upon release of the key 119 by the operator, the spring 1034 again restores the link 1031 to its normal position, and the spring 941 (Fig. 64) restores the release shaft 264 to its normal position.

*Lock control slide*

The machine is provided with a control slide 1139 (Fig. 53) slidably mounted on two studs 1140 and 1141, carried by the side frame 181 of the machine. The control slide can be moved into three different positions; in one position the machine is locked against operation; in another position the machine may be operated; and in a third position the consecutive number (not shown, but illustrated in the parent case) may be reset and the date may be changed.

Mounted on the control slide 1139 is the beforementioned lock slide 123, the lock on which projects through a slot 1142 of the cabinet 128. The slot 1142 is provided with an index pointer 1143 to aid the operator in positioning the slide 1139. When the slide 1139 is in its intermediate position—that is, with the legend "Register" opposite the index pointer 1143—the machine may be operated, but the consecutive number reset and date setting mechanisms are locked against operation. When the slide 1139 is moved upwardly (Fig. 2) to position the legend "Locked" opposite the index pointer 1143, the machine cannot be released for operation. When the slide 1139 is lowered to position the legend "Consecutive No. Reset" opposite the index pointer 1143, the consecutive number reset mechanism is unlocked, and the mechanism for setting the date, to be described hereinafter, is also unlocked.

The lock 123 is provided with a bolt 1144, which may be moved into locking contact with a keeper 1145, carried on the beforementioned studs 1140 and 1141. In order to shift the slide from its normal position to either of its two adjusted positions, it is necessary to first disengage the bolt 1144 from the keeper 1145 and thereafter to move the slide 1139 to the desired position.

The control slide 1139 is provided with a cam slot 1146 (Fig. 53), which engages a stud 1147 on a three-armed member (not shown).

A retaining pawl 1151 (Fig. 53), pivotally mounted on the beforementioned stud 1140, is spring-urged counter-clockwise by a spring 1152, to position a stud 1153 on the pawl 1151 into a notch in the lower edge of the control slide 1139 to maintain the slide in either of its three adjusted positions.

When the control slide 1139 is moved to its lower position, the machine release shaft 264 (Fig. 53) is locked against movement. To lock the release shaft 264 against movement, the control slide 1139 is provided with a surface 1157, which is brought into the path of a stud 1158 when the control slide 1139 is moved into its "Consecutive No. Reset" position. The surface 1157, coacting with the stud 1158, therefore, prevents any releasing movement of the shaft 264 while the date wheel (not shown) is being changed or the consecutive number wheels (not shown) are being reset to zero. The machine release shaft 264 is also locked against movement when the slide 1139 is moved upwardly (Fig. 2) into its locked position. When the slide is moved into its locked position, a cam surface 1159 on the slide 1139 engages the stud 1158 and rocks the link 939 upwardly, thus rocking the release shaft clockwise. Clockwise movement of the release shaft 264 releases all of the keys which may have been depressed on the keyboard. With the shaft 264 held in this clockwise position, any key on the keyboard may be depressed, but the key will immediately move into its undepressed position upon removal of the operator's finger from the key. The above mechanism, therefore, provides an effective means for preventing any operation of the machine while the slide 1139 is in its locked position. The effect of rocking the release shaft 264 in a clockwise direction by the cam surface 1159 is the same as though the Release key 119 is depressed to release keys on the keyboard as described hereinbefore. Therefore, if desired, the Release key may be depressed first to raise the stud 1148 and thereafter move the slide 1139 into its locked position. This would eliminate some of the force necessary to cam the stud 1158 into its upper position by the slide 1139.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In a machine of the class described, the combination of a totalizer; actuators therefor; a frame to support the totalizer, and movable to move the totalizer into and out of engagement with the actuators; a first oscillating member operated in add timing; a second oscillating member operated in total-taking timing; means connected to the totalizer frame and movable to be coupled with either oscillating member; a notched control disc; feelers coacting with the notched control disc and connected to said means to selectively control the movements of said means to cause said means to be coupled to one or the other of said oscillating members; a first operating means to actuate said second oscillating member in reset total-taking timing; a second operating means to actuate said second oscillating member in sub-total-taking timing, said first and second operating means operable simultaneously to engage the totalizer with the actuators, and said first and second operating means operable at different timing for disengaging the totalizer from the actuators; a second notched control disc; and feeling means coacting with the second notched control disc to engage the second oscillating means with one or the other of said operating means.

2. In a machine of the class described, the combination of a totalizer; actuators therefor; a frame to support the totalizer and movable to move the totalizer into and out of engagement with the actuators; a first oscillating member operated in add timing; a second oscillating member operated in total-taking timing; means connected to the totalizer frame and movable to be coupled with either oscillating member; a notched control disc; feelers coacting with the notched control disc and connected to said means to selectively control the movements of said means to cause said means to be coupled to one or the other of said oscillating members; a first operating means operable in reset total-taking timing; a second operating means operable in sub-total-taking timing; a coupling element connected to the second oscillating member, said coupling member being normally connected to said first operating member whereby the totalizer is engaged with the actuators in reset total-taking timing; a differentially settable notched control disc; a feeler means coacting with the differentially settable notched control disc; and an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations.

3. In a machine of the class described, the combination of a totalizer; actuators therefor; a frame to support the totalizer and movable to move the totalizer into and out of engagement with the actuators; a first oscillating member operated in add timing; a second oscillating member operated in total-taking timing; means connected to the totalizer frame and movable to be coupled with either oscillating member; a first notched disc; feelers coacting with the first notched disc and connected to the said means to selectively control the movements of said means to cause said means to be coupled to one or the other of said oscillating members; a first operating means operable in reset total-taking timing; a second operating means operable in sub-total-taking timing; a coupling element connected to a second oscillating member, said coupling member being normally connected to said first operating member whereby the totalizer is engaged with the actuators in reset total-taking timing; a second notched control disc; a feeler means coacting with the second notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; and manipulative devices to control the setting of said second notched control disc.

4. In a machine of the class described, the combination of a totalizer; actuators therefor; a frame to support the totalizer and movable to move the totalizer into and out of engagement with the actuators; a first oscillating member operated in add timing; a second oscillating member operated in total-taking timing; means connected to the totalizer frame and movable to be coupled with either oscillating member; a first notched control disc; feelers coacting with the first notched control disc and connected to said means to selectively control the movement of said means to cause said means to be coupled to one of the other of said oscillating members; a first operating means operable in reset total-taking timing; a second operating means operable in sub-total-taking timing; a coupling element connected to the second oscillating member, said coupling member being normally connected to said first operating member whereby the totalizer is engaged with the actuators in reset total-taking timing; a second notched control disc; a spring-actuated feeler means coacting with a second notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; and a cam for delaying the movement of the feeler means until after the first operating means has engaged the totalizer with the actuators and the second notched control disc has been set.

5. In a machine of the class described, the combination of a totalizer; actuators therefor; a frame to support the totalizer and movable to move the totalizer into and out of engagement with the actuators; a first oscillating member operated in add timing; a second oscillating member operated in total-taking timing; means connected to the totalizer frame and movable to be coupled with either oscillating member; a first notched control disc; feelers coacting with the first notched control disc and connected to said means to selectively control the movements of said means to cause said means to be coupled with one or the other of the oscillating members; a first operating means operable in reset total-taking timing; a second operating means operable in sub-total-taking timing; a coupling element connected to the second oscillating member, said coupling element being normally connected to said first operating member whereby the totalizer is engaged with the actuators in reset total-taking timing; a second notched control disc; a spring-actuated feeler means coacting with a second notched control disc; an element connecting the feeler means to the coupling member to shift the coupling member from coupling engagement with the first operating means into coupling engagement with the second operating means during sub-total-taking operations, said feeler means controlling the element whereby the coupling means remains in coupling engagement with the first operating means during reset total-taking operations; a cam for delaying the movement of the feeler means until after the first operating means has engaged the totalizer with the actuator and said second notched disc has been set;

and manipulative devices to control the differential setting of the second notched control disc.

6. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means to actuate said oscillating member in reset total-taking timing; a second operating means to actuate said oscillating member in sub-total-taking timing, said first and second operating means operable to simultaneously engage the totalizer with the actuators before the initial movement thereof, said first and second operating means operable at different timing for disengaging the totalizer from the actuators; a control member; and feelers coacting with the control member to selectively control the engagement of the oscillating member with one or the other of said operating means for disengaging the totalizer from the actuators in either reset or sub-total-taking timing.

7. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means to actuate said oscillating member in reset total-taking timing; a second operating means to actuate said oscillating member in sub-total-taking timing, said first and second operating means operable simultaneously to engage the totalizer with the actuators before the initial movement thereof, said first and second operating means operable at different timing for disengaging the totalizer from the actuators; a differentially-adjustable control member; feelers coacting with the differentially-adjustable control member to selectively control the engagement of the oscillating member with one or the other of said operating means for disengaging the totalizer from the actuators in either reset or total-taking timing; and manipulative devices to control the differential setting of the control member.

8. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means operable in reset total-taking timing; a second operating means operable in sub-total-taking timing; a coupling element connected to the oscillating member, said coupling member being normally connected to the said first operating member whereby the totalizer is engaged with the actuator in total-taking timing; a differentially settable notched control disc; a feeler means coacting with the notched control disc; and an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset operations.

9. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means operable in reset total-taking timing; a second operating means operable in sub-total-taking timing; a coupling element connected to the oscillating member, said coupling member being normally connected to said first operating member whereby the totalizer is engaged with the actuator in reset total-taking timing; a differentially settable notched control disc; a feeler means coacting with the notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; and manipulative devices to control the setting of the notched control disc.

10. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means operable in reset total-taking timing; a second operating means operable in sub-total-taking timing; a coupling element connected to the oscillating member, said coupling member being normally connected to the said first operating member whereby the totalizer is engaged with the actuators in total-taking timing; a differentially settable notched control disc; a spring-actuated feeler means coacting with the notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; and a cam for delaying the movement of the feeler means until after the first operating means has engaged the totalizer with the actuator and the notched disc has been differentially adjusted.

11. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means operable in reset total-taking timing; a second operating means operable in sub-total-taking timing; a coupling element connected to the oscillating member, said coupling means being normally connected to said first operating member whereby the totalizer is engaged with the actuators in reset total-taking timing; a differentially settable notched control disc; a spring-actuated feeler means coacting with the notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; and manipulative devices to control the setting of the notched disc.

12. In a machine of the class described, the combination of a totalizer; actuators therefor; a frame to support the totalizer and movable to move the totalizer into and out of engagement with the actuators; an oscillating member; means connected to the totalizer frame and movable into engagement with the oscillating member; a first operating means operable in reset total-taking timing, a second operating means operable in sub-total-taking timing; a coupling element connected to the oscillating member, said coupling member being normally connected to said first operating member whereby the totalizer is engaged with the actuators in reset total-taking timing; a differentially settable notched control disc; a spring-actuated feeler means coacting with the notched control disc; an element connecting the feeler means to the coupling member to shift the coupling member from coupling engagement with the first operating means and into coupling engagement with the second operating means during sub-total-taking operations, said feeler means controlling the element whereby the coupling means remains in coupling engagement with the first operating means during reset total-taking operations; a cam for delaying the movement of the feeler means until after the first operating means has engaged the totalizer with the actuator and the notched control disc has been differentially set; and manipulative devices to control the setting of the notched control disc.

13. In a machine of the class described, the combination of a totalizer; actuators therefor; means controlled by the totalizer to differentially control the adjustment of the actuators from a normal position into a position in accordance with the amount standing on the totalizer; engaging means to engage the totalizer with the actuators before the actuators are differentially adjusted under control of the totalizer to thereby reset the totalizer to zero when the actuators are adjusted under control of the totalizer; a first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from said engaging means; a differentially settable control disc; and feeler means controlled by the control disc to disconnect the said first power-operated means from the engaging means and to connect the second power-operated means to said engaging means.

14. In a machine of the class described, the combination of a totalizer; actuators therefor; means controlled by the totalizer to differentially control the adjustment of the actuators from a normal position into a position in accordance with the amount standing on the totalizer; engaging means to engage the totalizer with the actuators before the actuators are differentially adjusted under control of the totalizer to thereby reset the totalizer to zero when the actuators are adjusted; a first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from the engaging means; a differentially settable control disc; feeler means controlled by the control disc to disconnect said first power-operated means from said engaging means and to connect the second power-operated means to said engaging means; and manipulative devices to differentially control the setting of said control disc.

15. In a machine of the class described, the combination of a totalizer; actuators therefor; means controlled by the totalizer to differentially control the adjustment of the actuators from a normal position into a position commensurate with the amount standing on the totalizer; engaging means to engage the totalizer with the actuators before the actuators are differentially adjusted under control of the totalizer to thereby reset the totalizer to zero when the actuators are adjusted; a first power-operated means to move said engaging means, said first power-operated means operable to return said engaging means to thereby disengage the totalizer from the actuators after the actuators have been differentially adjusted under the control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from the engaging means; a notched control disc having high and low control areas thereon; and a spring-urged feeler coacting with the high and low control areas, said feeler means acting to disconnect the first power-operated means from the said engaging means when the feeler coacts with a low area of the control disc, and simultaneously connecting said second power-operated means with said engaging means after the actuators have been adjusted under control of said totalizer, said feeler acting to maintain said first power-operated means connected with the engaging means when the feeler coacts with a high area of said control disc.

16. In a machine of the class described, the combination of a totalizer; actuators therefor; means controlled by the totalizer to differentially control the adjustment of the actuators from a normal position into a position in accordance with the amount on the totalizer; engaging means to engage the totalizer with the actuators before the actuators are differentially adjusted under control of the totalizer to thereby reset the totalizer to zero when the actuators are adjusted; a first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from said engaging means; a notched control disc having high and low control areas; a spring-urged feeler means coacting with said control areas, said feeler means acting to disconnect the first power-operated means from said engaging means when the feeler means coacts with a low area of the control disc, and simultaneously connecting said second power-operated means with said engaging means after the actuators have been adjusted under control of the totalizer, said feeler means acting to maintain said first power-operated means connected with the engaging means when the feeler coacts with a high area of said control disc; and manipulative devices to differentially control the setting of said control disc.

17. In a machine of the class described, the combination of a totalizer, actuators therefor; means controlled by the totalizer to differentially control the adjustment of the actuators from a normal position into a position in accordance with the amount set on the totalizer; engaging means to engage the totalizer with the actuators before the actuators are differentially adjusted under control of the totalizer to thereby reset the totalizer to zero when the actuators are adjusted; first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from said engaging means; a differentially settable control disc; feeler means controlled by the control disc to disconnect said first power-operated means from said engaging means and to connect the second power-operated means to said engaging means; and a cam device to control the time of operation of the feeler means to cause the feeler means to operate after the first power-operated means has engaged the totalizer with the actuators.

18. In a machine of the class described, the combination of a totalizer; actuators therefor; means controlled by the totalizer to differentially control the adjustment of the actuators from a normal position into a position in accordance with the amount standing on the totalizer; engaging means to engage the totalizer with the actuators before the actuators are differentially adjusted under control of the totalizer to reset the totalizer to zero when the actuators are adjusted; a first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from said engaging means; a notched control disc having control areas thereon; a spring-urged feeler means coacting with the control areas, said feeler means acting to disconnect the first power-operated means from said engaging means when the feeler coacts with certain areas of the control disc and simultaneously connects said power-operated means with said engaging means after the actuators have been adjusted under control of said actuators, said feeler means acting to maintain said first power-operated means connected with the engaging means when the feeler means coacts with certain areas of said control disc; and cam means to release the spring-urged feeler means before the second power-operated means becomes effective to return the engaging means to its original position.

19. In a machine of the class described, the combination of a totalizer; actuators therefore; means controlled by the totalizer to differentially control the adjustment of the actuators from a normal position into a position in accordance with the amount standing on the totalizer; engaging means to engage the totalizer with the actuators before the actuators are differentially adjusted under control of the totalizer to reset the totalizer to zero when the actuators are adjusted; a first power-operated means to move said engaging means, said first power-operated means operable to return said engaging means to thereby disengage the totalizer from the actuators after the actuators have been differentially adjusted under control of said totalizer; a second power-operated means to move said engaging means, said second power-operated means operable to return said engaging means to disengage the totalizer from the actuators after the actuators have been returned to normal position to re-enter the amount taken from the totalizer into the totalizer, said second power-operated means normally disconnected from said engaging means; a differentially settable control disc; feeler means controlled by the control disc to disconnect the said first power-operated means from said engaging means and to connect the second power-operated means to said engaging means; a plurality of total keys; a plurality of subtotal keys; differential means controlled by the said total and sub-total keys; and connections from the differential mechanism to the control disc whereby the control disc is set commensurate with the depressed total or sub-total key.

20. In a machine of the class described, the combination of a totalizer; actuators therefor; means operable in total-taking timing to engage the totalizer with the actuators; means operable in add timing to engage the totalizer with the actuators; coupling means rockable in one direction to couple the totalizer with the first-named means and rockable in another direction to couple the totalizer with the second-named means; means to rock the coupling means in both of said directions; feeler means to determine the direction in which the coupling means is to be rocked; manipulative control means; a notched member differentially positioned under control of the manipulative control means to control the movement of the feeler device in one direction; a finger normally preventing the feeler device from moving in another direction; and manipulative devices to move said finger to release the feeler device so as to be moved in said other direction.

21. In a machine of the class described, the combination of a totalizer; actuators therefor; means operable in total-taking timing to engage the totalizer with the actuators; means operable in add timing to engage the totalizer with the actuators; coupling means rockable in one direction to couple the totalizer with the first-named means and rockable in another direction to couple the totalizer with the second-named means; means to rock the coupling means in both of said directions; feeler means to determine the direction in which the coupling means is to be rocked; manipulative control means; a notched member differentially positioned under control of the manipulative control means to control the movement of the feeler device in one direction; a finger normally preventing the feeler device from moving in another direction; a manipulative device to move said finger to release said feeler device when the manipulative device is moved from a normal position; means to restore the finger into position to prevent the feeler device from moving in said another direction when the manipulative device is restored to normal position; and means to restore the manipulative device to normal position.

22. In a machine of the class described, the combination of a totalizer; actuators therefor; means operable in total-taking timing to engage the totalizer with the actuators; means operable in add timing to engage the totalizer with the actuators; coupling means rockable in one direction to couple the totalizer with the first-named means and rockable in another direction to couple the totalizer with the second-named means; means to rock the coupling means in both of said directions; feeler means to determine the direction in which the coupling means is to be rocked; manipulative control means; a notched member differentially positioned under control of the manipulative control means to control the movement of the feeler device in one direction; a finger normally preventing the feeler device from moving in another direction; a manipulative device to move said finger to release said feeler device when the manipulative device is moved from a normal position; and spring means to restore the finger to position to prevent the feeler device from moving into said another position when the manipulative device is restored to normal position.

23. In a machine of the class described, the combination of a totalizer; actuators therefor; means operable in total-taking timing to engage the totalizer with the actuators; means operable in add timing to engage the totalizer with the actuators; coupling means rockable in one direction to couple the totalizer with the first-named means and rockable in another direction to couple the totalizer with the second-named means; means to rock the coupling means in both of said directions; feeler means to determine the direction in which the coupling means is to be rocked; manipulative control means; a notched member differentially positioned under control of the manipulative control means to control the movement of the feeler device in one direction; a finger normally preventing the feeler device from moving in another direction; manipulative devices movable from a normal position into a moved position; and an arm connected to said finger, said arm projecting into the path of movement of the manipulative devices and movable thereby when the manipulative devices are moved into moved position to thereby move the finger to release the feeler device so as to move in said another direction.

MAYO A. GOODBAR.
EVERETT H. PLACKE.
CARL G. FALKNER.

References Cited in the file of this patent
UNITED STATES PATENTS

| Number | Name | Date |
|---|---|---|
| 2,167,714 | Goldberg | Aug. 1, 1939 |
| 2,309,901 | Hogfors | Feb. 2, 1943 |
| 2,386,364 | Spurlino et al. | Oct. 9, 1945 |
| 2,584,864 | Goldberg | Feb. 5, 1952 |